US009053697B2

(12) United States Patent
Park et al.

(10) Patent No.: US 9,053,697 B2
(45) Date of Patent: Jun. 9, 2015

(54) SYSTEMS, METHODS, DEVICES, APPARATUS, AND COMPUTER PROGRAM PRODUCTS FOR AUDIO EQUALIZATION

(75) Inventors: Hyun Jin Park, San Diego, CA (US); Erik Visser, San Diego, CA (US); Jongwon Shin, San Diego, CA (US); Kwokleung Chan, San Diego, CA (US); Samir K Gupta, San Diego, CA (US); Andre Gustavo P. Schevciw, San Diego, CA (US); Ren Li, San Diego, CA (US); Jeremy P. Toman, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 279 days.

(21) Appl. No.: 13/149,714

(22) Filed: May 31, 2011

(65) Prior Publication Data

US 2011/0293103 A1 Dec. 1, 2011

Related U.S. Application Data

(60) Provisional application No. 61/350,436, filed on Jun. 1, 2010.

(51) Int. Cl.

| | |
|---|---|
| ***G10K 11/16*** | (2006.01) |
| ***H04B 15/00*** | (2006.01) |
| ***G10K 11/178*** | (2006.01) |
| *G10L 21/0208* | (2013.01) |
| *G10L 21/0216* | (2013.01) |

(52) U.S. Cl.

CPC ......... *G10K 11/1782* (2013.01); *G10L 21/0208* (2013.01); *G10L 2021/02082* (2013.01); *G10L 2021/02165* (2013.01)

(58) Field of Classification Search

CPC ........... G10K 11/178; G10K 11/1782; G10K 11/1788; G10L 21/0208; H03G 5/025; H03G 5/165; H04M 9/082; H04R 3/04

USPC ............. 381/73.1, 17, 92, 23.1, 386, 423, 57, 381/58, 66, 86, 71.1, 71.8, 94.1, 94.2, 94.3, 381/103, 107, 318

See application file for complete search history.

(56) References Cited

U.S. PATENT DOCUMENTS

| | | | |
|---|---|---|---|
| 4,641,344 | A | 2/1987 | Kasai et al. |
| 5,105,377 | A | 4/1992 | Ziegler, Jr. |

(Continued)

FOREIGN PATENT DOCUMENTS

| | | | |
|---|---|---|---|
| CN | 85105410 | A | 1/1987 |
| CN | 1613109 | A | 5/2005 |

(Continued)

OTHER PUBLICATIONS

Remi Payan, Parametric Equalization on TMS320C6000 DSP, Dec. 2002.*

(Continued)

*Primary Examiner* — Vivian Chin
*Assistant Examiner* — William A Jerez Lora
(74) *Attorney, Agent, or Firm* — Austin Rapp & Hardman

(57) ABSTRACT

Methods and apparatus for generating an anti-noise signal and equalizing a reproduced audio signal (e.g., a far-end telephone signal) are described, wherein the generating and the equalizing are both based on information from an acoustic error signal.

44 Claims, 43 Drawing Sheets

(56) References Cited

U.S. PATENT DOCUMENTS

| | | | | |
|---|---|---|---|---|
| 5,388,185 | A | 2/1995 | Terry et al. | |
| 5,485,515 | A | 1/1996 | Allen et al. | |
| 5,524,148 | A | 6/1996 | Allen et al. | |
| 5,526,419 | A | 6/1996 | Allen et al. | |
| 5,553,134 | A | 9/1996 | Allen et al. | |
| 5,646,961 | A | 7/1997 | Shoham et al. | |
| 5,699,382 | A | 12/1997 | Shoham et al. | |
| 5,764,698 | A | 6/1998 | Sudharsanan et al. | |
| 5,794,187 | A | 8/1998 | Franklin et al. | |
| 5,937,070 | A * | 8/1999 | Todter et al. | 381/71.6 |
| 6,002,776 | A | 12/1999 | Bhadkamkar et al. | |
| 6,064,962 | A | 5/2000 | Oshikiri et al. | |
| 6,240,192 | B1 | 5/2001 | Brennan et al. | |
| 6,411,927 | B1 | 6/2002 | Morin et al. | |
| 6,415,253 | B1 | 7/2002 | Johnson | |
| 6,616,481 | B2 | 9/2003 | Ichio | |
| 6,618,481 | B1 | 9/2003 | Schmidt | |
| 6,678,651 | B2 | 1/2004 | Gao | |
| 6,704,428 | B1 | 3/2004 | Wurtz | |
| 6,732,073 | B1 | 5/2004 | Kluender et al. | |
| 6,757,395 | B1 | 6/2004 | Fang et al. | |
| 6,834,108 | B1 | 12/2004 | Schmidt | |
| 6,885,752 | B1 | 4/2005 | Chabries et al. | |
| 6,937,738 | B2 | 8/2005 | Armstrong et al. | |
| 6,968,171 | B2 | 11/2005 | Vanderhelm et al. | |
| 6,970,558 | B1 | 11/2005 | Schmidt | |
| 6,980,665 | B2 | 12/2005 | Kates | |
| 6,993,480 | B1 | 1/2006 | Klayman | |
| 7,010,133 | B2 | 3/2006 | Chalupper et al. | |
| 7,010,480 | B2 | 3/2006 | Gao et al. | |
| 7,020,288 | B1 | 3/2006 | Ohashi | |
| 7,031,460 | B1 | 4/2006 | Zheng et al. | |
| 7,050,966 | B2 | 5/2006 | Schneider et al. | |
| 7,099,821 | B2 | 8/2006 | Visser et al. | |
| 7,103,188 | B1 | 9/2006 | Jones | |
| 7,120,579 | B1 * | 10/2006 | Licht | 704/225 |
| 7,181,034 | B2 | 2/2007 | Armstrong | |
| 7,242,763 | B2 | 7/2007 | Etter | |
| 7,277,554 | B2 | 10/2007 | Kates | |
| 7,336,662 | B2 | 2/2008 | Hassan-Ali et al. | |
| 7,382,886 | B2 | 6/2008 | Henn et al. | |
| 7,433,481 | B2 | 10/2008 | Armstrong et al. | |
| 7,444,280 | B2 | 10/2008 | Vandali et al. | |
| 7,492,889 | B2 | 2/2009 | Ebenezer | |
| 7,516,065 | B2 | 4/2009 | Marumoto | |
| 7,564,978 | B2 | 7/2009 | Engdegard et al. | |
| 7,676,374 | B2 | 3/2010 | Tammi | |
| 7,711,552 | B2 | 5/2010 | Villemoes | |
| 7,729,775 | B1 | 6/2010 | Saoji et al. | |
| 8,095,360 | B2 | 1/2012 | Gao | |
| 8,102,872 | B2 | 1/2012 | Spindola et al. | |
| 8,103,008 | B2 | 1/2012 | Johnston | |
| 8,160,273 | B2 | 4/2012 | Visser et al. | |
| 8,265,297 | B2 * | 9/2012 | Shiraishi | 381/94.7 |
| 2001/0001853 | A1 | 5/2001 | Mauro et al. | |
| 2002/0076072 | A1 | 6/2002 | Cornelisse | |
| 2002/0193130 | A1 | 12/2002 | Yang et al. | |
| 2003/0023433 | A1 | 1/2003 | Erell et al. | |
| 2003/0093268 | A1 | 5/2003 | Zinser, Jr. et al. | |
| 2003/0158726 | A1 | 8/2003 | Philippe et al. | |
| 2003/0198357 | A1 * | 10/2003 | Schneider et al. | 381/94.2 |
| 2004/0059571 | A1 | 3/2004 | Ohtomo | |
| 2004/0125973 | A1 | 7/2004 | Fang et al. | |
| 2004/0136545 | A1 | 7/2004 | Sarpeshkar et al. | |
| 2004/0161121 | A1 | 8/2004 | Chol et al. | |
| 2004/0196994 | A1 | 10/2004 | Kates | |
| 2004/0252846 | A1 | 12/2004 | Nonaka et al. | |
| 2004/0252850 | A1 | 12/2004 | Turicchia et al. | |
| 2005/0141737 | A1 | 6/2005 | Hansen | |
| 2005/0152563 | A1 | 7/2005 | Amada et al. | |
| 2005/0165603 | A1 | 7/2005 | Bessette et al. | |
| 2005/0165608 | A1 | 7/2005 | Suzuki et al. | |
| 2005/0207585 | A1 | 9/2005 | Christoph | |
| 2006/0008101 | A1 | 1/2006 | Kates | |
| 2006/0069556 | A1 * | 3/2006 | Nadjar et al. | 704/229 |
| 2006/0149532 | A1 | 7/2006 | Boillot et al. | |
| 2006/0217977 | A1 | 9/2006 | Gaeta et al. | |
| 2006/0222184 | A1 | 10/2006 | Buck et al. | |
| 2006/0262938 | A1 | 11/2006 | Gauger et al. | |
| 2006/0262939 | A1 | 11/2006 | Buchner et al. | |
| 2006/0270467 | A1 | 11/2006 | Song et al. | |
| 2006/0293882 | A1 | 12/2006 | Giesbrecht et al. | |
| 2007/0053528 | A1 | 3/2007 | Kim et al. | |
| 2007/0092089 | A1 | 4/2007 | Seefeldt et al. | |
| 2007/0100605 | A1 | 5/2007 | Renevey et al. | |
| 2007/0110042 | A1 | 5/2007 | Li et al. | |
| 2007/0230556 | A1 | 10/2007 | Nakano | |
| 2008/0039162 | A1 | 2/2008 | Anderton | |
| 2008/0112569 | A1 * | 5/2008 | Asada | 381/71.1 |
| 2008/0130929 | A1 | 6/2008 | Arndt et al. | |
| 2008/0152167 | A1 | 6/2008 | Taenzer | |
| 2008/0175422 | A1 | 7/2008 | Kates | |
| 2008/0186218 | A1 | 8/2008 | Ohkuri et al. | |
| 2008/0215332 | A1 | 9/2008 | Zeng et al. | |
| 2008/0243496 | A1 | 10/2008 | Wang | |
| 2008/0269926 | A1 | 10/2008 | Xiang et al. | |
| 2009/0024185 | A1 | 1/2009 | Kulkarni et al. | |
| 2009/0034748 | A1 | 2/2009 | Sibbald | |
| 2009/0111507 | A1 | 4/2009 | Chen | |
| 2009/0170550 | A1 | 7/2009 | Foley | |
| 2009/0192803 | A1 | 7/2009 | Nagaraja et al. | |
| 2009/0254340 | A1 | 10/2009 | Sun et al. | |
| 2009/0271187 | A1 | 10/2009 | Yen et al. | |
| 2009/0299742 | A1 | 12/2009 | Toman et al. | |
| 2009/0310793 | A1 | 12/2009 | Ohkuri et al. | |
| 2009/0323982 | A1 | 12/2009 | Solbach et al. | |
| 2010/0017205 | A1 | 1/2010 | Visser et al. | |
| 2010/0131269 | A1 | 5/2010 | Park et al. | |
| 2010/0150367 | A1 | 6/2010 | Mizuno | |
| 2010/0296666 | A1 * | 11/2010 | Lin | 381/71.6 |
| 2010/0296668 | A1 | 11/2010 | Lee et al. | |
| 2011/0007907 | A1 | 1/2011 | Park et al. | |
| 2011/0099010 | A1 * | 4/2011 | Zhang | 704/233 |
| 2011/0137646 | A1 | 6/2011 | Ahgren et al. | |
| 2011/0142256 | A1 | 6/2011 | Lee et al. | |
| 2012/0148057 | A1 | 6/2012 | Beerends et al. | |
| 2012/0263317 | A1 | 10/2012 | Shin et al. | |

FOREIGN PATENT DOCUMENTS

| | | | |
|---|---|---|---|
| CN | 1684143 | A | 10/2005 |
| CN | 101105941 | A | 1/2008 |
| EP | 0643881 | A1 | 3/1995 |
| EP | 0742548 | A2 | 11/1996 |
| EP | 1081685 | A2 | 3/2001 |
| EP | 1232494 | A1 | 8/2002 |
| EP | 1522206 | A1 | 4/2005 |
| JP | 03266899 | | 11/1991 |
| JP | 6175691 | A | 6/1994 |
| JP | H06343196 | A | 12/1994 |
| JP | 9006391 | A | 1/1997 |
| JP | 10268873 | A | 10/1998 |
| JP | H10294989 | A | 11/1998 |
| JP | 11298990 | A | 10/1999 |
| JP | 2000082999 | A | 3/2000 |
| JP | 2001292491 | A | 10/2001 |
| JP | 2002369281 | | 12/2002 |
| JP | 2003218745 | A | 7/2003 |
| JP | 2003271191 | A | 9/2003 |
| JP | 2004120717 | A | 4/2004 |
| JP | 2004289614 | A | 10/2004 |
| JP | 2005168736 | | 6/2005 |
| JP | 2005195955 | A | 7/2005 |
| JP | 2006276856 | A | 10/2006 |
| JP | 2006340391 | A | 12/2006 |
| JP | 2007295528 | A | 11/2007 |
| JP | 2008507926 | A | 3/2008 |
| JP | 2008122729 | A | 5/2008 |
| JP | 2008193421 | A | 8/2008 |
| JP | 2009031793 | A | 2/2009 |
| JP | 2009302991 | A | 12/2009 |
| JP | 2010021627 | A | 1/2010 |
| KR | 19970707648 | | 12/1997 |
| TW | I238012 | B | 8/2005 |

(56) References Cited

FOREIGN PATENT DOCUMENTS

| | | | |
|---|---|---|---|
| TW | 200623023 | | 7/2006 |
| TW | I279775 | B | 4/2007 |
| TW | I289025 | B | 10/2007 |
| WO | WO9326085 | A1 | 12/1993 |
| WO | WO9711533 | A1 | 3/1997 |
| WO | WO2005069275 | A1 | 7/2005 |
| WO | WO2006012578 | | 2/2006 |
| WO | 2006028587 | | 3/2006 |
| WO | WO-2007046435 | A1 | 4/2007 |
| WO | WO2008138349 | A2 | 11/2008 |
| WO | 2009092522 | A1 | 7/2009 |
| WO | WO-2010009414 | A1 | 1/2010 |

OTHER PUBLICATIONS

Brian C. J. Moore, et al., "A Model for the Prediction of Thresholds, Loudness, and Partial Loudness", J. Audio Eng. Soc., pp. 224-240, vol. 45, No. 4, Apr. 1997.

Esben Skovenborg, et al., "Evaluation of Different Loudness Models with Music and Speech Material", Oct. 28-31, 2004.

Aichner R, et al., :"Post-Processing for convolutive blind source separation" Acoustics, speech and signal processing, 2006. ICASSP 2006 proceedings. 2006 IEEE International Conference on Toulouse, France May 14-19, 2006, Piscataway, NJ, USA, May 14, 2006, Piscataway, NJ, USA,IEEE Piscataway, NJ, USA, May 14, 2006, p. V XP031387071, p. 37, left-hand column, line 1—p. 39, left-hand column, line 39.

Araki S, et al., "Subband based blind source separation for convolutive mixtures of speech"Proceedings of International Conference on Acoustics, Speech and Signal Processing (ICASSP'OS) Apr. 6-10, 2003 Hong Kong, China; [IEEE International Conference on Acoustics, Speech, and Signal Processing (ICASSP)], 2003 IEEE International Conference, vol. 5, Apr. 6, 2003, pp. V_509-V_512, XP010639320ISBN: 9780780376632.

De Diego, M., et al., An adaptive algorithms comparison for real multichannel active noise control. EUSIPCO (European Signal Processing Conference) Sep. 6-10, 2004, Vienna, AT, vol. II, pp. 925-928.

Hasegawa et al, "Environmental Acoustic Noise Cancelling based on For rant Enhancement," Studia'Phonologic, 1984, 59-68.

Hermansen K. , "ASPI-project proposal(9-10 sem.)," Speech Enhancement. Aalborg University, 2009, 4.

International Search Report and Written Opinion—PCT/US2011/038819—ISA/EPO—Sep. 23, 2011.

J.B. Laflen et al. A Flexible Analytical Framework for Applying and Testing Alternative Spectral Enhancement Algorithms (poster). International Hearing Aid Convention (IHCON) 2002. (original document is a poster, submitted here as 3 pp.) Last accessed Mar. 16, 2009.

Jiang, F., et al., New Robust Adaptive Algorithm for Multichannel Adaptive Active Noise Control. Proc. 1997 IEEE Int'l Conf. Control Appl., Oct. 5-7, 1997, pp. 528-533.

Laflen J.B., et al., "A Flexible, Analytical Framework for Applying and Testing Alternative Spectral Enhancement Algorithms," International Hearing Aid Convention , 2002, 200-211.

Payan, R. Parametric Equalization on TMS320C6000 DSP. Application Report SPRA867, Dec. 2002, Texas Instruments, Dallas, TX. 29 pp.

Shin. "Perceptual Reinforcement of Speech Signal Based on Partial Specific Loudness," IEEE Signal Processing Letters. Nov. 2007, pp. 887-890, vol. 14. No. 11.

Streeter, A. et al. Hybrid Feedforward-Fedback Active Noise Control. Proc. 2004 Amer. Control Conf., Jun. 30-Jul. 2, 2004, Amer. Auto. Control Council, pp. 2876-2881, Boston, MA.

T. Baer, et al., Spectral contrast enhancement of speech in noise for listeners with sensonneural hearing impairment: effects on intelligibility, quality, and response times. J. Rehab. Research and Dev., vol. 20, No. 1, 1993. pp. 49-72.

Turicchia L., et al., "A Bio-Inspired Companding Strategy for, Spectral Enhancement," IEEE Transactions on Speech and Audio Processing, 2005, vol. 13 (2), 243-253.

Valin J-M, et al., "Microphone array post-filter for separation of simultaneous non-stationary sources"Acoustics, Speech, and Signal Processing, 2004. Proceedings. (ICASSP ' 04). IEEE International Conference on Montreal, Quebec, Canada May 17-21, 2004, Piscataway, NJ, USA.IEEE, vol. 1, May 17, 2004, pp. 221-224, XP010717605ISBN: 9780780384842.

Visser, et al.: "Blind source separation in mobile environments using a priori knowledge" Acoustics, speech, and signal processing, 2004 Proceedings ICASSP 2004, IEEE Intl Conference, Montreal, Quebec, Canada, May 17-21, 2004, Piscataway, NJ, US, IEEE vol. 3 May 17, 2004, pp. 893-896, ISBN: 978-0-7803-8484-2.

Yang J., et al., "Spectral contrast enhancement," Algorithms and comparisons. Speech Communication, 2003, vol. 39, 33-46.

Orourke, "Real world evaluation of mobile phone speech enhancement algorithms," 2002.

Tzur et al., "Sound Equalization in a noisy environment," 2001.

* cited by examiner

SYSTEMS, METHODS, DEVICES, APPARATUS, AND COMPUTER PROGRAM PRODUCTS FOR AUDIO EQUALIZATION

CLAIM OF PRIORITY UNDER 35 U.S.C. §119

The present application for patent claims priority to Provisional Application No. 61/350,436 entitled "SYSTEMS, METHODS, APPARATUS, AND COMPUTER PROGRAM PRODUCTS FOR NOISE ESTIMATION AND AUDIO EQUALIZATION," filed Jun. 1, 2010, and assigned to the assignee hereof.

REFERENCE TO CO-PENDING APPLICATIONS FOR PATENT

The present application for patent is related to the following co-pending U.S. patent applications:

U.S. patent application Ser. No. 12/277,283 entitled "SYSTEMS, METHODS, APPARATUS, AND COMPUTER PROGRAM PRODUCTS FOR ENHANCED INTELLIGIBILITY" by Visser et al., filed Nov. 24, 2008, and assigned to the assignee hereof; and U.S. patent application Ser. No. 12/765,554 entitled "SYSTEMS, METHODS, APPARATUS, AND COMPUTER-READABLE MEDIA FOR AUTOMATIC CONTROL OF ACTIVE NOISE CANCELLATION" by Lee et al., filed Apr. 22, 2010, and assigned to the assignee hereof.

BACKGROUND

1. Field

This disclosure relates to active noise cancellation.

2. Background

Active noise cancellation (ANC, also called active noise reduction) is a technology that actively reduces ambient acoustic noise by generating a waveform that is an inverse form of the noise wave (e.g., having the same level and an inverted phase), also called an "antiphase" or "anti-noise" waveform. An ANC system generally uses one or more microphones to pick up an external noise reference signal, generates an anti-noise waveform from the noise reference signal, and reproduces the anti-noise waveform through one or more loudspeakers. This anti-noise waveform interferes destructively with the original noise wave to reduce the level of the noise that reaches the ear of the user.

An ANC system may include a shell that surrounds the user's ear or an earbud that is inserted into the user's ear canal. Devices that perform ANC typically enclose the user's ear (e.g., a closed-ear headphone) or include an earbud that fits within the user's ear canal (e.g., a wireless headset, such as a Bluetooth™ headset). In headphones for communications applications, the equipment may include a microphone and a loudspeaker, where the microphone is used to capture the user's voice for transmission and the loudspeaker is used to reproduce the received signal. In such case, the microphone may be mounted on a boom and the loudspeaker may be mounted in an earcup or earplug.

Active noise cancellation techniques may also be applied to sound reproduction devices, such as headphones, and personal communications devices, such as cellular telephones, to reduce acoustic noise from the surrounding environment. In such applications, the use of an ANC technique may reduce the level of background noise that reaches the ear (e.g., by up to twenty decibels) while delivering useful sound signals, such as music and far-end voices.

SUMMARY

A method of processing a reproduced audio signal according to a general configuration includes boosting an amplitude of at least one frequency subband of the reproduced audio signal relative to an amplitude of at least one other frequency subband of the reproduced audio signal, based on information from a noise estimate, to produce an equalized audio signal. This method also includes using a loudspeaker that is directed at an ear canal of the user to produce an acoustic signal that is based on the equalized audio signal. In this method, the noise estimate is based on information from an acoustic error signal produced by an error microphone that is directed at the ear canal of the user. Computer-readable media comprising tangible features that when read by a processor cause the processor to perform such a method are also disclosed herein.

An apparatus for processing a reproduced audio signal according to a general configuration includes means for producing a noise estimate based on information from an acoustic error signal; and means for boosting an amplitude of at least one frequency subband of the reproduced audio signal relative to an amplitude of at least one other frequency subband of the reproduced audio signal, based on information from the noise estimate, to produce an equalized audio signal. This apparatus also includes a loudspeaker that is directed at an ear canal of the user during a use of the apparatus to produce an acoustic signal that is based on the equalized audio signal. In this apparatus, the acoustic error signal is produced by an error microphone that is directed at the ear canal of the user during the use of the apparatus.

An apparatus for processing a reproduced audio signal according to a general configuration includes an echo canceller configured to produce a noise estimate that is based on information from an acoustic error signal; and a subband filter array configured to boost an amplitude of at least one frequency subband of the reproduced audio signal relative to an amplitude of at least one other frequency subband of the reproduced audio signal, based on information from the noise estimate, to produce an equalized audio signal. This apparatus also includes a loudspeaker that is directed at an ear canal of the user during a use of the apparatus to produce an acoustic signal that is based on the equalized audio signal. In this apparatus, the acoustic error signal is produced by an error microphone that is directed at the ear canal of the user during the use of the apparatus.

DETAILED DESCRIPTION

Figures 1A, 1B, 1C:
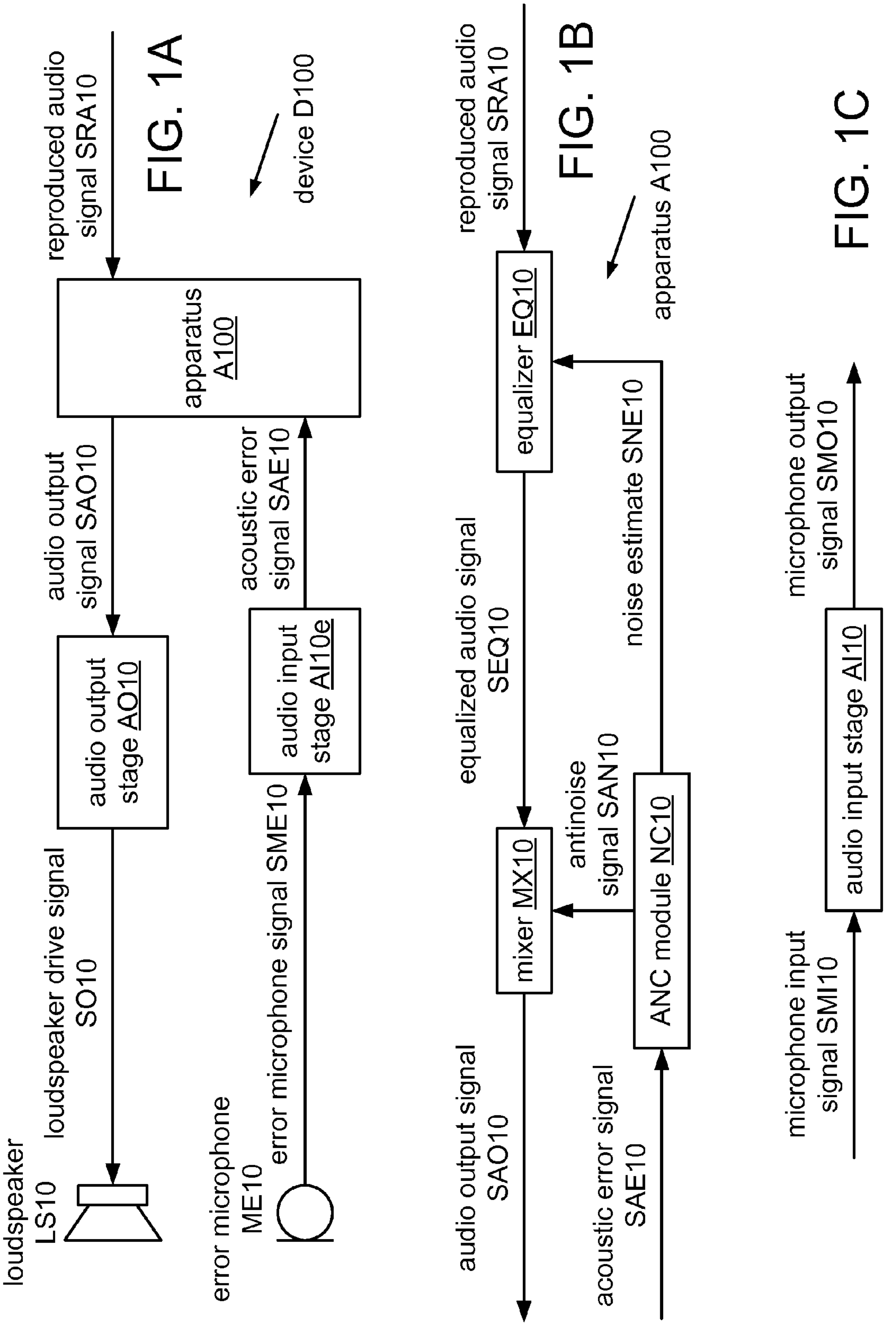
FIG. 1A shows a block diagram of a device D100 according to a general configuration.
FIG. 1B shows a block diagram of an apparatus A100 according to a general configuration.
FIG. 1C shows a block diagram of an audio input stage AI10.

Unless expressly limited by its context, the term "signal" is used herein to indicate any of its ordinary meanings, including a state of a memory location (or set of memory locations) as expressed on a wire, bus, or other transmission medium.

Unless expressly limited by its context, the term "generating" is used herein to indicate any of its ordinary meanings, such as computing or otherwise producing. Unless expressly limited by its context, the term "calculating" is used herein to indicate any of its ordinary meanings, such as computing, evaluating, estimating, and/or selecting from a plurality of values. Unless expressly limited by its context, the term "obtaining" is used to indicate any of its ordinary meanings, such as calculating, deriving, receiving (e.g., from an external device), and/or retrieving (e.g., from an array of storage elements). Unless expressly limited by its context, the term "selecting" is used to indicate any of its ordinary meanings, such as identifying, indicating, applying, and/or using at least one, and fewer than all, of a set of two or more. Where the term "comprising" is used in the present description and claims, it does not exclude other elements or operations. The term "based on" (as in "A is based on B") is used to indicate any of its ordinary meanings, including the cases (i) "derived from" (e.g., "B is a precursor of A"), (ii) "based on at least" (e.g., "A is based on at least B") and, if appropriate in the particular context, (iii) "equal to" (e.g., "A is equal to B" or "A is the same as B"). The term "based on information from" (as in "A is based on information from B") is used to indicate any of its ordinary meanings, including the cases (i) "based on" (e.g., "A is based on B") and "based on at least a part of" (e.g., "A is based on at least a part of B"). Similarly, the term "in response to" is used to indicate any of its ordinary meanings, including "in response to at least."

References to a "location" of a microphone of a multi-microphone audio sensing device indicate the location of the center of an acoustically sensitive face of the microphone, unless otherwise indicated by the context. The term "channel" is used at times to indicate a signal path and at other times to indicate a signal carried by such a path, according to the particular context. Unless otherwise indicated, the term "series" is used to indicate a sequence of two or more items. The term "logarithm" is used to indicate the base-ten logarithm, although extensions of such an operation to other bases are within the scope of this disclosure. The term "frequency component" is used to indicate one among a set of frequencies or frequency bands of a signal, such as a sample (or "bin") of a frequency domain representation of the signal (e.g., as produced by a fast Fourier transform) or a subband of the signal (e.g., a Bark scale or mel scale subband).

Unless indicated otherwise, any disclosure of an operation of an apparatus having a particular feature is also expressly intended to disclose a method having an analogous feature (and vice versa), and any disclosure of an operation of an apparatus according to a particular configuration is also expressly intended to disclose a method according to an analogous configuration (and vice versa). The term "configuration" may be used in reference to a method, apparatus, and/or system as indicated by its particular context. The terms "method," "process," "procedure," and "technique" are used generically and interchangeably unless otherwise indicated by the particular context. The terms "apparatus" and "device" are also used generically and interchangeably unless otherwise indicated by the particular context. The terms "element" and "module" are typically used to indicate a portion of a greater configuration. Unless expressly limited by its context, the term "system" is used herein to indicate any of its ordinary meanings, including "a group of elements that interact to serve a common purpose." Any incorporation by reference of a portion of a document shall also be understood to incorporate definitions of terms or variables that are referenced within the portion, where such definitions appear elsewhere in the document, as well as any figures referenced in the incorporated portion.

The terms "coder," "codec," and "coding system" are used interchangeably to denote a system that includes at least one encoder configured to receive and encode frames of an audio signal (possibly after one or more pre-processing operations, such as a perceptual weighting and/or other filtering operation) and a corresponding decoder configured to produce decoded representations of the frames. Such an encoder and decoder are typically deployed at opposite terminals of a communications link. In order to support a full-duplex communication, instances of both of the encoder and the decoder are typically deployed at each end of such a link.

In this description, the term "sensed audio signal" denotes a signal that is received via one or more microphones, and the term "reproduced audio signal" denotes a signal that is reproduced from information that is retrieved from storage and/or received via a wired or wireless connection to another device. An audio reproduction device, such as a communications or playback device, may be configured to output the reproduced audio signal to one or more loudspeakers of the device. Alternatively, such a device may be configured to output the reproduced audio signal to an earpiece, other headset, or external loudspeaker that is coupled to the device via a wire or wirelessly. With reference to transceiver applications for voice communications, such as telephony, the sensed audio signal is the near-end signal to be transmitted by the transceiver, and the reproduced audio signal is the far-end signal received by the transceiver (e.g., via a wireless communications link). With reference to mobile audio reproduction applications, such as playback of recorded music, video, or speech (e.g., MP3-encoded music files, movies, video clips, audiobooks, podcasts) or streaming of such content, the reproduced audio signal is the audio signal being played back or streamed.

A headset for voice communications (e.g., a Bluetooth™ headset) typically contains a loudspeaker for reproducing the far-end audio signal at one of the user's ears and a primary microphone for receiving the user's voice. The loudspeaker is typically worn at the user's ear, and the microphone is arranged within the headset to be disposed during use to receive the user's voice with an acceptably high SNR. The microphone is typically located, for example, within a housing worn at the user's ear, on a boom or other protrusion that extends from such a housing toward the user's mouth, or on a cord that carries audio signals to and from the cellular telephone. The headset may also include one or more additional secondary microphones at the user's ear, which may be used for improving the SNR in the primary microphone signal. Communication of audio information (and possibly control information, such as telephone hook status) between the headset and a cellular telephone (e.g., a handset) may be performed over a link that is wired or wireless.

It may be desirable to use ANC in conjunction with reproduction of a desired audio signal. For example, an earphone or headphones used for listening to music, or a wireless headset used to reproduce the voice of a far-end speaker during a telephone call (e.g., a Bluetooth™ or other communications headset), may also be configured to perform ANC. Such a device may be configured to mix the reproduced audio signal (e.g., a music signal or a received telephone call) with an anti-noise signal upstream of a loudspeaker that is arranged to direct the resulting audio signal toward the user's ear.

Ambient noise may affect intelligibility of a reproduced audio signal in spite of the ANC operation. In one such example, an ANC operation may be less effective at higher frequencies than at lower frequencies, such that ambient noise at the higher frequencies may still affect intelligibility of the reproduced audio signal. In another such example, the gain of an ANC operation may be limited (e.g., to ensure stability). In a further such example, it may be desired to use a device that performs audio reproduction and ANC (e.g., a wireless headset, such as a Bluetooth™ headset) at only one of the user's ears, such that ambient noise heard by the user's other ear may affect intelligibility of the reproduced audio signal. In these and other cases, it may be desirable, in addition to performing an ANC operation, to modify the spectrum of the reproduced audio signal to boost intelligibility.

FIG. 1A shows a block diagram of a device D100 according to a general configuration. Device D100 includes an error microphone ME10, which is configured to be directed during use of device D100 at the ear canal of an ear of the user and to produce an error microphone signal SME10 in response to a sensed acoustic error. Device D100 also includes an instance AI10*e* of an audio input stage AI10 that is configured to produce an acoustic error signal SAE10 (also called a "residual" or "residual error" signal), which is based on information from error microphone signal SME10 and describes the acoustic error sensed by error microphone ME10. Device D100 also includes an apparatus A100 that is configured to produce an audio output signal SAO10 based on information from a reproduced audio signal SRA10 and information from acoustic error signal SAE10.

Device D100 also includes an audio output stage AO10, which is configured to produce a loudspeaker drive signal SO10 based on audio output signal SAO10, and a loudspeaker LS10, which is configured to be directed during use of device D100 at the ear of the user and to produce an acoustic signal in response to loudspeaker drive signal SO10. Audio output stage AO10 may be configured to perform one or more post-processing operations (e.g., filtering, amplifying, converting from digital to analog, impedance matching, etc.) on audio output signal SAO10 to produce loudspeaker drive signal SO10.

Device D100 may be implemented such that error microphone ME10 and loudspeaker LS10 are worn on the user's head or in the user's ear during use of device D100 (e.g., as a headset, such as a wireless headset for voice communications). Alternatively, device D100 may be implemented such that error microphone ME10 and loudspeaker LS10 are held to the user's ear during use of device D100 (e.g., as a telephone handset, such as a cellular telephone handset). FIGS. 36, 37, 38A, 40B, and 41B show several examples of placements of error microphone ME10 and loudspeaker LS10.

FIG. 1B shows a block diagram of apparatus A100, which includes an ANC module NC10 that is configured to produce an antinoise signal SAN10 based on information from acoustic error signal SAE10. Apparatus A100 also includes an equalizer EQ10 that is configured to perform an equalization operation on reproduced audio signal SRA10 according to a noise estimate SNE10 to produce an equalized audio signal SEQ10, where noise estimate SNE10 is based on information from acoustic error signal SAE10. Apparatus A100 also includes a mixer MX10 that is configured to combine (e.g., to mix) antinoise signal SAN10 and equalized audio signal SEQ10 to produce audio output signal SAO10.

Audio input stage AI10*e* will typically be configured to perform one or more preprocessing operations on error microphone signal SME10 to obtain acoustic error signal SAE10. In a typical case, for example, error microphone ME10 will be configured to produce analog signals, while apparatus A100 may be configured to operate on digital signals, such that the preprocessing operations will include analog-to-digital conversion. Examples of other preprocessing operations that may be performed on the microphone channel in the analog and/or digital domain by audio input stage AI10*e* include bandpass filtering (e.g., lowpass filtering).

Audio input stage AI10*e* may be realized as an instance of an audio input stage AI10 according to a general configuration, as shown in the block diagram of FIG. 1C, that is configured to perform one or more preprocessing operations on microphone input signal SMI10 to produce a corresponding microphone output signal SMO10. Such preprocessing operations may include (without limitation) impedance matching, analog-to-digital conversion, gain control, and/or filtering in the analog and/or digital domains.

Audio input stage AI10*e* may be realized as an instance of an implementation AI20 of audio input stage AI10, as shown in the block diagram of FIG. 1C, that includes an analog preprocessing stage P10. In one example, stage P10 is configured to perform a highpass filtering operation (e.g., with a cutoff frequency of 50, 100, or 200 Hz) on the microphone input signal SMI10 (e.g., error microphone signal SME10).

It may be desirable for audio input stage AI10 to produce the microphone output signal SMO10 as a digital signal, that is to say, as a sequence of samples. Audio input stage AI20, for example, includes an analog-to-digital converter (ADC) C10 that is arranged to sample the pre-processed analog signal. Typical sampling rates for acoustic applications include 8 kHz, 12 kHz, 16 kHz, and other frequencies in the range of from about 8 to about 16 kHz, although sampling rates as high as about 44.1, 48, or 192 kHz may also be used.

Audio input stage AI10*e* may be realized as an instance of an implementation AI30 of audio input stage AI20 as shown in the block diagram of FIG. 1C. Audio input stage AI30 includes a digital preprocessing stage P20 that is configured to perform one or more preprocessing operations (e.g., gain control, spectral shaping, noise reduction, and/or echo cancellation) on the corresponding digitized channel.

Device D100 may be configured to receive reproduced audio signal SRA10 from an audio reproduction device, such as a communications or playback device, via a wire or wirelessly. Examples of reproduced audio signal SRA10 include a far-end or downlink audio signal, such as a received telephone call, and a prerecorded audio signal, such as a signal being reproduced from a storage medium (e.g., a signal being decoded from an audio or multimedia file).

Figures 2A, 2B, 2C:
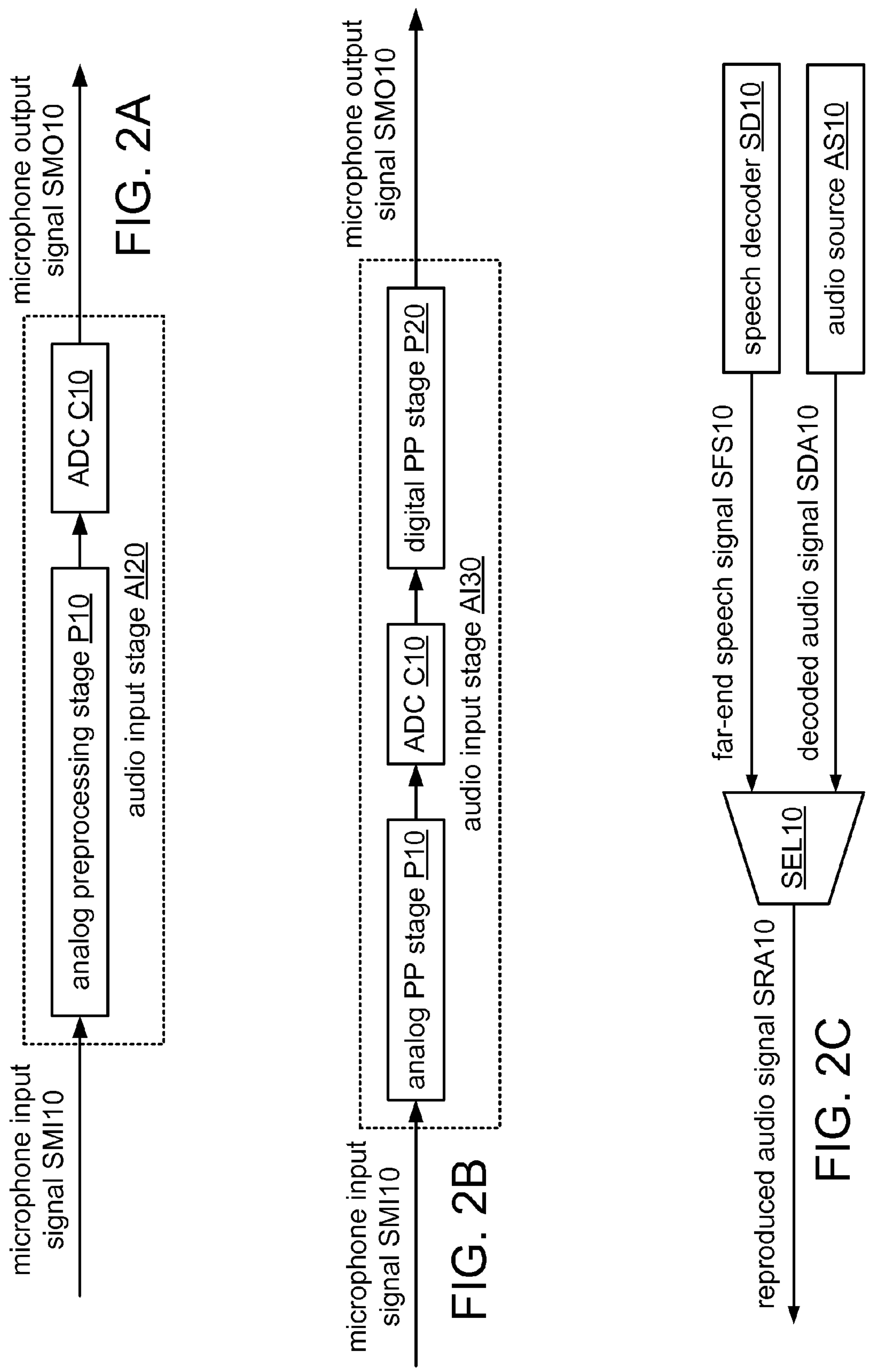
FIG. 2A shows a block diagram of an implementation AI20 of audio input stage AI10.
FIG. 2B shows a block diagram of an implementation AI30 of audio input stage AI20.
FIG. 2C shows a selector SEL10 that may be included within device D100.

Device D100 may be configured to select among and/or to mix a far-end speech signal and a decoded audio signal to produce reproduced audio signal SRA10. For example, device D100 may include a selector SEL10 as shown in FIG. 2C that is configured to produce reproduced audio signal SRA10 by selecting (e.g., according to a switch actuation by the user) from among a far-end speech signal SFS10 from a speech decoder SD10 and a decoded audio signal SDA10 from an audio source AS10. Audio source AS10, which may be included within device D100, may be configured for playback of compressed audio or audiovisual information, such as a file or stream encoded according to a standard compression format (e.g., Moving Pictures Experts Group (MPEG)-1 Audio Layer 3 (MP3), MPEG-4 Part 14 (MP4), a version of Windows Media Audio/Video (WMA/WMV) (Microsoft Corp., Redmond, Wash.), Advanced Audio Coding (AAC), International Telecommunication Union (ITU)-T H.264, or the like).

Apparatus A100 may be configured to include an automatic gain control (AGC) module that is arranged to compress the dynamic range of reproduced audio signal SRA10 upstream of equalizer EQ10. Such a module may be configured to provide a headroom definition and/or a master volume setting (e.g., to control upper and/or lower bounds of the subband gain factors). Alternatively or additionally, apparatus A100 may be configured to include a peak limiter that is configured and arranged to limit the acoustic output level of equalizer EQ10 (e.g., to limit the level of equalized audio signal SEQ10).

Apparatus A100 also includes a mixer MX10 that is configured to combine (e.g., to mix) anti-noise signal SAN10 and equalized audio signal SEQ10 to produce audio output signal SAO10. Mixer MX10 may also be configured to produce audio output signal SAO10 by converting anti-noise signal SAN10, equalized audio signal SEQ10, or a mixture of the two signals from a digital form to an analog form and/or by performing any other desired audio processing operation on such a signal (e.g., filtering, amplifying, applying a gain factor to, and/or controlling a level of such a signal).

Apparatus A100 includes an ANC module NC10 that is configured to produce an anti-noise signal SAN10 (e.g., according to any desired digital and/or analog ANC technique) based on information from error microphone signal SME10. An ANC method that is based on information from an acoustic error signal is also known as a feedback ANC method.

It may be desirable to implement ANC module NC10 as an ANC filter FC10, which is typically configured to invert the phase of the input signal (e.g., acoustic error signal SAE10) to produce anti-noise signal SA10 and may be fixed or adaptive. It is typically desirable to configure ANC filter FC10 to generate anti-noise signal SAN10 to be matched with the acoustic noise in amplitude and opposite to the acoustic noise in phase. Signal processing operations such as time delay, gain amplification, and equalization or lowpass filtering may be performed to achieve optimal noise cancellation. It may be desirable to configure ANC filter FC10 to high-pass filter the signal (e.g., to attenuate high-amplitude, low-frequency acoustic signals). Additionally or alternatively, it may be desirable to configure ANC filter FC10 to low-pass filter the signal (e.g., such that the ANC effect diminishes with frequency at high frequencies). Because anti-noise signal SAN10 should be available by the time the acoustic noise travels from the microphone to the actuator (i.e., loudspeaker LS10), the processing delay caused by ANC filter FC10 should not exceed a very short time (typically about thirty to sixty microseconds).

Examples of ANC operations that may be performed by ANC filter FC10 on acoustic error signal SAE10 to produce anti-noise signal SA10 include a phase-inverting filtering operation, a least mean squares (LMS) filtering operation, a variant or derivative of LMS (e.g., filtered-x LMS, as described in U.S. Pat. Appl. Publ. No. 2006/0069566 (Nadjar et al.) and elsewhere), an output-whitening feedback ANC method, and a digital virtual earth algorithm (e.g., as described in U.S. Pat. No. 5,105,377 (Ziegler)). ANC filter FC10 may be configured to perform the ANC operation in the time domain and/or in a transform domain (e.g., a Fourier transform or other frequency domain).

ANC filter FC10 may also be configured to perform other processing operations on acoustic error signal SAE10 (e.g., to integrate the error signal, lowpass-filter the error signal, equalize the frequency response, amplify or attenuate the gain, and/or match or minimize the delay) to produce anti-noise signal SAN10. ANC filter FC10 may be configured to produce anti-noise signal SAN10 in a pulse-density-modulation (PDM) or other high-sampling-rate domain, and/or to adapt its filter coefficients at a lower rate than the sampling rate of acoustic error signal SAE10, as described in U.S. Publ. Pat. Appl. No. 2011/0007907 (Park et al.), published Jan. 13, 2011.

ANC filter FC10 may be configured to have a filter state that is fixed over time or, alternatively, a filter state that is adaptable over time. An adaptive ANC filtering operation can typically achieve better performance over an expected range of operating conditions than a fixed ANC filtering operation. In comparison to a fixed ANC approach, for example, an adaptive ANC approach can typically achieve better noise cancellation results by responding to changes in the ambient noise and/or in the acoustic path. Such changes may include movement of device D100 (e.g., a cellular telephone handset) relative to the ear during use of the device, which may change the acoustic load by increasing or decreasing acoustic leakage.

It may be desirable for error microphone ME10 to be disposed within the acoustic field generated by loudspeaker LS10. For example, device D100 may be constructed as a feedback ANC device such that error microphone ME10 is positioned to sense the sound within a chamber that encloses the entrance of the user's ear canal and into which loudspeaker LS10 is driven. It may be desirable for error microphone ME10 to be disposed with loudspeaker LS10 within the earcup of a headphone or an eardrum-directed portion of an earbud. It may also be desirable for error microphone ME10 to be acoustically insulated from the environmental noise.

Figure 3A:
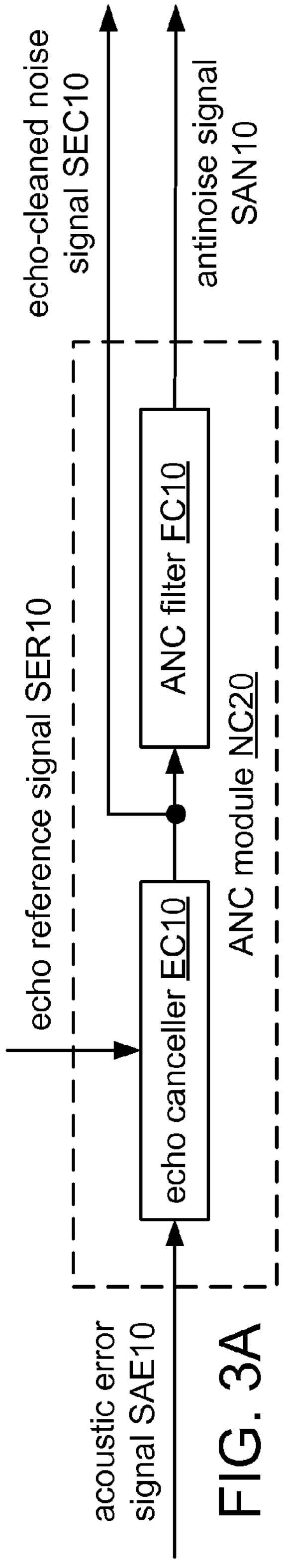
FIG. 3A shows a block diagram of an implementation NC20 of ANC module NC10.

The acoustic signal in the ear canal is likely to be dominated by the desired audio signal (e.g., the far-end or decoded audio content) being reproduced by loudspeaker LS10. It may be desirable for ANC module NC10 to include an echo canceller to cancel the acoustic coupling from loudspeaker LS10 to error microphone ME10. FIG. 3A shows a block diagram of an implementation NC20 of ANC module NC10 that includes an echo canceller EC10. Echo canceller EC10 is configured to perform an echo cancellation operation on acoustic error signal SAE10, according to an echo reference signal SER10 (e.g., equalized audio signal SEQ10), to produce an echo-cleaned noise signal SEC10. Echo canceller EC10 may be realized as a fixed filter (e.g., an IIR filter). Alternatively, echo canceller EC10 may be implemented as an adaptive filter (e.g., an FIR filter adaptive to changes in acoustic load/path/leakage).

Figure 3B:
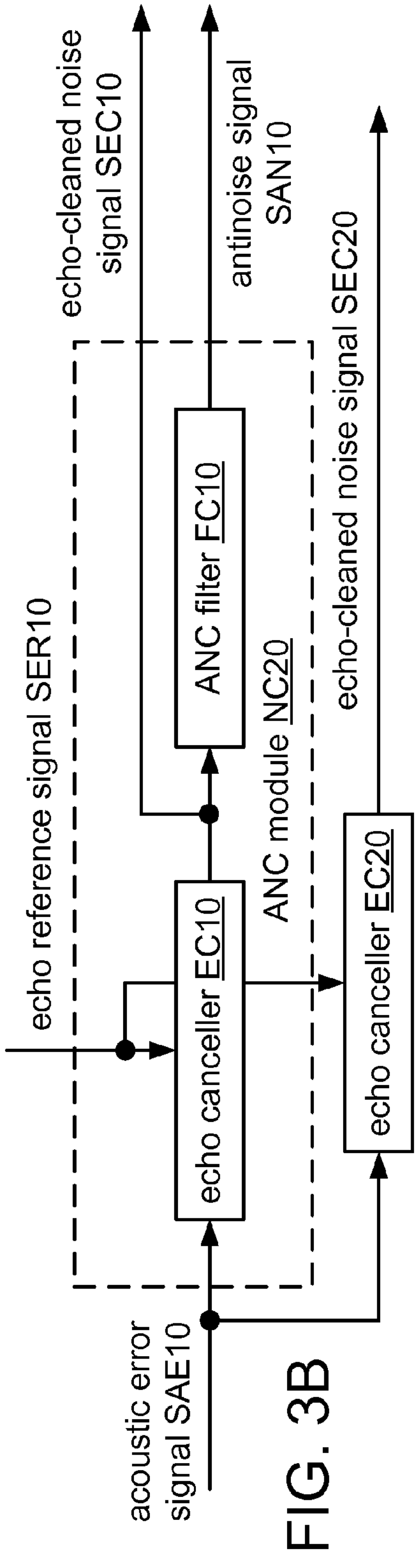
FIG. 3B shows a block diagram of an arrangement that includes ANC module NC20 and echo canceller EC20.

It may be desirable for apparatus A100 to include another echo canceller which may be adaptive and/or may be tuned more aggressively than would be suitable for the ANC operation. FIG. 3B shows a block diagram of an arrangement that includes such an echo canceller EC20, which is configured and arranged to perform an echo cancellation operation on acoustic error signal SAE10, according to echo reference signal SER10 (e.g., equalized audio signal SEQ10), to produce a second echo-cleaned signal SEC20 that may be received by equalizer EQ10 as noise estimate SNE10.

Apparatus A100 also includes an equalizer EQ10 that is configured to modify the spectrum of reproduced audio signal SRA10, based on information from noise estimate SNE10, to produce equalized audio signal SEQ10. Equalizer EQ10 may be configured to equalize signal SRA10 by boosting (or attenuating) at least one subband of signal SRA10 with respect to another subband of signal SR10, based on information from noise estimate SNE10. It may be desirable for equalizer EQ10 to remain inactive until reproduced audio signal SRA10 is available (e.g., until the user initiates or receives a telephone call, or accesses media content or a voice recognition system providing signal SRA10).

Figure 3C:
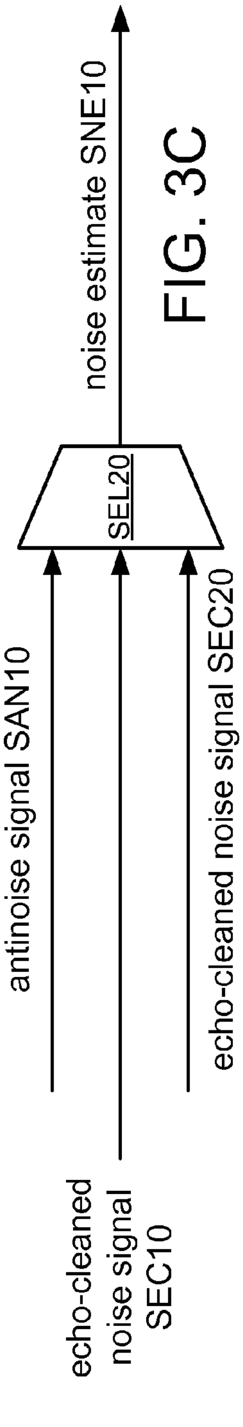
FIG. 3C shows a selector SEL20 that may be included within apparatus A100.

Equalizer EQ10 may be arranged to receive noise estimate SNE10 as any of anti-noise signal SAN10, echo-cleaned noise signal SEC10, and echo-cleaned noise signal SEC20. Apparatus A100 may be configured to include a selector SEL20 as shown in FIG. 3C (e.g., a multiplexer) to support run-time selection (e.g., based on a current value of a measure of the performance of echo canceller EC10 and/or a current value of a measure of the performance of echo canceller EC20) among two or more such noise estimates.

Figure 4:
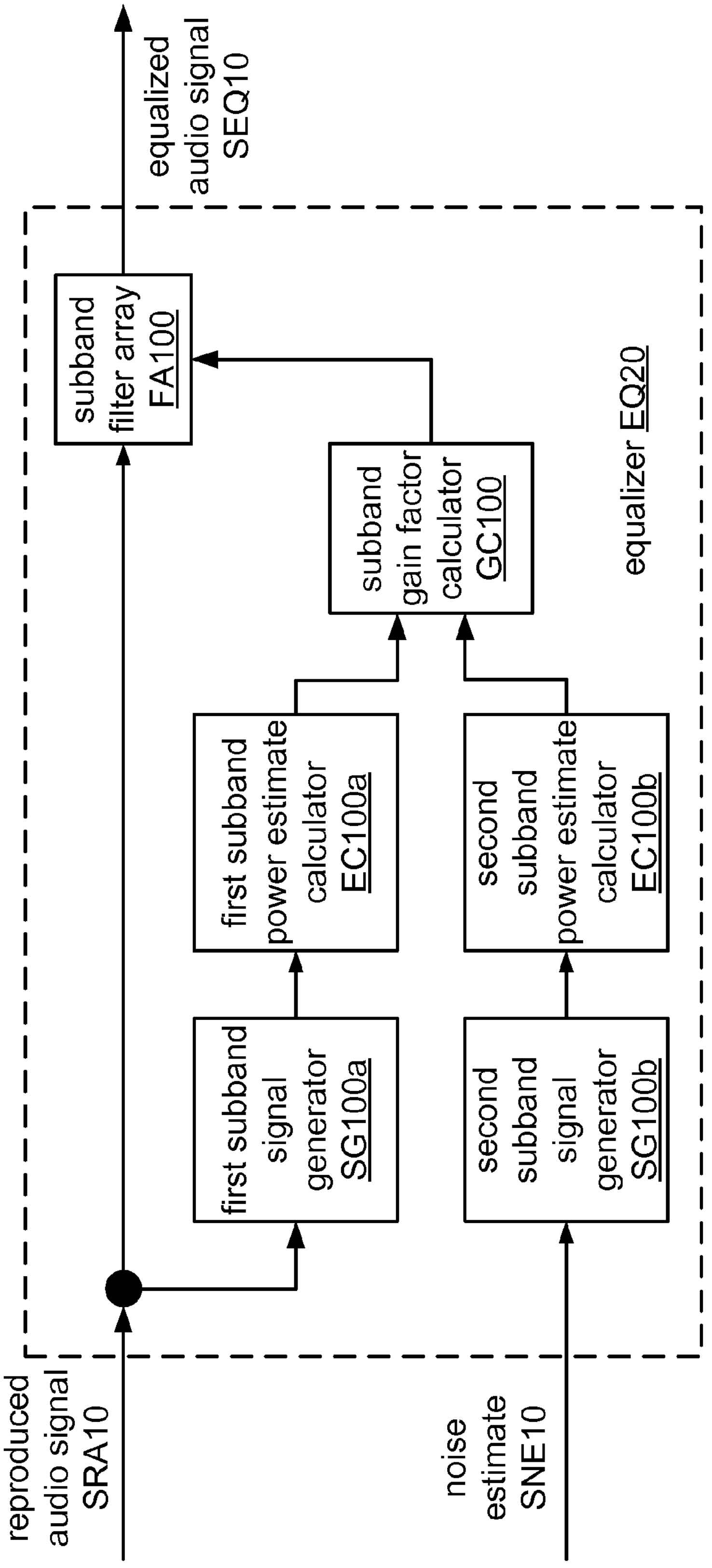
FIG. 4 shows a block diagram of an implementation EQ20 of equalizer EQ10.

FIG. 4 shows a block diagram of an implementation EQ20 of equalizer EQ10 that includes a first subband signal generator SG100*a* and a second subband signal generator SG100*b*. First subband signal generator SG100*a* is configured to produce a set of first subband signals based on information from reproduced audio signal SR10, and second subband signal generator SG100*b* is configured to produce a set of second subband signals based on information from noise estimate N10. Equalizer EQ20 also includes a first subband power estimate calculator EC100*a* and a second subband power estimate calculator EC100*a*. First subband power estimate calculator EC100*a* is configured to produce a set of first subband power estimates, each based on information from a corresponding one of the first subband signals, and second subband power estimate calculator EC100*b* is configured to produce a set of second subband power estimates, each based on information from a corresponding one of the second subband signals. Equalizer EQ20 also includes a subband gain factor calculator GC100 that is configured to calculate a gain factor for each of the subbands, based on a relation between a corresponding first subband power estimate and a corresponding second subband power estimate, and a subband filter array FA100 that is configured to filter reproduced audio signal SR10 according to the subband gain factors to produce equalized audio signal SQ10. Further examples of implementation and operation of equalizer EQ10 may be found, for example, in US Publ. Pat. Appl. No. 2010/0017205, published Jan. 21, 2010, entitled "SYSTEMS, METHODS, APPARATUS, AND COMPUTER PROGRAM PRODUCTS FOR ENHANCED INTELLIGIBILITY."

Either or both of subband signal generators SG100*a* and SG100*b* may be configured to produce a set of q subband signals by grouping bins of a frequency-domain input signal into the q subbands according to a desired subband division scheme. Alternatively, either or both of subband signal generators SG100*a* and SG100*b* may be configured to filter a time-domain input signal (e.g., using a subband filter bank) to produce a set of q subband signals according to a desired subband division scheme. The subband division scheme may be uniform, such that each bin has substantially the same width (e.g., within about ten percent). Alternatively, the subband division scheme may be nonuniform, such as a transcendental scheme (e.g., a scheme based on the Bark scale) or a logarithmic scheme (e.g., a scheme based on the Mel scale). In one example, the edges of a set of seven Bark scale subbands correspond to the frequencies 20, 300, 630, 1080, 1720, 2700, 4400, and 7700 Hz. Such an arrangement of subbands may be used in a wideband speech processing system that has a sampling rate of 16 kHz. In other examples of such a division scheme, the lower subband is omitted to obtain a six-subband arrangement and/or the high-frequency limit is increased from 7700 Hz to 8000 Hz. Another example of a subband division scheme is the four-band quasi-Bark scheme 300-510 Hz, 510-920 Hz, 920-1480 Hz, and 1480-4000 Hz. Such an arrangement of subbands may be used in a narrowband speech processing system that has a sampling rate of 8 kHz.

Each of subband power estimate calculators EC100*a* and EC100*b* is configured to receive the respective set of subband signals and to produce a corresponding set of subband power estimates (typically for each frame of reproduced audio signal SR10 and noise estimate N10). Either or both of subband power estimate calculators EC100*a* and EC100*b* may be configured to calculate each subband power estimate as a sum of the squares of the values of the corresponding subband signal for that frame. Alternatively, either or both of subband power estimate calculators EC100*a* and EC100*b* may be configured to calculate each subband power estimate as a sum of the magnitudes of the values of the corresponding subband signal for that frame.

It may be desirable to implement either or both of subband power estimate calculators EC100*a* and EC100*b* to calculate a power estimate for the entire corresponding signal for each frame (e.g., as a sum of squares or magnitudes), and to use this power estimate to normalize the subband power estimates for that frame. Such normalization may be performed by dividing each subband sum by the signal sum, or subtracting the signal sum from each subband sum. (In the case of division, it may be desirable to add a small value to the signal sum to avoid a division by zero.) Alternatively or additionally, it may be desirable to implement either of both of subband power estimate calculators EC100*a* and EC100*b* to perform a temporal smoothing operation of the subband power estimates.

Subband gain factor calculator GC100 is configured to calculate a set of gain factors for each frame of reproduced audio signal SRA10, based on the corresponding first and second subband power estimate. For example, subband gain factor calculator GC100 may be configured to calculate each gain factor as a ratio of a noise subband power estimate to the corresponding signal subband power estimate. In such case, it may be desirable to add a small value to the signal subband power estimate to avoid a division by zero.

Subband gain factor calculator GC100 may also be configured to perform a temporal smoothing operation on each of one or more (possibly all) of the power ratios. It may be desirable for this temporal smoothing operation to be configured to allow the gain factor values to change more quickly when the degree of noise is increasing and/or to inhibit rapid changes in the gain factor values when the degree of noise is decreasing. Such a configuration may help to counter a psychoacoustic temporal masking effect in which a loud noise continues to mask a desired sound even after the noise has ended. Accordingly, it may be desirable to vary the value of the smoothing factor according to a relation between the current and previous gain factor values (e.g., to perform more smoothing when the current value of the gain factor is less than the previous value, and less smoothing when the current value of the gain factor is greater than the previous value).

Alternatively or additionally, subband gain factor calculator GC100 may be configured to apply an upper bound and/or a lower bound to one or more (possibly all) of the subband gain factors. The values of each of these bounds may be fixed. Alternatively, the values of either or both of these bounds may be adapted according to, for example, a desired headroom for equalizer EQ10 and/or a current volume of equalized audio signal SEQ10 (e.g., a current user-controlled value of a volume control signal). Alternatively or additionally, the values of either or both of these bounds may be based on information from reproduced audio signal SRA10, such as a current level of reproduced audio signal SRA10.

It may be desirable to configure equalizer EQ10 to compensate for excessive boosting that may result from an overlap of subbands. For example, subband gain factor calculator GC100 may be configured to reduce the value of one or more of the mid-frequency subband gain factors (e.g., a subband that includes the frequency fs/4, where fs denotes the sampling frequency of reproduced audio signal SRA10). Such an implementation of subband gain factor calculator GC100 may be configured to perform the reduction by multiplying the current value of the subband gain factor by a scale factor having a value of less than one. Such an implementation of subband gain factor calculator GC100 may be configured to use the same scale factor for each subband gain factor to be scaled down or, alternatively, to use different scale factors for each subband gain factor to be scaled down (e.g., based on the degree of overlap of the corresponding subband with one or more adjacent subbands).

Additionally or in the alternative, it may be desirable to configure equalizer EQ10 to increase a degree of boosting of one or more of the high-frequency subbands. For example, it may be desirable to configure subband gain factor calculator GC100 to ensure that amplification of one or more high-frequency subbands of reproduced audio signal SRA10 (e.g., the highest subband) is not lower than amplification of a mid-frequency subband (e.g., a subband that includes the frequency fs/4, where fs denotes the sampling frequency of reproduced audio signal SRA10). In one such example, subband gain factor calculator GC100 is configured to calculate the current value of the subband gain factor for a high-frequency subband by multiplying the current value of the subband gain factor for a mid-frequency subband by a scale factor that is greater than one. In another such example, subband gain factor calculator GC100 is configured to calculate the current value of the subband gain factor for a high-frequency subband as the maximum of (A) a current gain factor value that is calculated from the power ratio for that subband and (B) a value obtained by multiplying the current value of the subband gain factor for a mid-frequency subband by a scale factor that is greater than one.

Figure 5A:
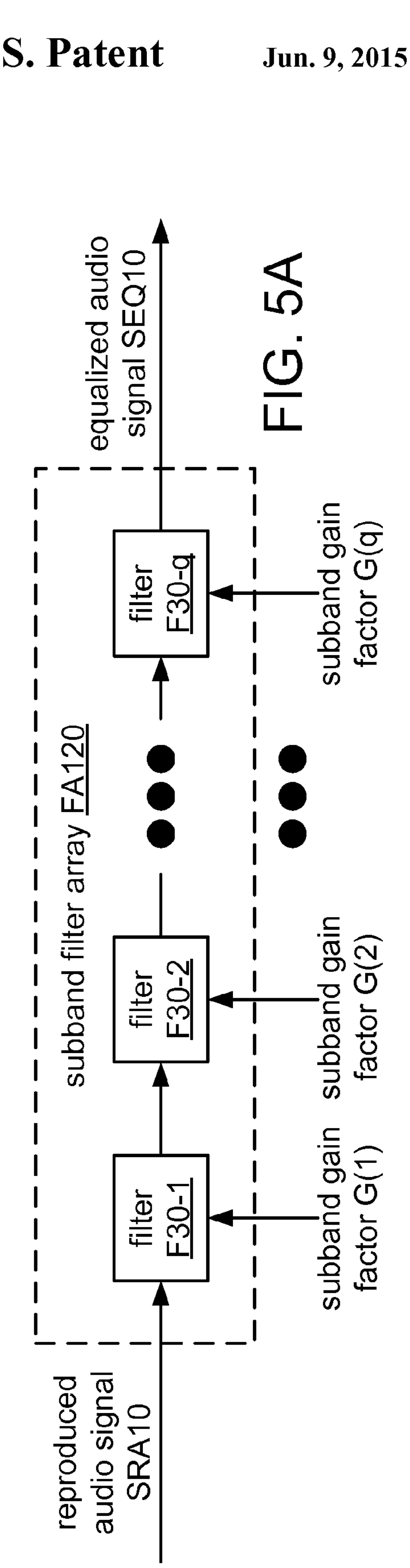
FIG. 5A shows a block diagram of an implementation FA120 of subband filter array FA100.

Subband filter array FA100 is configured to apply each of the subband gain factors to a corresponding subband of reproduced audio signal SRA10 to produce equalized audio signal SEQ10. Subband filter array FA100 may be implemented to include an array of bandpass filters, each configured to apply a respective one of the subband gain factors to a corresponding subband of reproduced audio signal SRA10. The filters of such an array may be arranged in parallel and/or in serial. FIG. 5A shows a block diagram of an implementation FA120 of subband filter array FA100 in which the bandpass filters F30-1 to F30-*q* are arranged to apply each of the subband gain factors G(1) to G(q) to a corresponding subband of reproduced audio signal SRA10 by filtering reproduced audio signal SRA10 according to the subband gain factors in serial (i.e., in a cascade, such that each filter F30-*k* is arranged to filter the output of filter F30-(*k*−1) for 2≤k≤q).

Each of the filters F30-1 to F30-*q* may be implemented to have a finite impulse response (FIR) or an infinite impulse response (IIR). For example, each of one or more (possibly all) of filters F30-1 to F30-*q* may be implemented as a second-order IIR section or "biquad". The transfer function of a biquad may be expressed as $$H(z)=\frac{b_0+b_1z^{-1}+b_2z^{-2}}{1+a_1z^{-1}+a_2z^{-2}}. \quad (1)$$

Figure 5B:
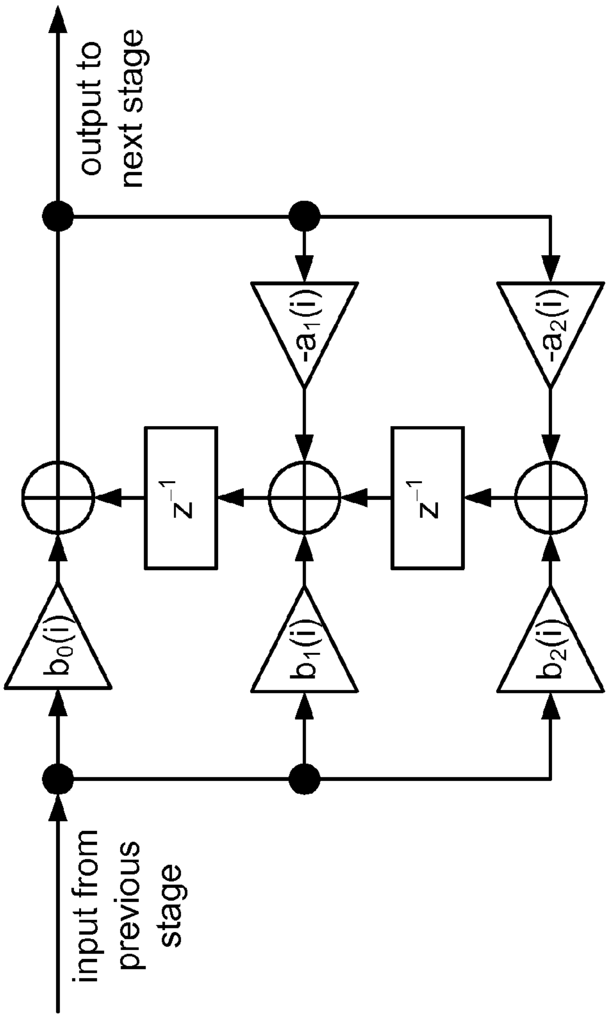
FIG. 5B illustrates a transposed direct form II structure for a biquad filter.
Figure 6:
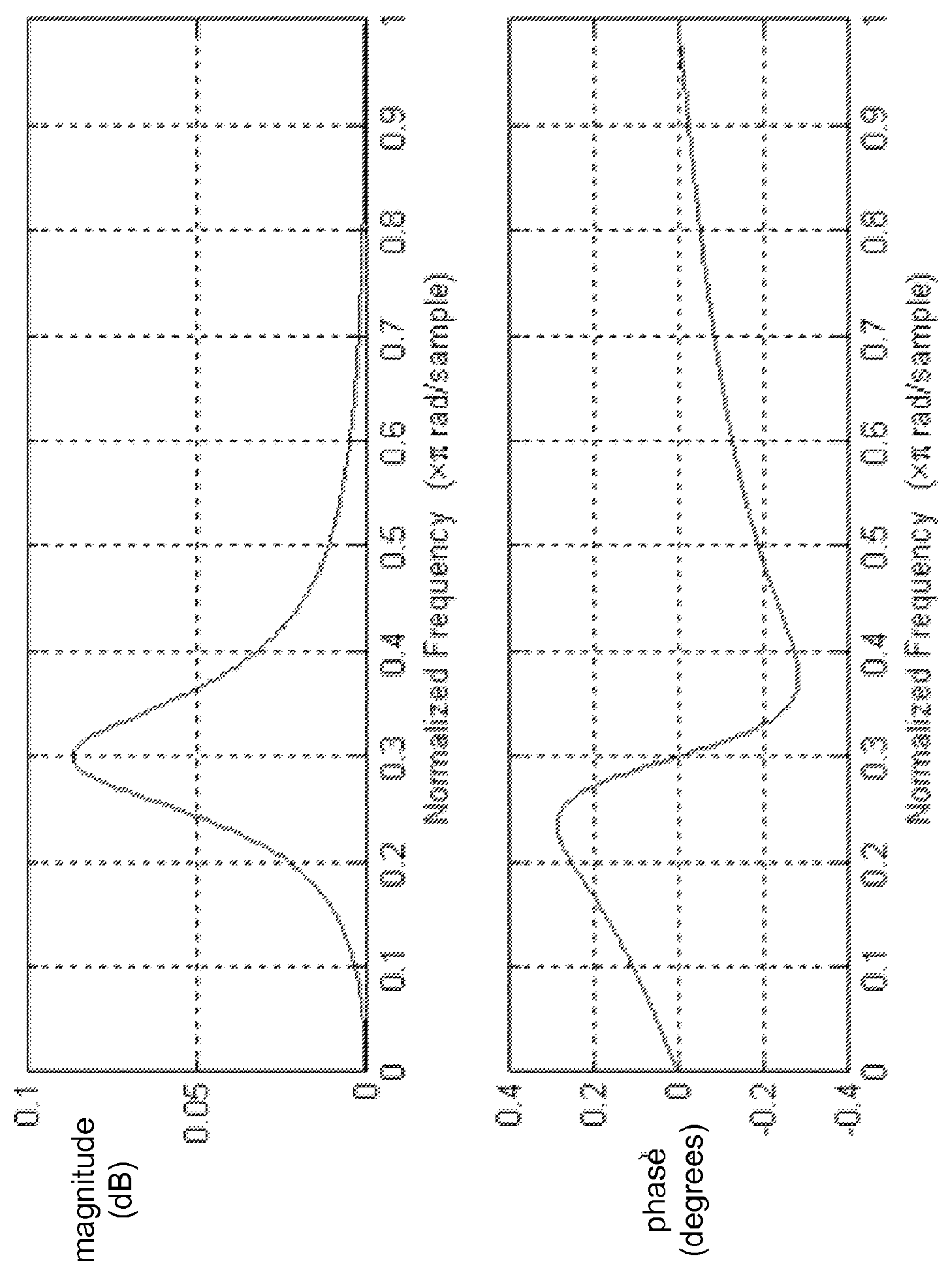
FIG. 6 shows magnitude and phase response plots for one example of a biquad filter.

It may be desirable to implement each biquad using the transposed direct form II, especially for floating-point implementations of equalizer EQ10. FIG. 5B illustrates a transposed direct form II structure for a biquad implementation of one F30-*i* of filters F30-1 to F30-*q*. FIG. 6 shows magnitude and phase response plots for one example of a biquad implementation of one of filters F30-1 to F30-*q*.

Subband filter array FA120 may be implemented as a cascade of biquads. Such an implementation may also be referred to as a biquad IIR filter cascade, a cascade of second-order IIR sections or filters, or a series of subband IIR biquads in cascade. It may be desirable to implement each biquad using the transposed direct form II, especially for floating-point implementations of equalizer EQ10.

Figure 7:
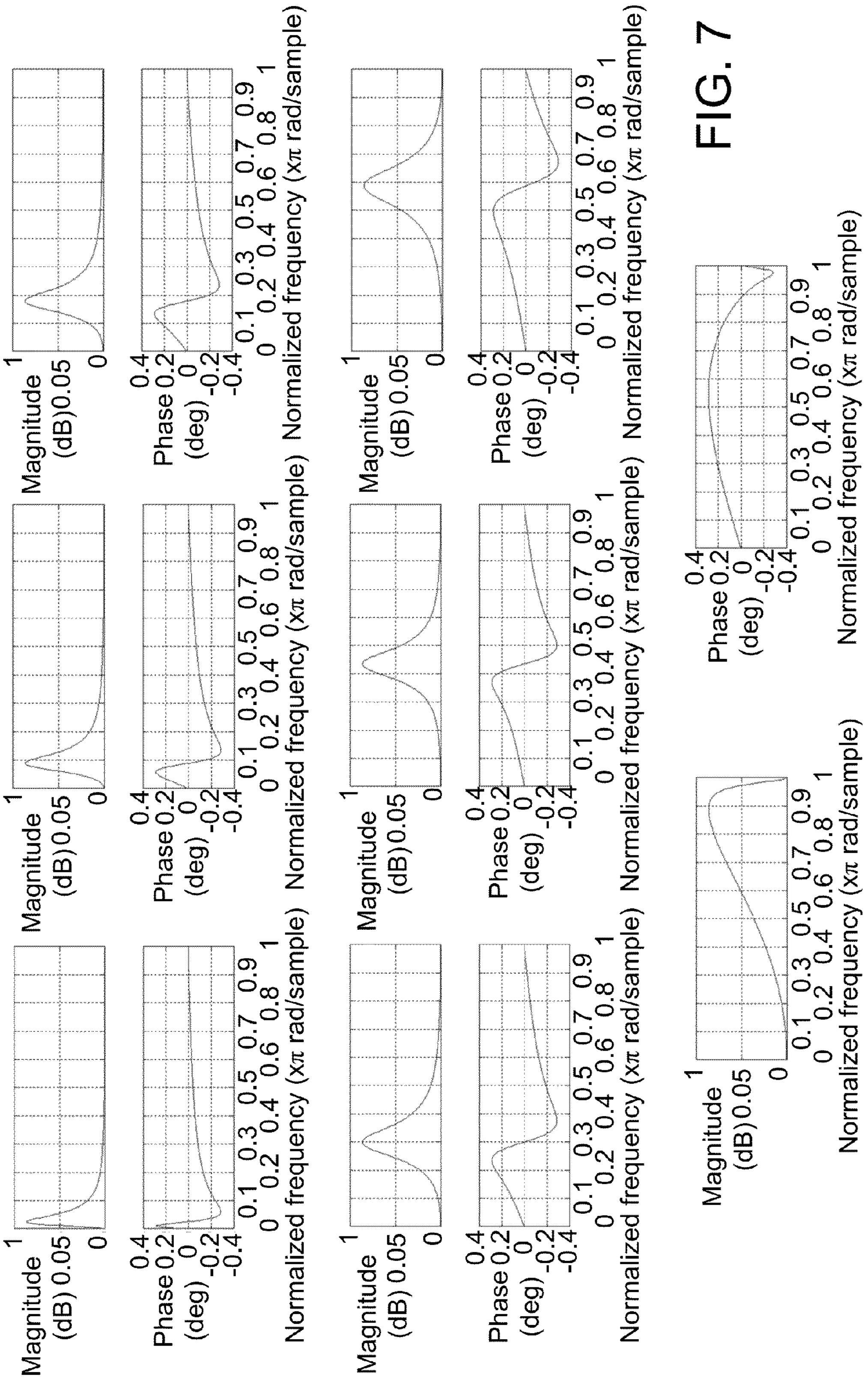
FIG. 7 shows magnitude and phase responses for each of a set of seven biquad filters.

It may be desirable for the passbands of filters F30-1 to F30-*q* to represent a division of the bandwidth of reproduced audio signal SRA10 into a set of nonuniform subbands (e.g., such that two or more of the filter passbands have different widths) rather than a set of uniform subbands (e.g., such that the filter passbands have equal widths). It may be desirable for subband filter array FA120 to apply the same subband division scheme as a subband filter bank of a time-domain implementation of first subband signal generator SG100*a* and/or a subband filter bank of a time-domain implementation of second subband signal generator SG100*b*. Subband filter array FA120 may even be implemented using the same component filters as such a subband filter bank or banks (e.g., at different times and with different gain factor values), although it is noted that the filters are typically applied to the input signal in parallel (i.e., individually) in such implementations of subband signal generators SG100*a* and SG100*b* rather than in series as in subband filter array FA120. FIG. 7 shows magnitude and phase responses for each of a set of seven biquads in an implementation of subband filter array FA120 for a Bark-scale subband division scheme as described above.

Each of the subband gain factors G(1) to G(q) may be used to update one or more filter coefficient values of a corresponding one of filters F30-1 to F30-*q* when the filters are configured as subband filter array FA120. In such case, it may be desirable to configure each of one or more (possibly all) of the filters F30-1 to F30-*q* such that its frequency characteristics (e.g., the center frequency and width of its passband) are fixed and its gain is variable. Such a technique may be implemented for an FIR or IIR filter by varying only the values of one or more of the feedforward coefficients (e.g., the coefficients $b_0$, $b_1$, and $b_2$ in biquad expression (1) above). In one example, the gain of a biquad implementation of one F30-*i* of filters F30-1 to F30-*q* is varied by adding an offset g to the feedforward coefficient $b_0$ and subtracting the same offset g from the feedforward coefficient $b_2$ to obtain the following transfer function:

$$H_i(z)=\frac{(b_0(i)+g)+b_1(i)z^{-1}+(b_2(i)-g)z^{-2}}{1+a_1(i)z^{-1}+a_2(i)z^{-2}}. \quad (2)$$

Figure 8:
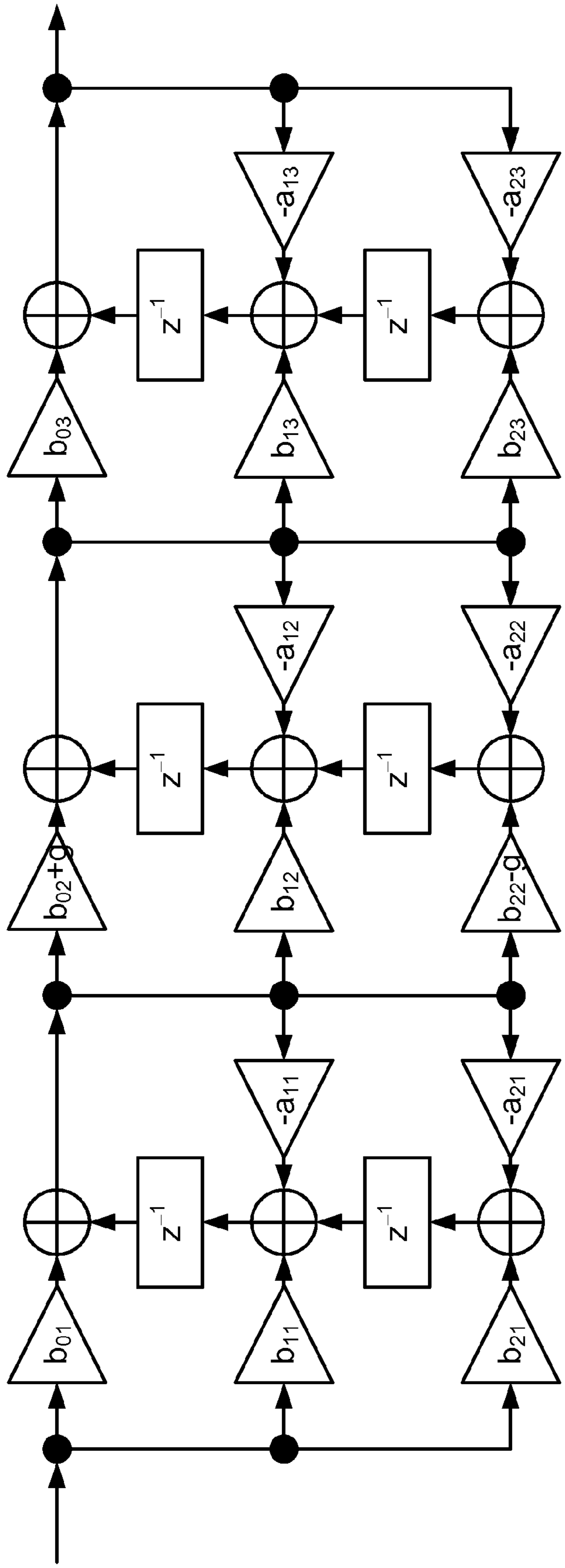
FIG. 8 shows an example of a three-stage cascade of biquad filters.

In this example, the values of $a_1$ and $a_2$ are selected to define the desired band, the values of $a_2$ and $b_2$ are equal, and $b_0$ is equal to one. The offset g may be calculated from the corresponding gain factor G(i) according to an expression such as $g=(1-a_2(i)(G(i)-1)c$, where c is a normalization factor having a value less than one that may be tuned such that the desired gain is achieved at the center of the band. FIG. 8 shows such an example of a three-stage cascade of biquads, in which an offset g is being applied to the second stage.

It may occur that insufficient headroom is available to achieve a desired boost of a subband relative to another. In such case, the desired gain relation among the subbands may be obtained equivalently by applying the desired boost in a negative direction to the other subbands (i.e., by attenuating the other subbands).

It may be desirable to configure equalizer EQ10 to pass one or more subbands of reproduced audio signal SRA10 without boosting. For example, boosting of a low-frequency subband may lead to muffling of other subbands, and it may be desirable for equalizer EQ10 to pass one or more low-frequency subbands of reproduced audio signal SRA10 (e.g., a subband that includes frequencies less than 300 Hz) without boosting.

It may be desirable to bypass equalizer EQ10, or to otherwise suspend or inhibit equalization of reproduced audio signal SRA10, during intervals in which reproduced audio signal SRA10 is inactive. In one such example, apparatus A100 is configured to include a voice activity detection operation (according to any such technique, such as spectral tilt and/or a ratio of frame energy to time-averaged energy) on reproduced audio signal SRA10 that is arranged to control equalizer EQ10 (e.g., by allowing the subband gain factor values to decay when reproduced audio signal SRA10 is inactive).

Figures 9A, 9B:
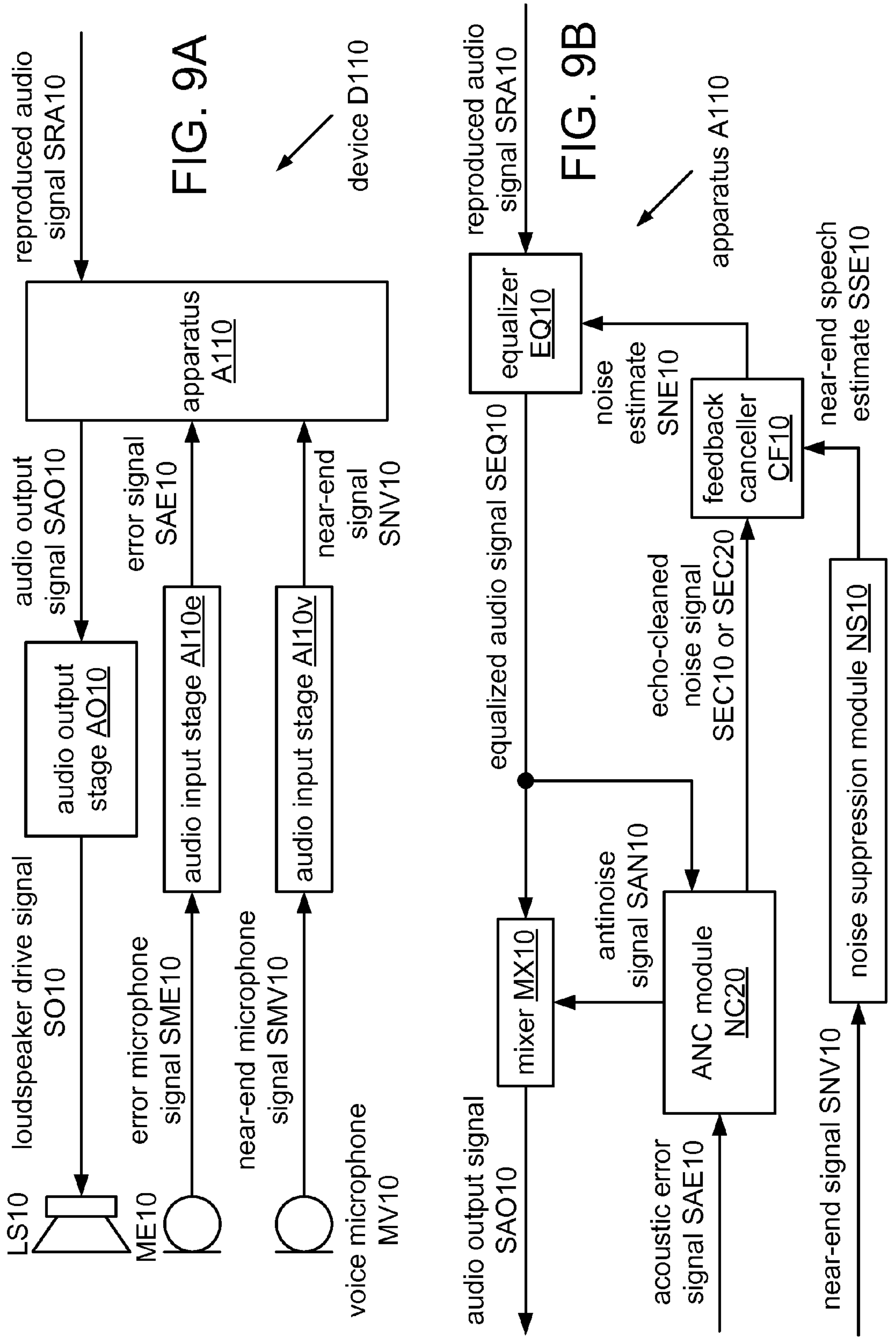
FIG. 9A shows a block diagram of an implementation D110 of device D100.
FIG. 9B shows a block diagram of an implementation A110 of apparatus A100.

FIG. 9A shows a block diagram of an implementation D110 of device D100. Device D110 includes at least one voice microphone MV10 which is configured to be directed during use of device D100 to sense a near-end speech signal (e.g., the voice of the user) and to produce a near-end microphone signal SME10 in response to the sensed near-end speech signal. FIGS. 36, 37, 38C, 38D, 39, 40B, 41A, and 41C show several examples of placements of voice microphone MV10. Device D110 also includes an instance AI10*v* of audio stage AI10 (e.g., of audio stage AI20 or AI30) that is arranged to produce a near-end signal SNV10 based on information from near-end microphone signal SMV10.

FIG. 9B shows a block diagram of an implementation A110 of apparatus A100. Apparatus A110 includes an instance of ANC module NC20 that is arranged to receive equalized audio signal SEQ10 as echo reference SER10. Apparatus A110 also includes a noise suppression module NS10 that is configured to produce a noise-suppressed signal based on information from near-end signal SNV10. Apparatus A110 also includes a feedback canceller CF10 that is configured and arranged to produce a feedback-cancelled noise signal by performing a feedback cancellation operation, according to a near-end speech estimate SSE10 that is based on information from near-end signal SNV10, on an input signal that is based on information from acoustic error signal SAE10. In this example, feedback canceller CF10 is arranged to receive echo-cleaned signal SEC10 or SEC20 as its input signal, and equalizer EQ10 is arranged to receive the feedback-cancelled noise signal as noise estimate SNE10.

Figure 10A:
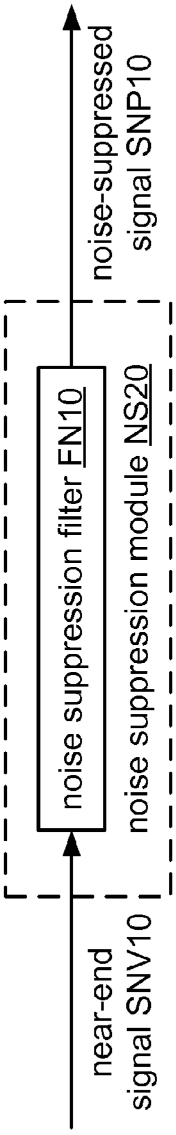
FIG. 10A shows a block diagram of an implementation NS20 of noise suppression module NS10.

FIG. 10A shows a block diagram of an implementation NS20 of noise suppression module NS10. In this example, noise suppression module NS20 is implemented as a noise suppression filter FN10 that is configured to produce a noise-suppressed signal SNP10 by performing a noise suppression operation on an input signal that is based on information from near-end signal SNV10. In one example, noise suppression filter FN10 is configured to distinguish speech frames of its input signal from noise frames of its input signal and to produce noise-suppressed signal SNP10 to include only the speech frames. Such an implementation of noise suppression filter FN10 may include a voice activity detector (VAD) that is configured to classify a frame of speech signal S40 as active (e.g., speech) or inactive (e.g., background noise or silence) based on one or more factors such as frame energy, signal-to-noise ratio (SNR), periodicity, autocorrelation of speech and/or residual (e.g., linear prediction coding residual), zero crossing rate, and/or first reflection coefficient.

Such classification may include comparing a value or magnitude of such a factor to a threshold value and/or comparing the magnitude of a change in such a factor to a threshold value. Alternatively or additionally, such classification may include comparing a value or magnitude of such a factor, such as energy, or the magnitude of a change in such a factor, in one frequency band to a like value in another frequency band. It may be desirable to implement such a VAD to perform voice activity detection based on multiple criteria (e.g., energy, zero-crossing rate, etc.) and/or a memory of recent VAD decisions. One example of such a voice activity detection operation includes comparing highband and lowband energies of the signal to respective thresholds as described, for example, in section 4.7 (pp. 4-49 to 4-57) of the 3GPP2 document C.S0014-C, v1.0, entitled "Enhanced Variable Rate Codec, Speech Service Options 3, 68, and 70 for Wideband Spread Spectrum Digital Systems," January 2007 (available online at www-dot-3gpp-dot-org).

Figure 10B:
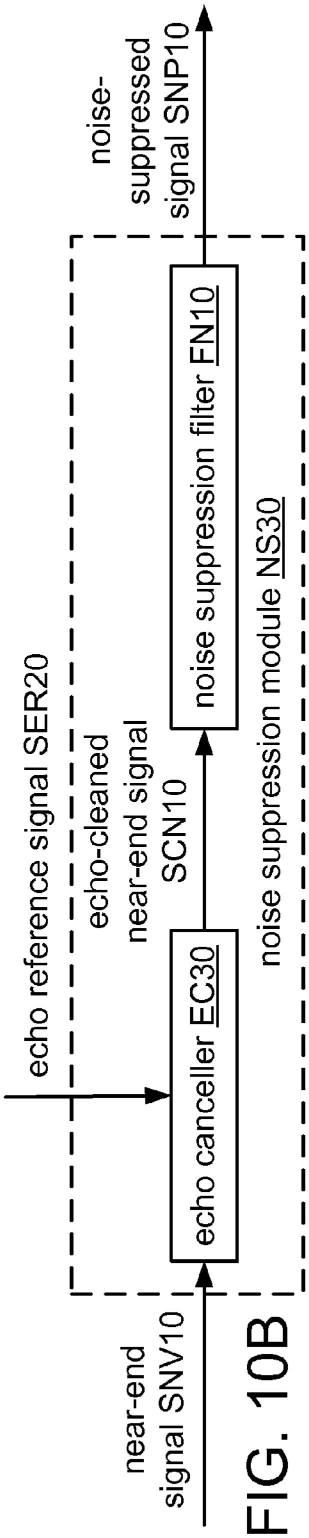
FIG. 10B shows a block diagram of an implementation NS30 of noise suppression module NS20.

It may be desirable to configure noise suppression module NS20 to include an echo canceller on near-end signal SNV10 to cancel an acoustic coupling from loudspeaker LS10 to the near-end voice microphone. Such an operation may help to avoid positive feedback with equalizer EQ10, for example. FIG. 10B shows a block diagram of such an implementation NS30 of noise suppression module NS20 that includes an echo canceller EC30. Echo canceller EC30 is configured and arranged to produce an echo-cleaned near-end signal SCN10 by performing an echo cancellation operation, according to information from an echo reference signal SER20, on an input signal that is based on information from near-end signal SNV10. Echo canceller EC30 is typically implemented as an adaptive FIR filter. In this implementation, noise suppression filter FN10 is arranged to receive echo-cleaned near-end signal SCN10 as its input signal.

Figure 10C:
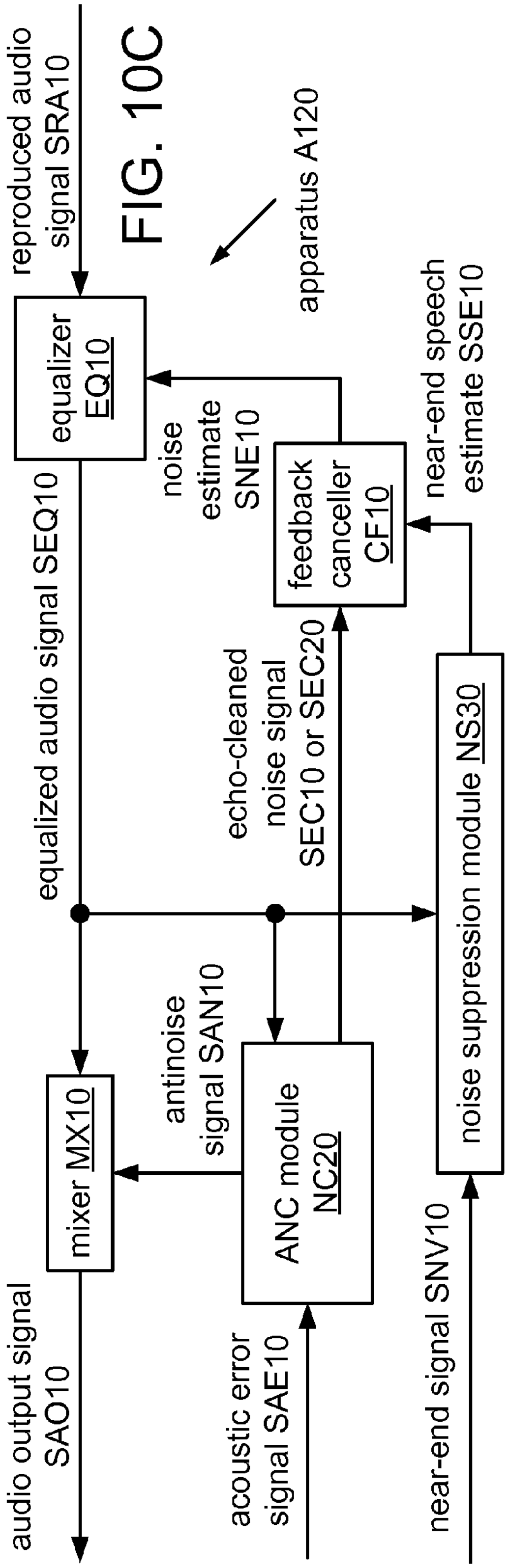
FIG. 10C shows a block diagram of an implementation A120 of apparatus A110.

FIG. 10C shows a block diagram of an implementation A120 of apparatus A110. In apparatus A120, noise suppression module NS10 is implemented as an instance of noise suppression module NS30 that is configured to receive equalized audio signal SEQ10 as echo reference signal SER20.

Feedback canceller CF10 is configured to cancel a near-end speech estimate from its input signal to obtain a noise estimate. Feedback canceller CF10 is implemented as an echo canceller structure (e.g., an LMS-based adaptive filter, such as an FIR filter) and is typically adaptive. Feedback canceller CF10 may also be configured to perform a decorrelation operation.

Figure 11A:
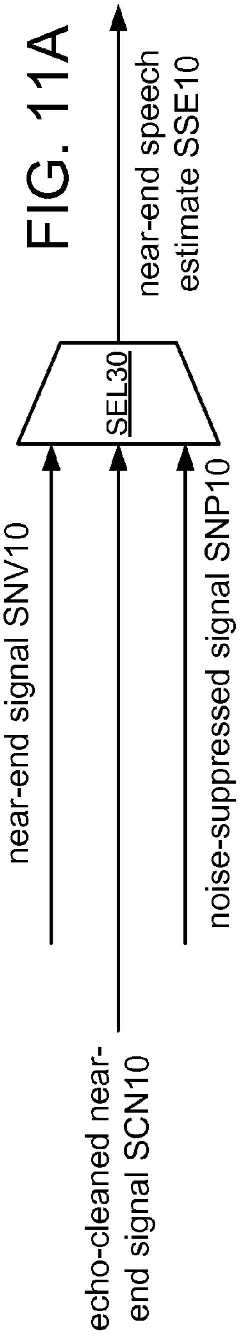
FIG. 11A shows a selector SEL30 that may be included within apparatus A110.

Feedback canceller CF10 is arranged to receive, as a control signal, a near-end speech estimate SSE10 that may be any among near-end signal SNV10, echo-cleaned near-end signal SCN10, and noise-suppressed signal SNP10. Apparatus A110 (e.g., apparatus A120) may be configured to include a multiplexer as shown in FIG. 11A to support run-time selection (e.g., based on a current value of a measure of the performance of echo canceller EC30) among two or more such near-end speech signals.

It may be desirable, in a communications application, to mix the sound of the user's own voice into the received signal that is played at the user's ear. The technique of mixing a microphone input signal into a loudspeaker output in a voice communications device, such as a headset or telephone, is called "sidetone." By permitting the user to hear her own voice, sidetone typically enhances user comfort and increases efficiency of the communication. Mixer MX10 may be configured, for example, to mix some audible amount of the user's speech (e.g., of near-end speech estimate SSE10) into audio output signal SAO10.

Figure 11B:
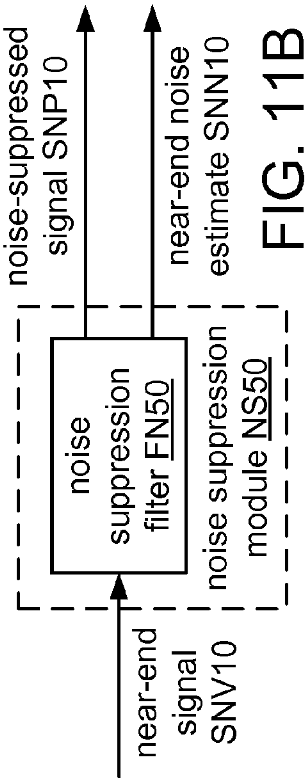
FIG. 11B shows a block diagram of an implementation NS50 of noise suppression module NS20.

It may be desirable for noise estimate SNE10 to be based on information from a noise component of near-end microphone signal SMV10. FIG. 11B shows a block diagram of an implementation NS50 of noise suppression module NS20, which includes an implementation FN50 of noise suppression filter FN10 that is configured to produce a near-end noise estimate SNN10 based on information from near-end signal SNV10.

Noise suppression filter FN50 may be configured to update near-end noise estimate SNN10 (e.g., a spectral profile of the noise component of near-end signal SNV10) based on information from noise frames. For example, noise suppression filter FN50 may be configured to calculate noise estimate SNN10 as a time-average of the noise frames in a frequency domain, such as a transform domain (e.g., an FFT domain) or a subband domain. Such updating may be performed in a frequency domain by temporally smoothing the frequency component values. For example, noise suppression filter FN50 may be configured to use a first-order IIR filter to update the previous value of each component of the noise estimate with the value of the corresponding component of the current noise segment.

Alternatively or additionally, noise suppression filter FN50 may be configured to produce near-end noise estimate SNN10 by applying minimum statistics techniques and tracking the minima (e.g., minimum power levels) of the spectrum of near-end signal SNV10 over time.

Noise suppression filter FN50 may also include a noise reduction module configured to perform a noise reduction operation on speech frames to produce noise-suppressed signal SNP10. One such example of a noise reduction module is configured to perform a spectral subtraction operation by subtracting noise estimate SNN10 from the speech frames to produce noise-suppressed signal SNP10 in the frequency domain. Another such example of a noise reduction module is configured to use noise estimate SNN10 to perform a Wiener filtering operation on the speech frames to produce noise-suppressed signal SNP10.

Further examples of post-processing operations (e.g., residual noise suppression, noise estimate combination) that may be used within noise suppression filter FN50 are described in U.S. Pat. Appl. No. 61/406,382 (Shin et al., filed Oct. 25, 2010). FIG. 11D shows a block diagram of an implementation NS60 of noise suppression modules NS30 and N550.

During a use of an ANC device as described herein (e.g., device D100), the device is worn or held such that loudspeaker LS10 is positioned in front of and directed at the entrance of the user's ear canal. Consequently, the device itself may be expected to block some of the ambient noise from reaching the user's eardrum. This noise-blocking effect is also called "passive noise cancellation."

It may be desirable to arrange equalizer EQ10 to perform an equalization operation on reproduced audio signal SRA10 that is based on a near-end noise estimate. This near-end noise estimate may be based on information from an external microphone signal, such as near-end microphone signal SMV10. As a result of passive and/or active noise cancellation, however, the spectrum of such a near-end noise estimate may be expected to differ from the spectrum of the actual noise that the user experiences in response to the same stimulus. Such differences may be expected to reduce the effectiveness of the equalization operation.

Figure 12A:
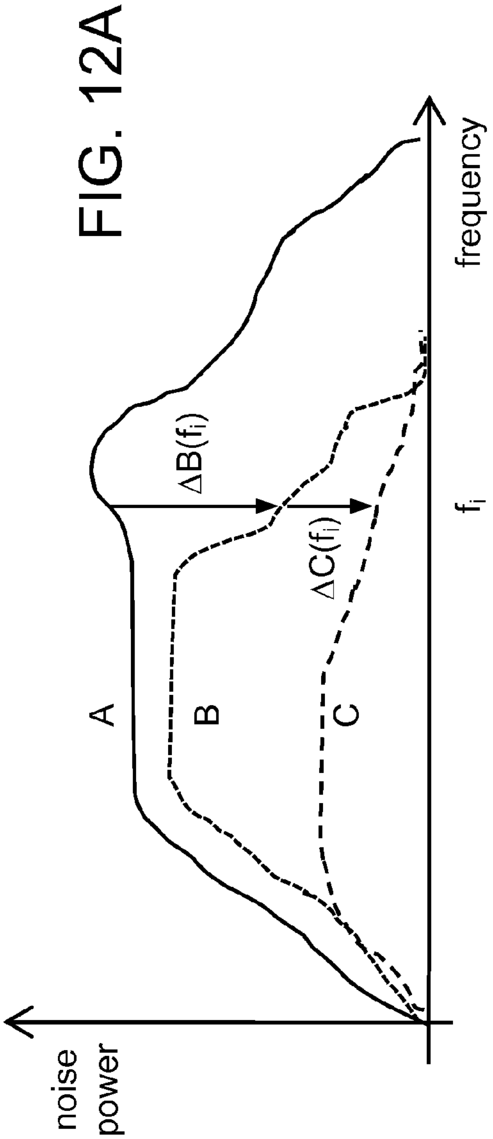
FIG. 12A shows a plot of noise power versus frequency.

FIG. 12A shows a plot of noise power versus frequency, for an arbitrarily selected time interval during use of device D100, that shows examples of three different curves A, B, and C. Curve A shows the estimated noise power spectrum as sensed by near-end microphone SMV10 (e.g., as indicated by near-end noise estimate SNN10). Curve B shows the actual noise power spectrum at an ear reference point ERP located at the entrance of the user's ear canal, which is reduced relative to curve A as a result of passive noise cancellation. Curve C shows the actual noise power spectrum at ear reference point ERP in the presence of active noise cancellation, which is further reduced relative to curve B. For example, if curve A indicates that the external noise power level at 1 kHz is 10 dB, and curve B indicates that the error signal noise power level at 1 kHz is 4 dB, it may be assumed that the noise power at 1 kHz at ERP is attenuated by 6 dB (e.g., due to blockage).

Information from error microphone signal SME10 can be used to monitor the spectrum of the received signal in the coupling area of the earpiece (e.g., the location at which loudspeaker LS10 delivers its acoustic signal into the user's ear canal, or the area where the earpiece meets the user's ear canal) in real time. It may be assumed that this signal offers a close approximation to the sound field at an ear reference point ERP located at the entrance of the user's ear canal (e.g., to curve B or C, depending on the state of ANC activity). Such information may be used to estimate the noise power spectrum directly (e.g., as described herein with reference to apparatus A110 and A120). Such information may also be used indirectly to modify the spectrum of a near-end noise estimate according to the monitored spectrum at ear reference point ERP. Using the monitored spectrum to estimate curves B and C in FIG. 12A, for example, it may be desirable to adjust near-end noise estimate SNN10 according to the distance between curves A and B when ANC module NC20 is inactive, or between curves A and C when ANC module NC20 is active, to obtain a more accurate near-end noise estimate for the equalization.

Figure 11C:
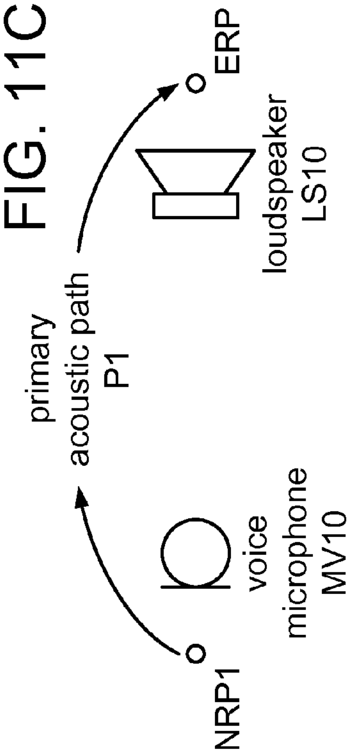
FIG. 11C shows a diagram of a primary acoustic path P1 from noise reference point NRP1 to ear reference point ERP.
Figure 11D:
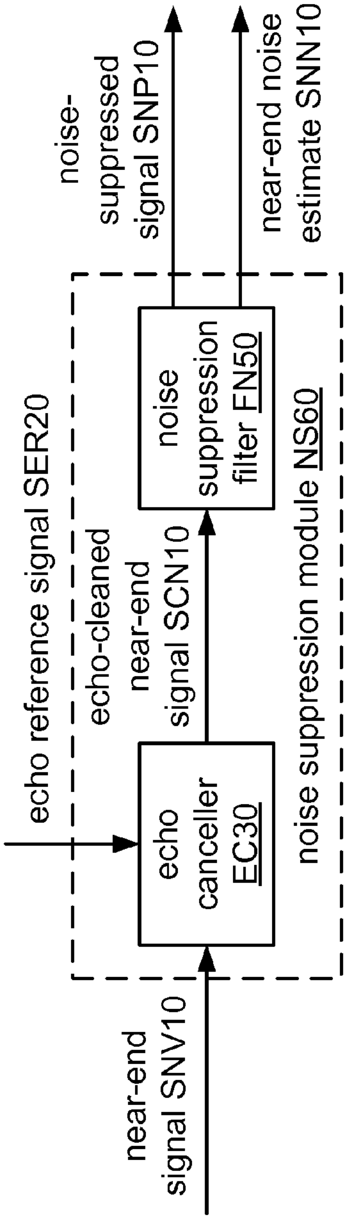
FIG. 11D shows a block diagram of an implementation NS60 of noise suppression modules NS30 and NS50.

The primary acoustic path P1 that gives rise to the differences between curves A and B and between curves A and C is pictured in FIG. 11C as a path from a noise reference path NRP1, which is located at the sensing surface of voice microphone MV10, to ear reference point ERP. It may be desirable to configure an implementation of apparatus A100 to obtain noise estimate SNE10 from near-end noise estimate SNN10 by applying an estimate of primary acoustic path P1 to noise estimate SNN10. Such compensation may be expected to produce a near-end noise estimate that indicates more accurately the actual noise power levels at ear reference point ERP.

It may be desirable to model primary acoustic path P1 as a linear transfer function. A fixed state of this transfer function may be estimated offline by comparing the responses of microphones MV10 and ME10 in the presence of an acoustic noise signal during a simulated use of the device D100 (e.g., while it is held at the ear of a simulated user, such as a Head and Torso Simulator (HATS), Bruel and Kjaer, DK). Such an offline procedure may also be used to obtain an initial state of the transfer function for an adaptive implementation of the transfer function. Primary acoustic path P1 may also be modeled as a nonlinear transfer function.

It may be desirable to use information from error microphone signal SME10 to modify near-end noise estimate SNN10 during use of device D100 by a user. The primary acoustic path P1 may change during use, for example, due to changes in acoustic load and leakage which may result from movement of the device (especially for a handset held to the user's ear). Estimation of the transfer function may be performed using adaptive compensation to cope with such variation in the acoustic load, which can have a significant impact in the perceived frequency response of the receive path.

Figure 12B:
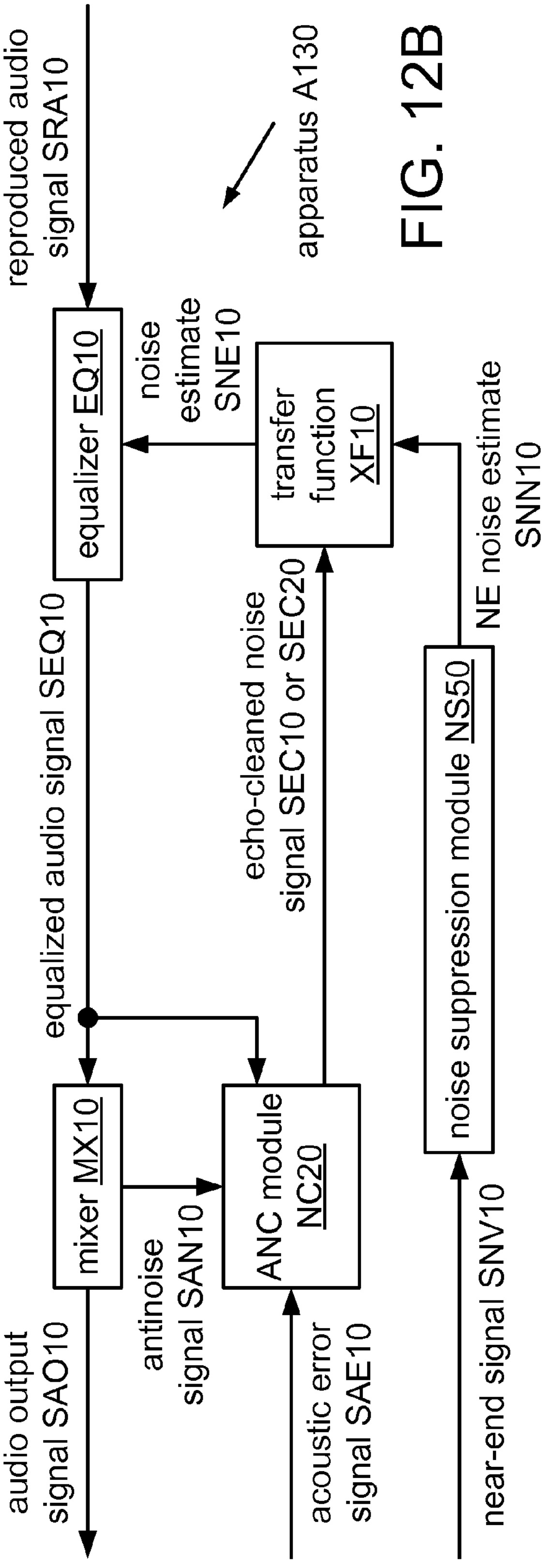
FIG. 12B shows a block diagram of an implementation A130 of apparatus A100.

FIG. 12B shows a block diagram of an implementation A130 of apparatus A100 that includes an instance of noise suppression module NS50 (or NS60) that is configured to produce near-end noise estimate SNN10. Apparatus A130 also includes a transfer function XF10 that is configured to filter a noise estimate input to produce a filtered noise estimate output. Transfer function XF10 is implemented as an adaptive filter that is configured to perform the filtering operation according to a control signal that is based on information from acoustic error signal SAE10. In this example, transfer function XF10 is arranged to filter an input signal that is based on information from near-end signal SNV10 (e.g., near-end noise estimate SNN10), according to information from echo-cleaned noise signal SEC10 or SEC20, to produce the filtered noise estimate, and equalizer EQ10 is arranged to receive the filtered noise estimate as noise estimate SNE10.

Figures 13A, 13B:
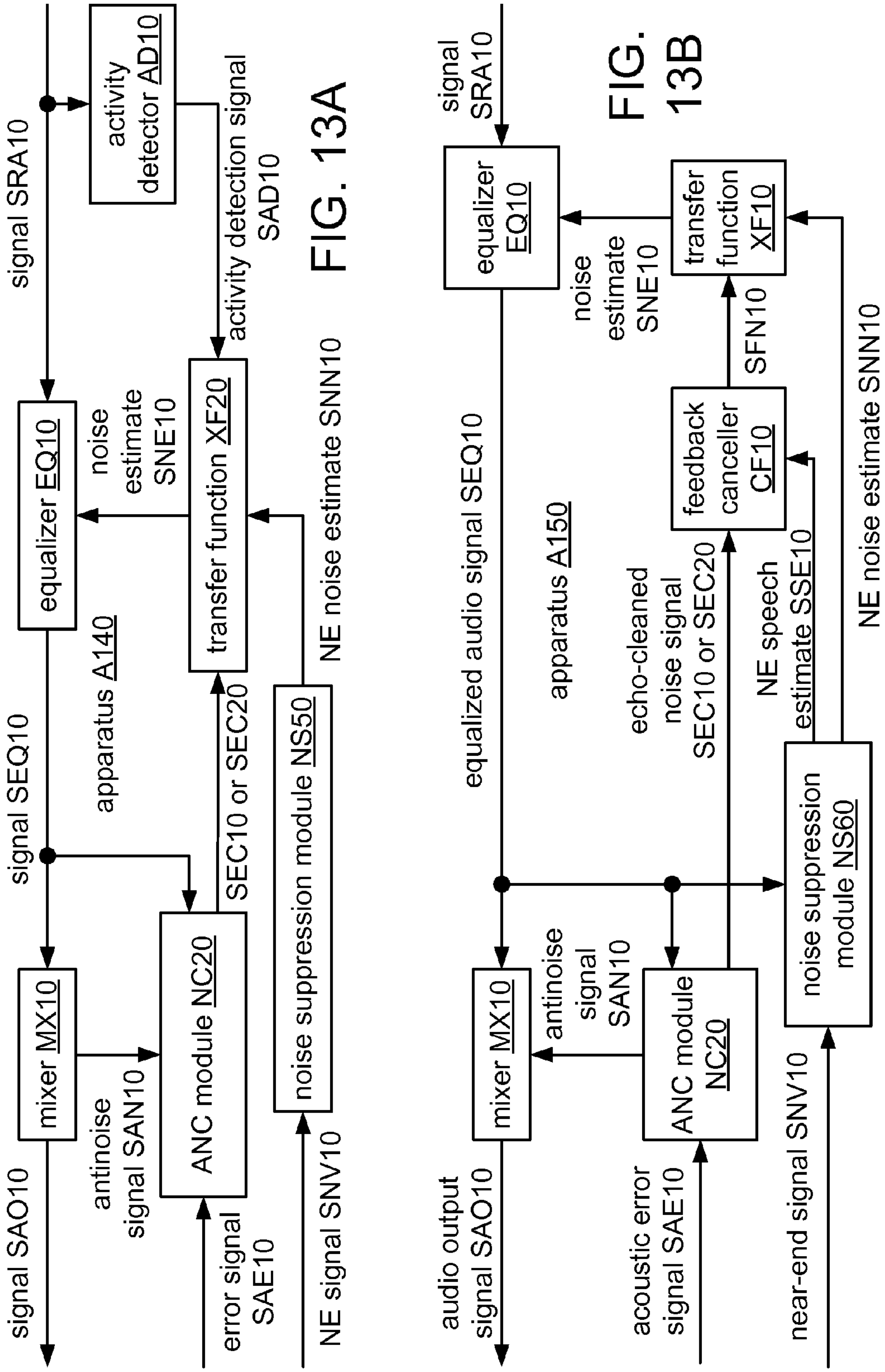
FIG. 13A shows a block diagram of an implementation A140 of apparatus A130.
FIG. 13B shows a block diagram of an implementation A150 of apparatus A120 and A130.

It may be difficult to obtain accurate information regarding primary acoustic path P1 from acoustic error signal SAE10 during intervals when reproduced audio signal SRA10 is active. Consequently, it may be desirable to inhibit transfer function XF10 from adapting (e.g., from updating its filter coefficients) during these intervals. FIG. 13A shows a block diagram of an implementation A140 of apparatus A130 that includes an instance of noise suppression module NS50 (or NS60), an implementation XF20 of transfer function XF10, and an activity detector AD10.

Activity detector AD10 is configured to produce an activity detection signal SAD10 whose state indicates a level of audio activity on a monitored signal input. In one example, activity detection signal SAD10 has a first state (e.g., on, one, high, enable) if the energy of the current frame of the monitored signal is below (alternatively, not greater than) a threshold value, and a second state (e.g., off, zero, low, disable) otherwise. The threshold value may be a fixed value or an adaptive value (e.g., based on a time-averaged energy of the monitored signal).

In the example of FIG. 13A, activity detector AD10 is arranged to monitor reproduced audio signal SRA10. In an alternative example, activity detector AD10 is arranged within apparatus A140 such that the state of activity detection signal SAD10 indicates a level of audio activity on equalized audio signal SEQ10. Transfer function XF20 is configured to enable or inhibit adaptation in response to the state of activity detection signal SAD10.

FIG. 13B shows a block diagram of an implementation A150 of apparatus A120 and A130 that includes instances of noise suppression module NS60 (or NS50) and transfer function XF10. Apparatus A150 may also be implemented as an implementation of apparatus A140 such that transfer function XF10 is replaced with an instance of transfer function XF20 and an instance of activity detector AD10 that are configured and arranged as described herein with reference to apparatus A140.

The acoustic noise in a typical environment may include babble noise, airport noise, street noise, voices of competing talkers, and/or sounds from interfering sources (e.g., a TV set or radio). Consequently, such noise is typically nonstationary and may have an average spectrum is close to that of the user's own voice. A near-end noise estimate that is based on information from only one voice microphone, however, is usually only an approximate stationary noise estimate. Moreover, computation of a single-channel noise estimate generally entails a noise power estimation delay, such that corresponding gain adjustment to the noise estimate can only be performed after a significant delay. It may be desirable to obtain a reliable and contemporaneous estimate of the environmental noise.

A multichannel signal (e.g., a dual-channel or stereophonic signal), in which each channel is based on a signal produced by a corresponding one of an array of two or more microphones, typically contains information regarding source direction and/or proximity that may be used for voice activity detection. Such a multichannel VAD operation may be based on direction of arrival (DOA), for example, by distinguishing segments that contain directional sound arriving from a particular directional range (e.g., the direction of a desired sound source, such as the user's mouth) from segments that contain diffuse sound or directional sound arriving from other directions.

Figures 14A, 14B:
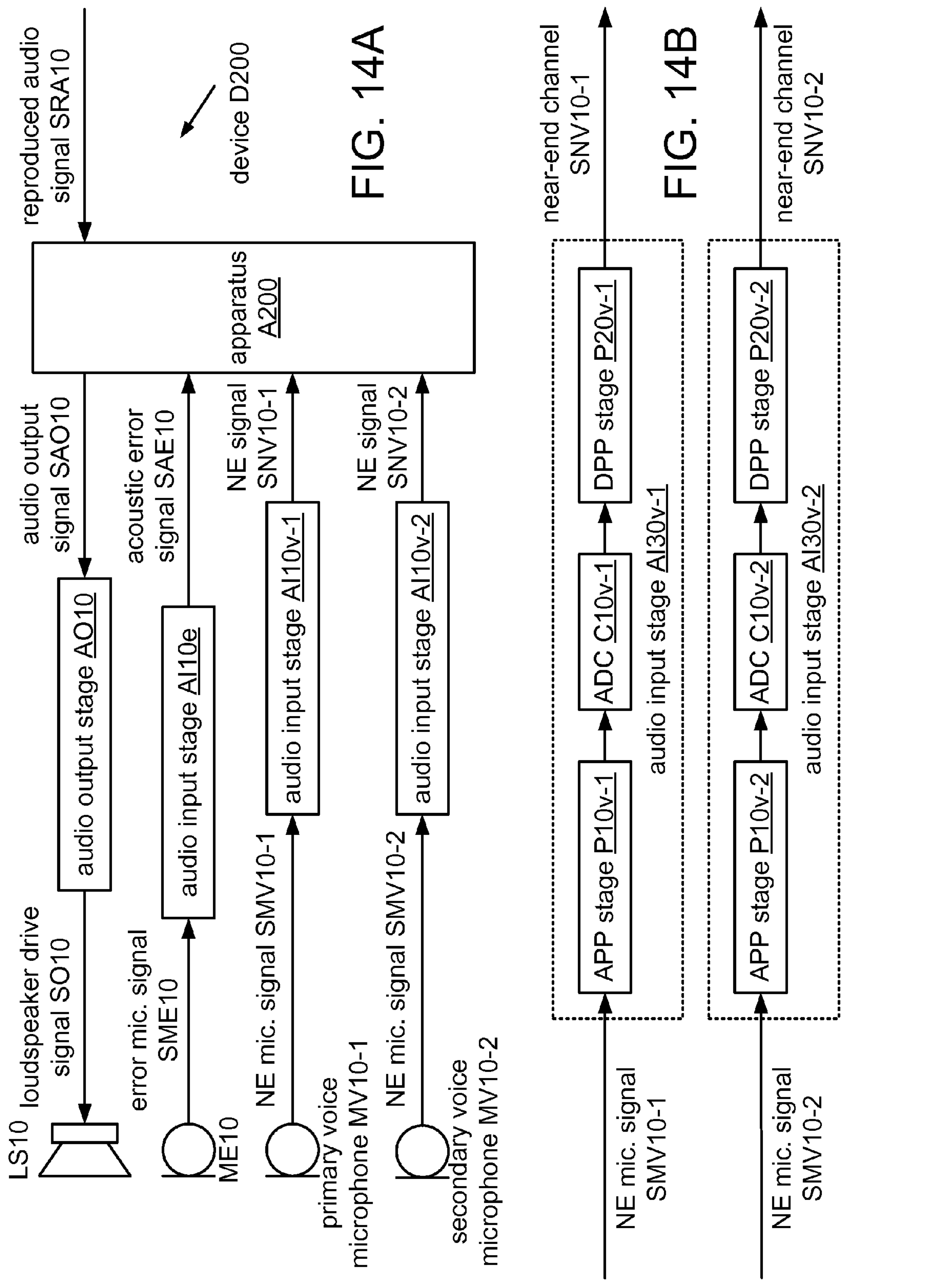
FIG. 14A shows a block diagram of a multichannel implementation D200 of device D100.
FIG. 14B shows an arrangement of multiple instances AI30*v*-1, AI30*v*-2 of audio input stage AI30.

FIG. 14A shows a block diagram of a multichannel implementation D200 of device D110 that includes primary and secondary instances MV10-1 and MV10-2, respectively, of voice microphone MV10. Device D200 is configured such that primary voice microphone MV10-1 is disposed, during a typical use of the device, to produce a signal having a higher signal-to-noise ratio (for example, to be closer to the user's mouth and/or oriented more directly toward the user's mouth) than secondary voice microphone MV10-2. Audio input stages AI10*v*-1 and AI10*v*-2 may be implemented as instances of audio stage AI20 or (as shown in FIG. 14B) AI30 as described herein.

Each instance of voice microphone MV10 may have a response that is omnidirectional, bidirectional, or unidirectional (e.g., cardioid). The various types of microphones that may be used for each instance of voice microphone MV10 include (without limitation) piezoelectric microphones, dynamic microphones, and electret microphones.

It may be desirable to locate the voice microphone or microphones MV10 as far away from loudspeaker LS10 as possible (e.g., to reduce acoustic coupling). Also, it may be desirable to locate at least one of the voice microphone or microphones MV10 to be exposed to external noise. It may be desirable to locate error microphone ME10 as close to the ear canal as possible, perhaps even in the ear canal.

In a device for portable voice communications, such as a handset or headset, the center-to-center spacing between adjacent instances of voice microphone MV10 is typically in the range of from about 1.5 cm to about 4.5 cm, although a larger spacing (e.g., up to 10 or 15 cm) is also possible in a device such as a handset. In a hearing aid, the center-to-center spacing between adjacent instances of voice microphone MV10 may be as little as about 4 or 5 mm. The various instances of voice microphone MV10 may be arranged along a line or, alternatively, such that their centers lie at the vertices of a two-dimensional (e.g., triangular) or three-dimensional shape.

During the operation of a multi-microphone adaptive equalization device as described herein (e.g., device D200), the instances of voice microphone MV10 produce a multichannel signal in which each channel is based on the response of a corresponding one of the microphones to the acoustic environment. One microphone may receive a particular sound more directly than another microphone, such that the corresponding channels differ from one another to provide collectively a more complete representation of the acoustic environment than can be captured using a single microphone.

Figures 15A, 15B, 15C:
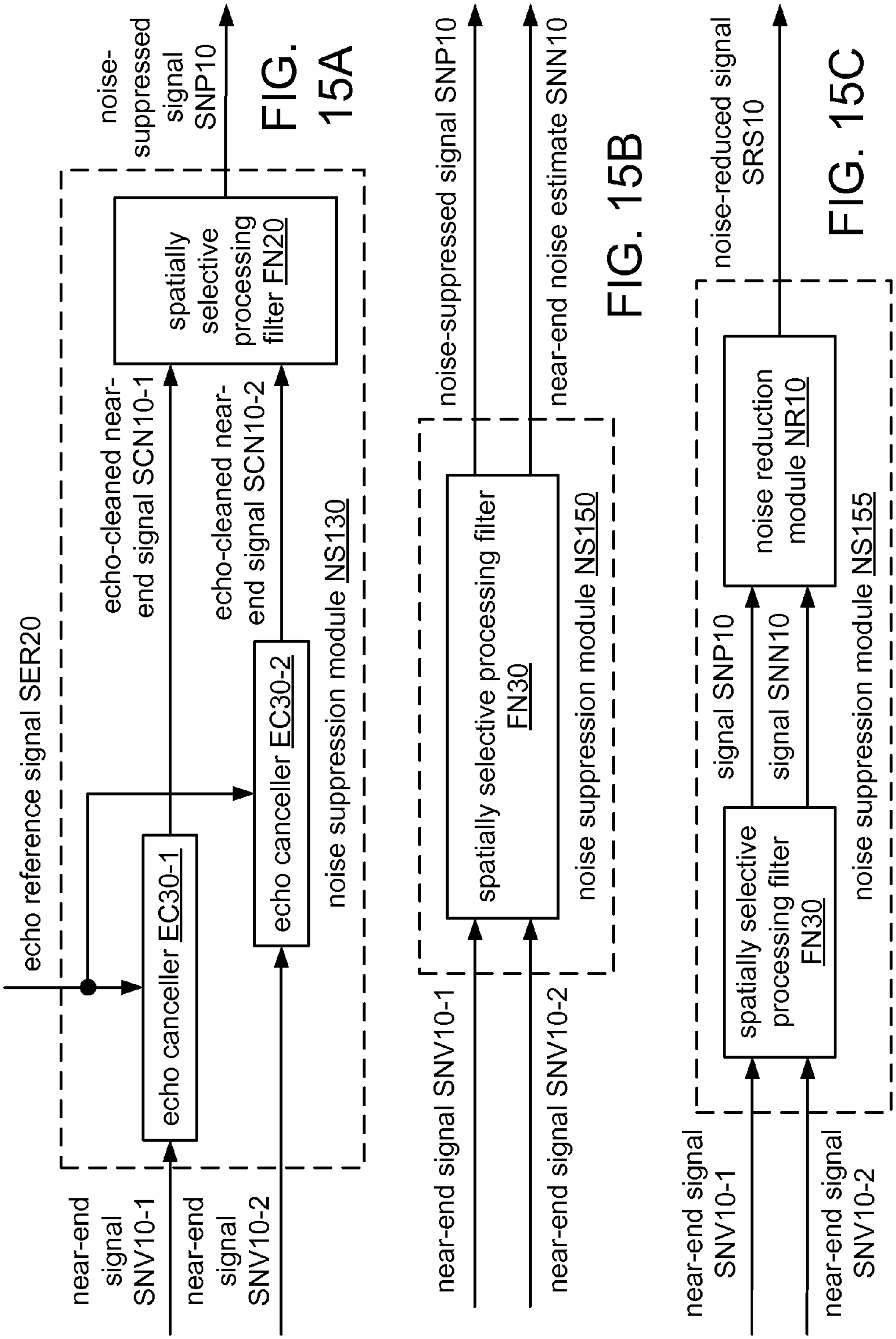
FIG. 15A shows a block diagram of a multichannel implementation NS130 of noise suppression module NS30.
FIG. 15B shows a block diagram of an implementation NS150 of noise suppression module NS50.
FIG. 15C shows a block diagram of an implementation NS155 of noise suppression module NS150.

Apparatus A200 may be implemented as an instance of apparatus A110 or A120 in which noise suppression module NS10 is implemented as a spatially selective processing filter FN20. Filter FN20 is configured to perform a spatially selective processing operation (e.g., a directionally selective processing operation) on an input multichannel signal (e.g., signals SNV10-1 and SNV10-2) to produce noise-suppressed signal SNP10. Examples of such a spatially selective processing operation include beamforming, blind source separation (BSS), phase-difference-based processing, and gain-difference-based processing (e.g., as described herein). FIG. 15A shows a block diagram of a multichannel implementation NS130 of noise suppression module NS30 in which noise suppression filter FN10 is implemented as spatially selective processing filter FN20.

Spatially selective processing filter FN20 may be configured to process each input signal as a series of segments. Typical segment lengths range from about five or ten milliseconds to about forty or fifty milliseconds, and the segments may be overlapping (e.g., with adjacent segments overlapping by 25% or 50%) or nonoverlapping. In one particular example, each input signal is divided into a series of nonoverlapping segments or "frames", each having a length of ten milliseconds. Another element or operation of apparatus A200 (e.g., ANC module NC10 and/or equalizer EQ10) may also be configured to process its input signal as a series of segments, using the same segment length or using a different segment length. The energy of a segment may be calculated as the sum of the squares of the values of its samples in the time domain.

Spatially selective processing filter FN20 may be implemented to include a fixed filter that is characterized by one or more matrices of filter coefficient values. These filter coefficient values may be obtained using a beamforming, blind source separation (BSS), or combined BSS/beamforming method. Spatially selective processing filter FN20 may also be implemented to include more than one stage. Each of these stages may be based on a corresponding adaptive filter structure, whose coefficient values may be calculated using a learning rule derived from a source separation algorithm. The filter structure may include feedforward and/or feedback coefficients and may be a finite-impulse-response (FIR) or infinite-impulse-response (IIR) design. For example, filter FN20 may be implemented to include a fixed filter stage (e.g., a trained filter stage whose coefficients are fixed before run-time) followed by an adaptive filter stage. In such case, it may be desirable to use the fixed filter stage to generate initial conditions for the adaptive filter stage. It may also be desirable to perform adaptive scaling of the inputs to filter FN20 (e.g., to ensure stability of an IIR fixed or adaptive filter bank). It may be desirable to implement spatially selective processing filter FN20 to include multiple fixed filter stages, arranged such that an appropriate one of the fixed filter stages may be selected during operation (e.g., according to the relative separation performance of the various fixed filter stages).

The term "beamforming" refers to a class of techniques that may be used for directional processing of a multichannel signal received from a microphone array. Beamforming techniques use the time difference between channels that results from the spatial diversity of the microphones to enhance a component of the signal that arrives from a particular direction. More particularly, it is likely that one of the microphones will be oriented more directly at the desired source (e.g., the user's mouth), whereas the other microphone may generate a signal from this source that is relatively attenuated. These beamforming techniques are methods for spatial filtering that steer a beam towards a sound source, putting a null at the other directions. Beamforming techniques make no assumption on the sound source but assume that the geometry between source and sensors, or the sound signal itself, is known for the purpose of dereverberating the signal or localizing the sound source. The filter coefficient values of a beamforming filter may be calculated according to a data-dependent or data-independent beamformer design (e.g., a superdirective beamformer, least-squares beamformer, or statistically optimal beamformer design). Examples of beamforming approaches include generalized sidelobe cancellation (GSC), minimum variance distortionless response (MVDR), and/or linearly constrained minimum variance (LCMV) beamformers.

Blind source separation algorithms are methods of separating individual source signals (which may include signals from one or more information sources and one or more interference sources) based only on mixtures of the source signals. The range of BSS algorithms includes independent component analysis (ICA), which applies an "un-mixing" matrix of weights to the mixed signals (for example, by multiplying the matrix with the mixed signals) to produce separated signals; frequency-domain ICA or complex ICA, in which the filter coefficient values are computed directly in the frequency domain; independent vector analysis (IVA), a variation of complex ICA that uses a source prior which models expected dependencies among frequency bins; and variants such as constrained ICA and constrained IVA, which are constrained according to other a priori information, such as a known direction of each of one or more of the acoustic sources with respect to, for example, an axis of the microphone array.

Further examples of such adaptive filter structures, and learning rules based on ICA or IVA adaptive feedback and feedforward schemes that may be used to train such filter structures, may be found in US Publ. Pat. Appls. Nos. 2009/0022336, published Jan. 22, 2009, entitled "SYSTEMS, METHODS, AND APPARATUS FOR SIGNAL SEPARATION," and 2009/0164212, published Jun. 25, 2009, entitled "SYSTEMS, METHODS, AND APPARATUS FOR MULTI-MICROPHONE BASED SPEECH ENHANCEMENT."

FIG. 15B shows a block diagram of an implementation NS150 of noise suppression module N550. Module NS150 includes an implementation FN30 of spatially selective processing filter FN20 that is configured to produce near-end noise estimate SNN10 based on information from near-end signals SNV10-1 and SNV10-2. Filter FN30 may be configured to produce noise estimate SNN10 by attenuating components of the user's voice. For example, filter FN30 may be configured to perform a directionally selective operation that separates a directional source component (e.g., the user's voice) from one or more other components of signals SNV10-1 and SNV10-2, such as a directional interfering component and/or a diffuse noise component. In such case, filter FN30 may be configured to remove energy of the directional source component so that noise estimate SNN10 includes less of the energy of the directional source component than each of signals SNV10-1 and SNV10-2 does (that is to say, so that noise estimate SNN10 includes less of the energy of the directional source component than either of signals SNV10-1 and SNV10-2 does). Filter FN30 may be expected to produce an instance of near-end noise estimate SSN10 in which more of the near-end user's speech has been removed than in a noise estimate produced by a single-channel implementation of filter FN50.

For a case in which spatially selective processing filter FN20 processes more than two input channels, it may be desirable to configure the filter to perform spatially selective processing operations on different pairs of the channels and to combine the results of these operations to produce noise-suppressed signal SNP10 and/or noise estimate SNN10.

A beamformer implementation of spatially selective processing filter FN30 would typically be implemented to include as a null beamformer, such that energy from the directional source (e.g., the user's voice) would be attenuated to produce near-end noise estimate SNN10. It may be desirable to use one or more data-dependent or data-independent design techniques (MVDR, IVA, etc.) to generate a plurality of fixed null beams for such an implementation of spatially selective processing filter FN30. For example, it may be desirable to store offline computed null beams in a lookup table, for selection among these null beams at run-time (e.g., as described in US Publ. Pat Appl. No. 2009/0164212). One such example includes sixty-five complex coefficients for each filter, and three filters to generate each beam.

Filter FN30 may be configured to calculate an improved single-channel noise estimate (also called a "quasi-single-channel" noise estimate) by performing a multichannel voice activity detection (VAD) operation to classify components and/or segments of primary near-end signal SNV10-1 or SCN10-1. Such a noise estimate may be available more quickly than other approaches, as it does not require a long-term estimate. This single-channel noise estimate can also capture nonstationary noise, unlike a long-term-estimate-based approach, which is typically unable to support removal of nonstationary noise. Such a method may provide a fast, accurate, and nonstationary noise reference. Filter FN30 may be configured to produce the noise estimate by smoothing the current noise segment with the previous state of the noise estimate (e.g., using a first-degree smoother, possibly on each frequency component).

Filter FN20 may be configured to perform a DOA-based VAD operation. One class of such an operation is based on the phase difference, for each frequency component of the segment in a desired frequency range, between the frequency component in each of two channels of the input multichannel signal. The relation between phase difference and frequency may be used to indicate the direction of arrival (DOA) of that frequency component, and such a VAD operation may be configured to indicate voice detection when the relation between phase difference and frequency is consistent (i.e., when the correlation of phase difference and frequency is linear) over a wide frequency range, such as 500-2000 Hz. As described in more detail below, presence of a point source is indicated by consistency of a direction indicator over multiple frequencies. Another class of DOA-based VAD operations is based on a time delay between an instance of a signal in each channel (e.g., as determined by cross-correlating the channels in the time domain).

Another example of a multichannel VAD operation is based on a difference between levels (also called gains) of channels of the input multichannel signal. A gain-based VAD operation may be configured to indicate voice detection, for example, when the ratio of the energies of two channels exceeds a threshold value (indicating that the signal is arriving from a near-field source and from a desired one of the axis directions of the microphone array). Such a detector may be configured to operate on the signal in the frequency domain (e.g., over one or more particular frequency ranges) or in the time domain.

In one example of a phase-based VAD operation, filter FN20 is configured to apply a directional masking function at each frequency component in the range under test to determine whether the phase difference at that frequency corresponds to a direction of arrival (or a time delay of arrival) that is within a particular range, and a coherency measure is calculated according to the results of such masking over the frequency range (e.g., as a sum of the mask scores for the various frequency components of the segment). Such an approach may include converting the phase difference at each frequency to a frequency-independent indicator of direction, such as direction of arrival or time difference of arrival (e.g., such that a single directional masking function may be used at all frequencies). Alternatively, such an approach may include applying a different respective masking function to the phase difference observed at each frequency.

In this example, filter F20 uses the value of the coherency measure to classify the segment as voice or noise. The directional masking function may be selected to include the expected direction of arrival of the user's voice, such that a high value of the coherency measure indicates a voice segment. Alternatively, the directional masking function may be selected to exclude the expected direction of arrival of the user's voice (also called a "complementary mask"), such that a high value of the coherency measure indicates a noise segment. In either case, filter F20 may be configured to obtain a binary VAD indication for the segment by comparing the value of its coherency measure to a threshold value, which may be fixed or adapted over time.

Filter FN30 may be configured to update near-end noise estimate SNN10 by smoothing it with each segment of the primary input signal (e.g., signal SNV10-1 or SCN10-1) that is classified as noise. Alternatively, filter FN30 may be configured to update near-end noise estimate SNN10 based on frequency components of the primary input signal that are classified as noise. Whether near-end noise estimate SNN10 is based on segment-level or component-level classification results, it may be desirable to reduce fluctuation in noise estimate SNN10 by temporally smoothing its frequency components.

In another example of a phase-based VAD operation, filter FN20 is configured to calculate the coherency measure based on the shape of distribution of the directions (or time delays) of arrival of the individual frequency components in the frequency range under test (e.g., how tightly the individual DOAs are grouped together). Such a measure may be calculated using a histogram. In either case, it may be desirable to configure filter FN20 to calculate the coherency measure based only on frequencies that are multiples of a current estimate of the pitch of the user's voice.

For each frequency component to be examined, for example, the phase-based detector may be configured to estimate the phase as the inverse tangent (also called the arctangent) of the ratio of the imaginary term of the corresponding fast Fourier transform (FFT) coefficient to the real term of the FFT coefficient.

It may be desirable to configure a phase-based VAD operation of filter FN20 to determine directional coherence between channels of each pair over a wideband range of frequencies. Such a wideband range may extend, for example, from a low frequency bound of zero, fifty, one hundred, or two hundred Hz to a high frequency bound of three, 3.5, or four kHz (or even higher, such as up to seven or eight kHz or more). However, it may be unnecessary for the detector to calculate phase differences across the entire bandwidth of the signal. For many bands in such a wideband range, for example, phase estimation may be impractical or unnecessary. The practical valuation of phase relationships of a received waveform at very low frequencies typically requires correspondingly large spacings between the transducers. Consequently, the maximum available spacing between microphones may establish a low frequency bound. On the other end, the distance between microphones should not exceed half of the minimum wavelength in order to avoid spatial aliasing. An eight-kilohertz sampling rate, for example, gives a bandwidth from zero to four kilohertz. The wavelength of a four-kHz signal is about 8.5 centimeters, so in this case, the spacing between adjacent microphones should not exceed about four centimeters. The microphone channels may be lowpass filtered in order to remove frequencies that might give rise to spatial aliasing.

It may be desirable to target specific frequency components, or a specific frequency range, across which a speech signal (or other desired signal) may be expected to be directionally coherent. It may be expected that background noise, such as directional noise (e.g., from sources such as automobiles) and/or diffuse noise, will not be directionally coherent over the same range. Speech tends to have low power in the range from four to eight kilohertz, so it may be desirable to forego phase estimation over at least this range. For example, it may be desirable to perform phase estimation and determine directional coherency over a range of from about seven hundred hertz to about two kilohertz.

Accordingly, it may be desirable to configure filter FN20 to calculate phase estimates for fewer than all of the frequency components (e.g., for fewer than all of the frequency samples of an FFT). In one example, the detector calculates phase estimates for the frequency range of 700 Hz to 2000 Hz. For a 128-point FFT of a four-kilohertz-bandwidth signal, the range of 700 to 2000 Hz corresponds roughly to the twenty-three frequency samples from the tenth sample through the thirty-second sample. It may also be desirable to configure the detector to consider only phase differences for frequency components which correspond to multiples of a current pitch estimate for the signal.

A phase-based VAD operation of filter FN20 may be configured to evaluate a directional coherence of the channel pair, based on information from the calculated phase differences. The "directional coherence" of a multichannel signal is defined as the degree to which the various frequency components of the signal arrive from the same direction. For an ideally directionally coherent channel pair, the value of $\Delta\phi/f$ is equal to a constant k for all frequencies, where the value of k is related to the direction of arrival $\theta$ and the time delay of arrival $\tau$. The directional coherence of a multichannel signal may be quantified, for example, by rating the estimated direction of arrival for each frequency component (which may also be indicated by a ratio of phase difference and frequency or by a time delay of arrival) according to how well it agrees with a particular direction (e.g., as indicated by a directional masking function), and then combining the rating results for the various frequency components to obtain a coherency measure for the signal.

It may be desirable to configure filter FN20 to produce the coherency measure as a temporally smoothed value (e.g., to calculate the coherency measure using a temporal smoothing function). The contrast of a coherency measure may be expressed as the value of a relation (e.g., the difference or the ratio) between the current value of the coherency measure and an average value of the coherency measure over time (e.g., the mean, mode, or median over the most recent ten, twenty, fifty, or one hundred frames). The average value of a coherency measure may be calculated using a temporal smoothing function. Phase-based VAD techniques, including calculation and application of a measure of directional coherence, are also described in, e.g., U.S. Publ. Pat. Appls. Nos. 2010/0323652 A1 and 2011/038489 A1 (Visser et al.).

A gain-based VAD technique may be configured to indicate presence or absence of voice activity in a segment of an input multichannel signal based on differences between corresponding values of a gain measure for each channel. Examples of such a gain measure (which may be calculated in the time domain or in the frequency domain) include total magnitude, average magnitude, RMS amplitude, median magnitude, peak magnitude, total energy, and average energy. It may be desirable to configure such an implementation of filter FN20 to perform a temporal smoothing operation on the gain measures and/or on the calculated differences. A gain-based VAD technique may be configured to produce a segment-level result (e.g., over a desired frequency range) or, alternatively, results for each of a plurality of subbands of each segment.

A gain-based VAD technique may be configured to detect that a segment is from a desired source in an endfire direction of the microphone array (e.g., to indicate detection of voice activity) when a difference between the gains of the channels is greater than a threshold value. Alternatively, a gain-based VAD technique may be configured to detect that a segment is from a desired source in a broadside direction of the microphone array (e.g., to indicate detection of voice activity) when a difference between the gains of the channels is less than a threshold value. The threshold value may be determined heuristically, and it may be desirable to use different threshold values depending on one or more factors such as signal-to-noise ratio (SNR), noise floor, etc. (e.g., to use a higher threshold value when the SNR is low). Gain-based VAD techniques are also described in, e.g., U.S. Publ. Pat. Appl. No. 2010/0323652 A1 (Visser et al.).

Gain differences between channels may be used for proximity detection, which may support more aggressive near-field/far-field discrimination, such as better frontal noise suppression (e.g., suppression of an interfering speaker in front of the user). Depending on the distance between microphones, a gain difference between balanced microphone channels will typically occur only if the source is within fifty centimeters or one meter.

Spatially selective processing filter FN20 may be configured to produce noise estimate SNN10 by performing a gain-based proximity selective operation. Such an operation may be configured to indicate that a segment of the input multichannel signal is voice when the ratio of the energies of two channels of the signal exceeds a proximity threshold value (indicating that the signal is arriving from a near-field source at a particular axis direction of the microphone array), and to indicate that the segment is noise otherwise. In such case, the proximity threshold value may be selected based on a desired near-field/far-field boundary radius with respect to the microphone pair MV10-1, MV10-2. Such an implementation of filter FN20 may be configured to operate on the signal in the frequency domain (e.g., over one or more particular frequency ranges) or in the time domain. In the frequency domain, the energy of a frequency component may be calculated as the squared magnitude of the corresponding frequency sample.

FIG. 15C shows a block diagram of an implementation NS155 of noise suppression module NS150 that includes a noise reduction module NR10. Noise reduction module NR10 is configured to perform a noise reduction operation on noise-suppressed signal SNP10, according to information from near-end noise estimate SNN10, to produce a noise-reduced signal SRS10. In one such example, noise reduction module NR10 is configured to perform a spectral subtraction operation by subtracting noise estimate SNN10 from noise-suppressed signal SNP10 in the frequency domain to produce noise-reduced signal SRS10. In another such example, noise reduction module NR10 is configured to use noise estimate SNN10 to perform a Wiener filtering operation on noise-suppressed signal SNP10 to produce noise-reduced signal SRS10. In such cases, a corresponding instance of feedback canceller CF10 may be arranged to receive noise-reduced signal SRS10 as near-end speech estimate SSE10.

Figure 16A:
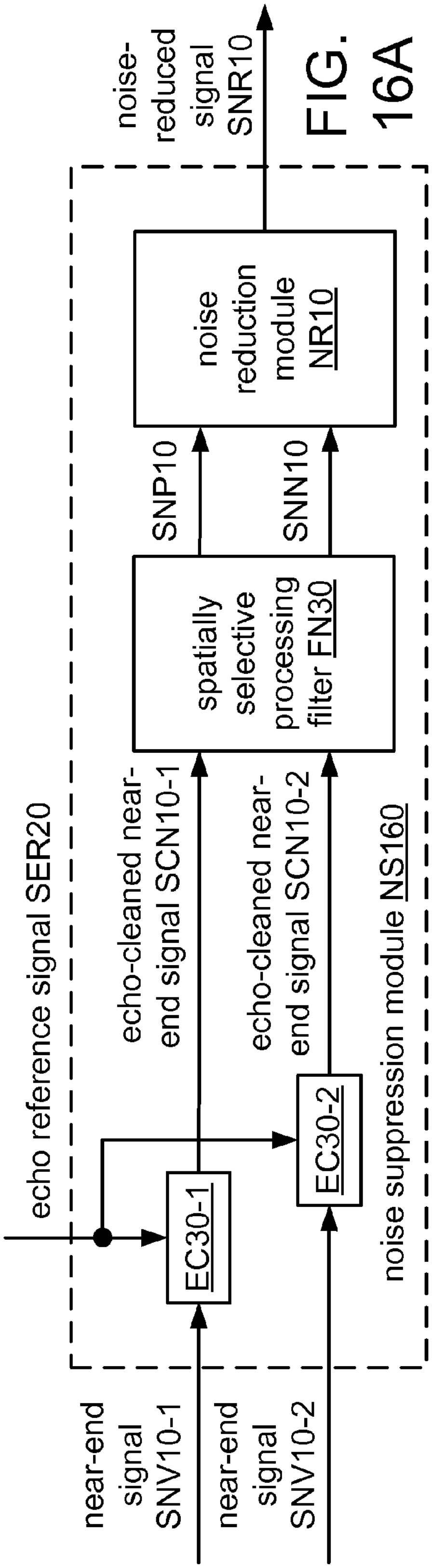
FIG. 16A shows a block diagram of an implementation NS160 of noise suppression modules NS60, NS130, and NS155.

FIG. 16A shows a block diagram of a similar implementation NS160 of noise suppression modules NS60, NS130, and NS155.

Figure 16B:
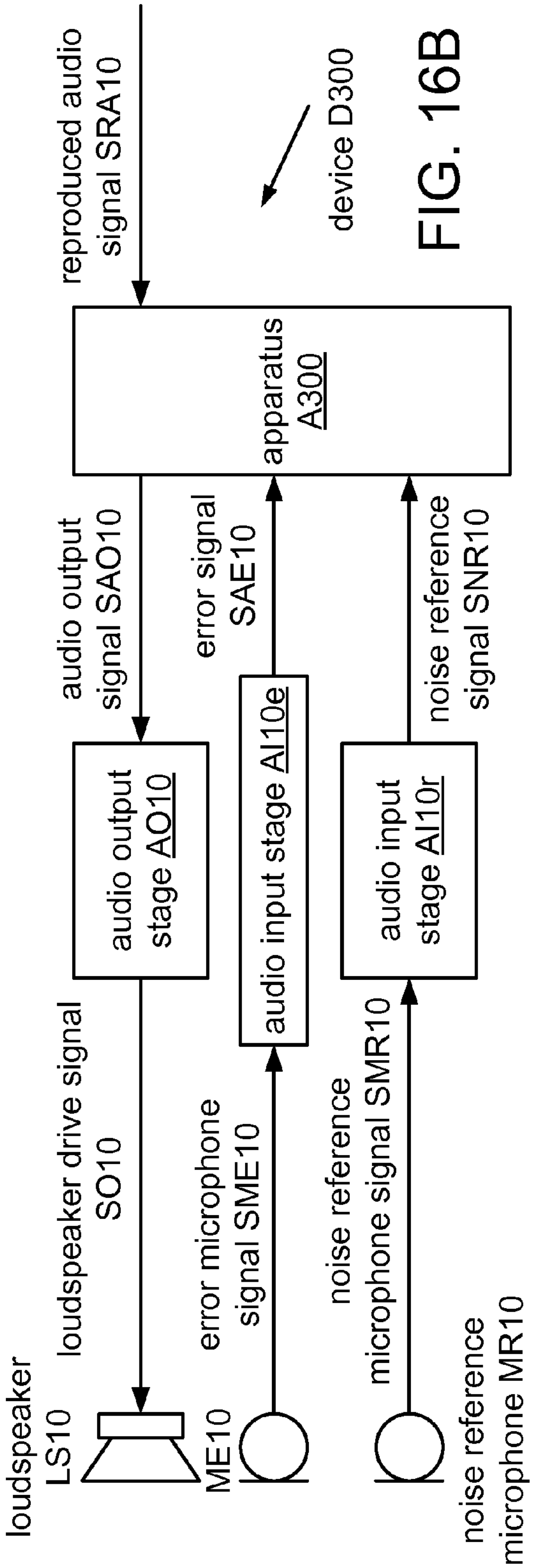
FIG. 16B shows a block diagram of a device D300 according to a general configuration.

FIG. 16B shows a block diagram of a device D300 according to another general configuration. Device D300 includes instances of loudspeaker LS10, audio output stage A010, error microphone ME10, and audio input stage AI10*e* as described herein. Device D300 also includes a noise reference microphone MR10 that is disposed during use of device D300 to pick up ambient noise and an instance AI10*r* of audio input stage AI10 (e.g., AI20 or AI30) that is configured to produce a noise reference signal SNR10. Microphone MR10 is typically worn at or on the ear and directed away from the user's ear, generally within three centimeters of the ERP but farther from the ERP than error microphone ME10. FIGS. 36, 37, 38B-38D, 39, 40A, 40B, and 41A-C show several examples of placements of noise reference microphone MR10.

Figure 17A:
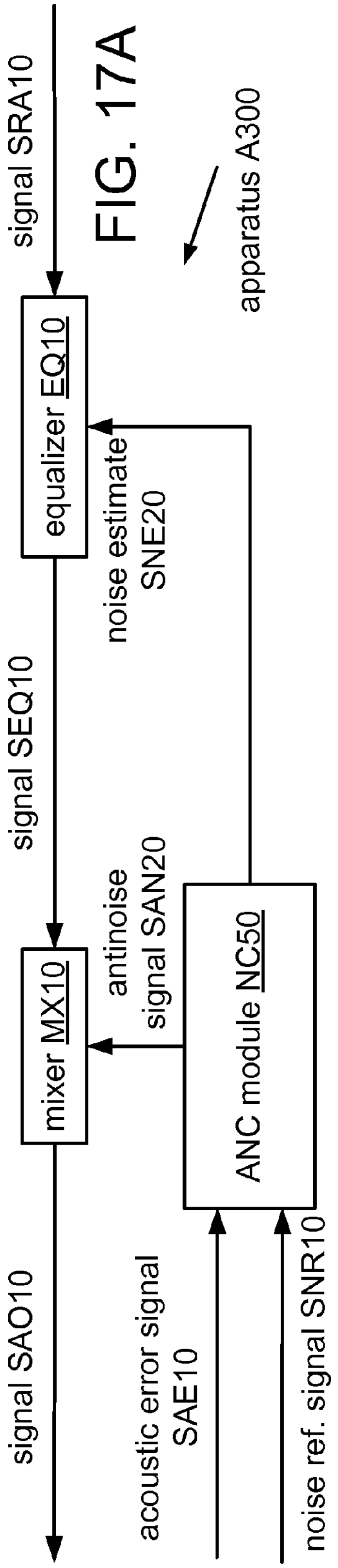
FIG. 17A shows a block diagram of apparatus A300 according to a general configuration.

FIG. 17A shows a block diagram of apparatus A300 according to a general configuration, an instance of which is included within device D300. Apparatus A300 includes an implementation NC50 of ANC module NC10 that is configured to produce an implementation SAN20 of antinoise signal SAN10 (e.g., according to any desired digital and/or analog ANC technique) based on information from error signal SAE10 and information from noise reference signal SNR10. In this case, equalizer EQ10 is arranged to receive a noise estimate SNE20 that is based on information from acoustic error signal SAE10 and/or information from noise reference signal SNR10.

Figure 17B:
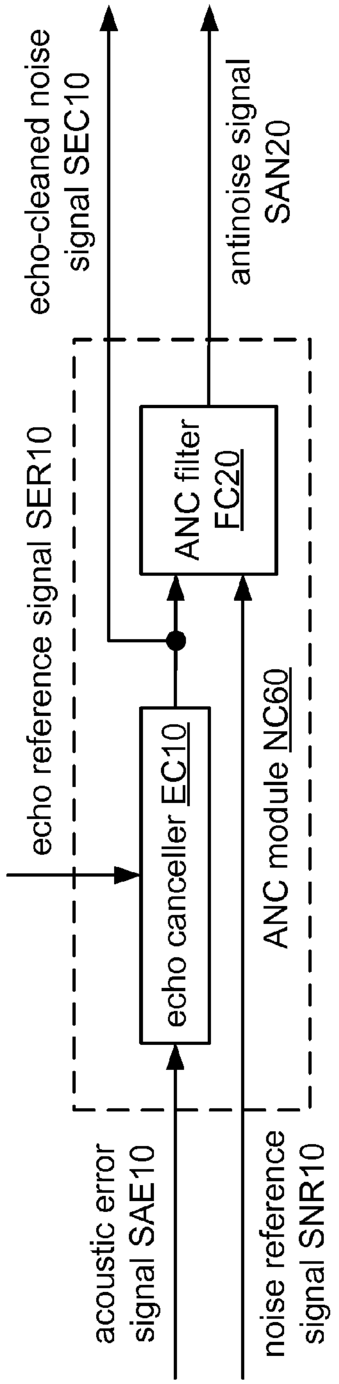
FIG. 17B shows a block diagram of an implementation NC60 of ANC modules NC20 and NC50.

FIG. 17B shows a block diagram of an implementation NC60 of ANC modules NC20 and NC50 that includes echo canceller EC10 and an implementation FC20 of ANC filter FC10. ANC filter FC20 is typically configured to invert the phase of noise reference signal SNR10 to produce anti-noise signal SAN20 and may also be configured to equalize the frequency response of the ANC operation and/or to match or minimize the delay of the ANC operation. An ANC method that is based on information from an external noise estimate (e.g., noise reference signal SNR10) is also known as a feedforward ANC method. ANC filter FC20 is typically configured to produce anti-noise signal SAN20 according to an implementation of a least-mean-squares (LMS) algorithm, which class includes filtered-reference ("filtered-X") LMS, filtered-error ("filtered-E") LMS, filtered-U LMS, and variants thereof (e.g., subband LMS, step size normalized LMS, etc.). ANC filter FC20 may be implemented, for example, as a feedforward or hybrid ANC filter. ANC filter FC20 may be configured to have a filter state that is fixed over time or, alternatively, a filter state that is adaptable over time.

Figures 18A, 18B, 18C:
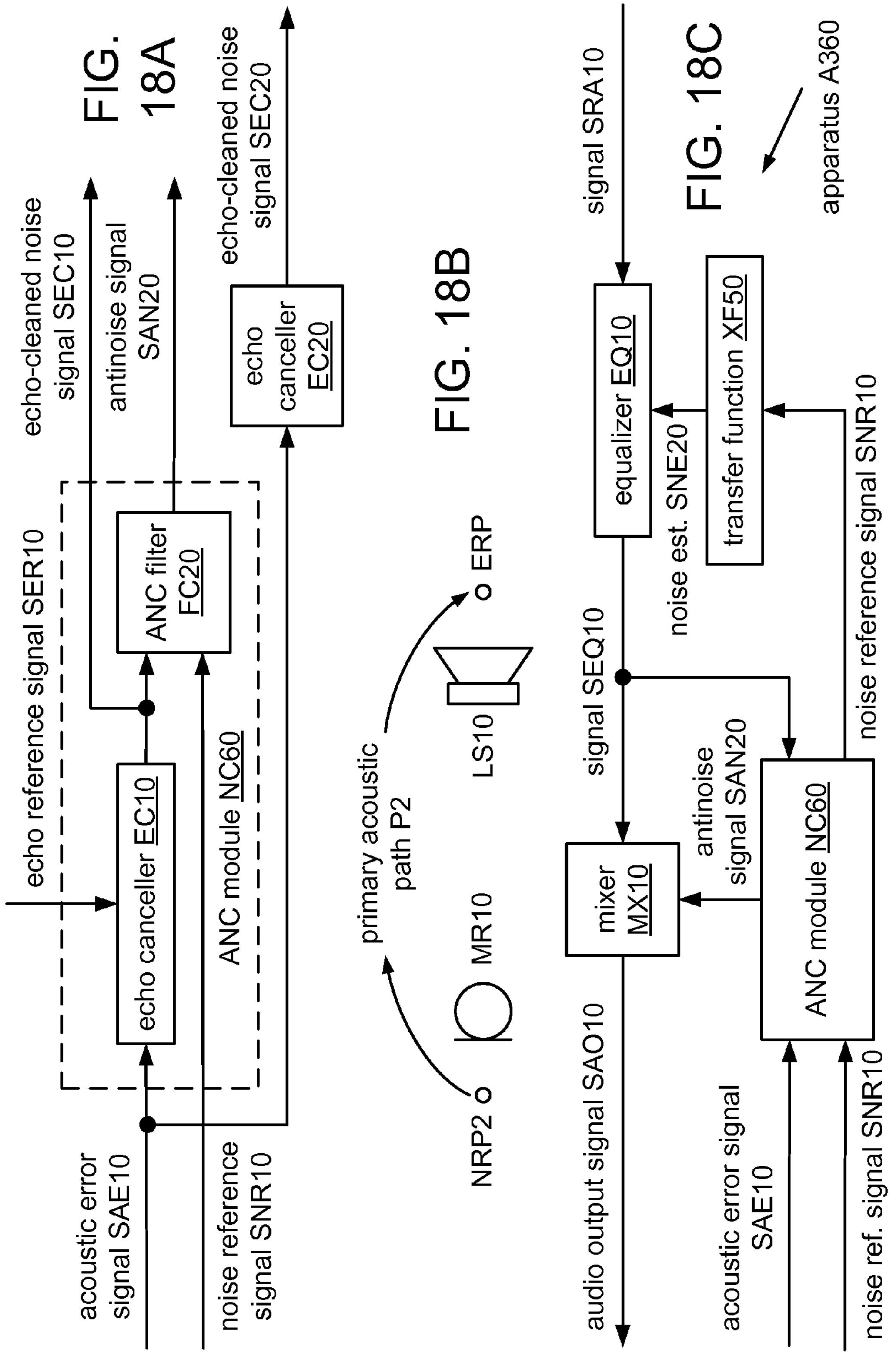
FIG. 18A shows a block diagram of an arrangement that includes ANC module NC60 and echo canceller EC20.
FIG. 18B shows a diagram of a primary acoustic path P2 from noise reference point NRP2 to ear reference point ERP.
FIG. 18C shows a block diagram of an implementation A360 of apparatus A300.

It may be desirable for apparatus A300 to include an echo canceller EC20 as described above in conjunction with ANC module NC60, as shown in FIG. 18A. It is also possible to configure apparatus A300 to include an echo cancellation operation on noise reference signal SNR10. However, such an operation is typically not necessary for acceptable ANC performance, as noise reference microphone MR10 typically senses much less echo than error microphone ME10, and echo on noise reference signal SNR10 typically has little audible effect as compared to echo in the transmit path.

Equalizer EQ10 may be arranged to receive noise estimate SNE20 as any of anti-noise signal SAN20, echo-cleaned noise signal SEC10, and echo-cleaned noise signal SEC20. For example, apparatus A300 may be configured to include a multiplexer as shown in FIG. 3C to support run-time selection (e.g., based on a current value of a measure of the performance of echo canceller EC10 and/or a current value of a measure of the performance of echo canceller EC20) among two or more such noise estimates.

As a result of passive and/or active noise cancellation, a near-end noise estimate that is based on information from noise reference signal SNR10 may be expected to differ from the actual noise that the user experiences in response to the same stimulus. FIG. 18B shows a diagram of a primary acoustic path P2 from noise reference point NRP2, which is located at the sensing surface of noise reference microphone MR10, to ear reference point ERP. It may be desirable to configure an implementation of apparatus A300 to obtain noise estimate SNE20 from noise reference signal SNR10 by applying an estimate of primary acoustic path P2 to noise reference signal SNR10. Such a modification may be expected to produce a noise estimate that indicates more accurately the actual noise power levels at ear reference point ERP.

FIG. 18C shows a block diagram of an implementation A360 of apparatus A300 that includes a transfer function XF50. Transfer function XF50 may be configured to apply a fixed compensation, in which case it may be desirable to consider the effect of passive blocking as well as active noise cancellation. Apparatus A360 also includes an implementation of ANC module NC50 (in this example, NC60) that is configured to produce antinoise signal SAN20. Noise estimate SNE20 that is based on information from noise reference signal SNR10.

It may be desirable to model primary acoustic path P2 as a linear transfer function. A fixed state of this transfer function may be estimated offline by comparing the responses of microphones MR10 and ME10 in the presence of an acoustic noise signal during a simulated use of the device D100 (e.g., while it is held at the ear of a simulated user, such as a Head and Torso Simulator (HATS), Bruel and Kjaer, DK). Such an offline procedure may also be used to obtain an initial state of the transfer function for an adaptive implementation of the transfer function. Primary acoustic path P2 may also be modeled as a nonlinear transfer function.

Figure 19A:
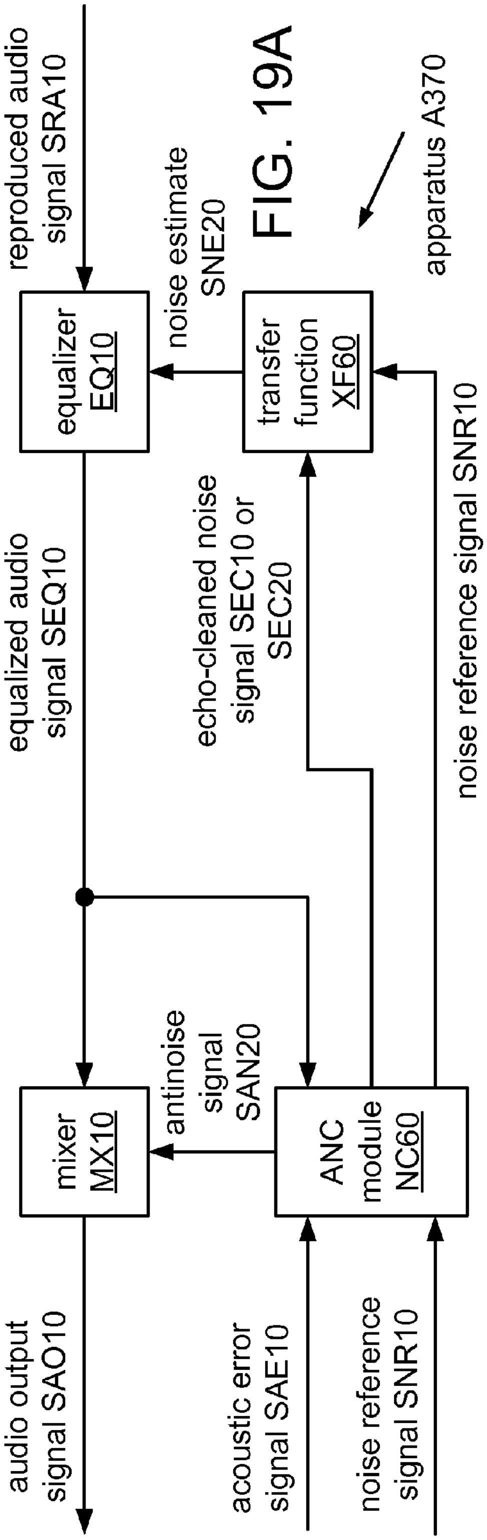
FIG. 19A shows a block diagram of an implementation A370 of apparatus A360.
Figure 19B:
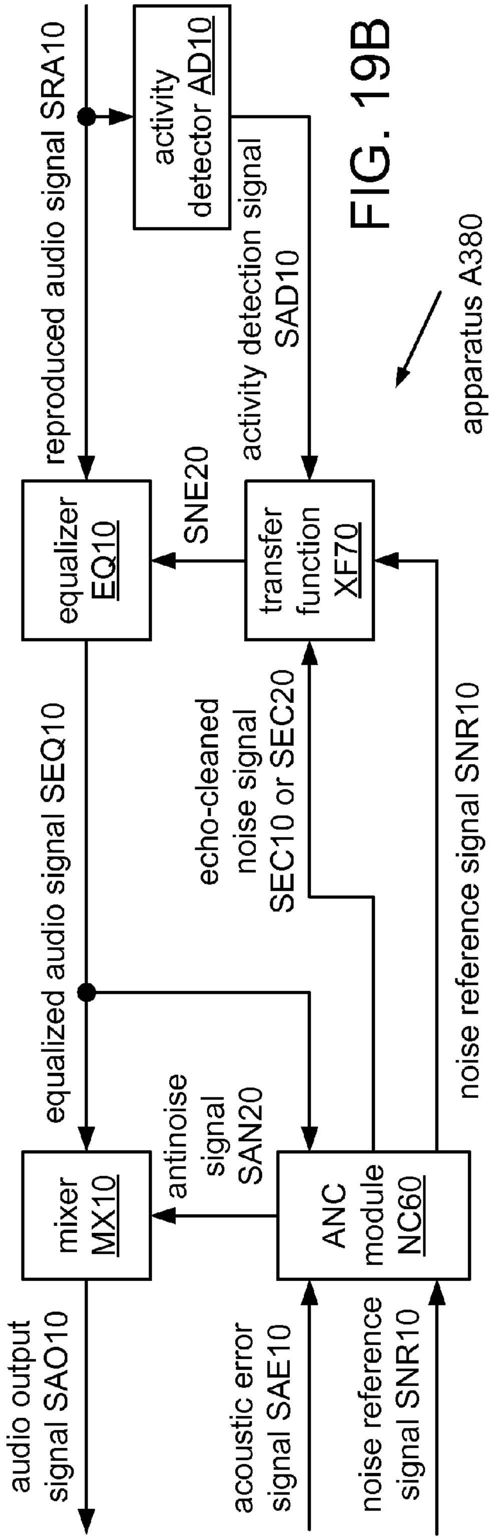
FIG. 19B shows a block diagram of an implementation A380 of apparatus A370.

Transfer function XF50 may also be configured to apply adaptive compensation (e.g., to cope with acoustic load change during use of the device). Acoustical load variation can have a significant impact in the perceived frequency response of the receive path. FIG. 19A shows a block diagram of an implementation A370 of apparatus A360 that includes an adaptive implementation XF60 of transfer function XF50. FIG. 19B shows a block diagram of an implementation A380 of apparatus A370 that includes an instance of activity detector AD10 as described herein and a controllable implementation XF70 of adaptive transfer function XF60.

Figure 20:
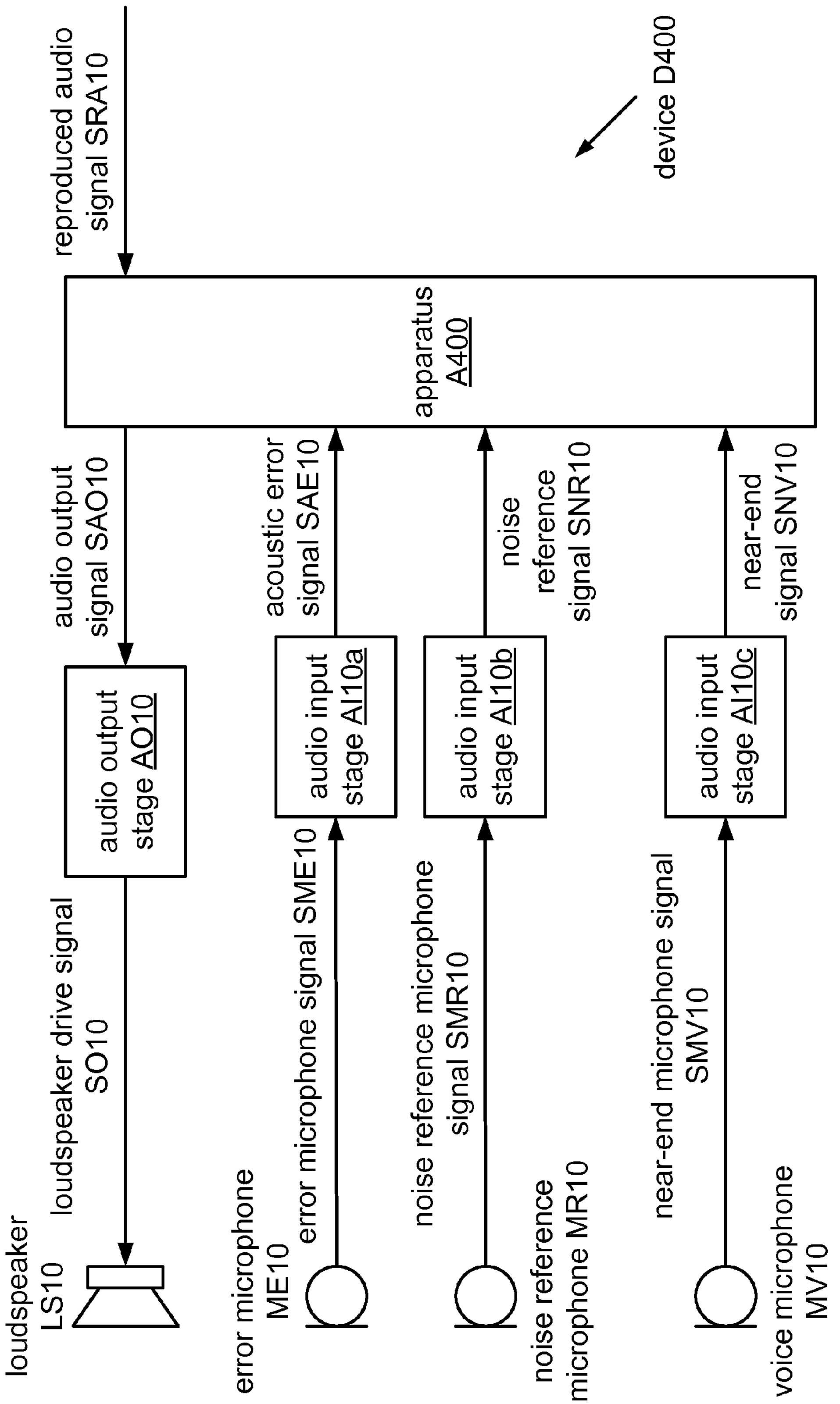
FIG. 20 shows a block diagram of an implementation D400 of device D100.

FIG. 20 shows a block diagram of an implementation D400 of device D300 that includes both a voice microphone channel and a noise reference microphone channel. Device D400 includes an implementation A400 of apparatus A300 as described below.

Figure 21A:
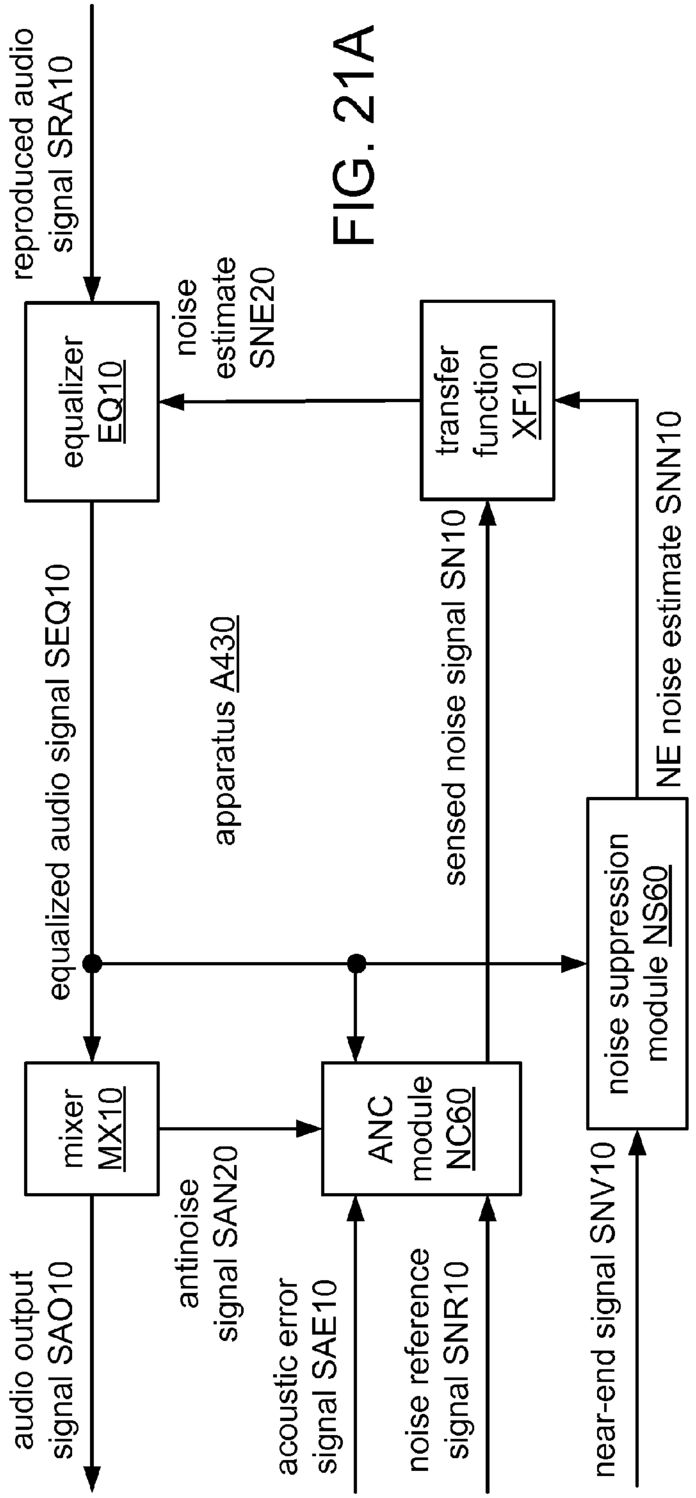
FIG. 21A shows a block diagram of an implementation A430 of apparatus A400.
Figure 21B:
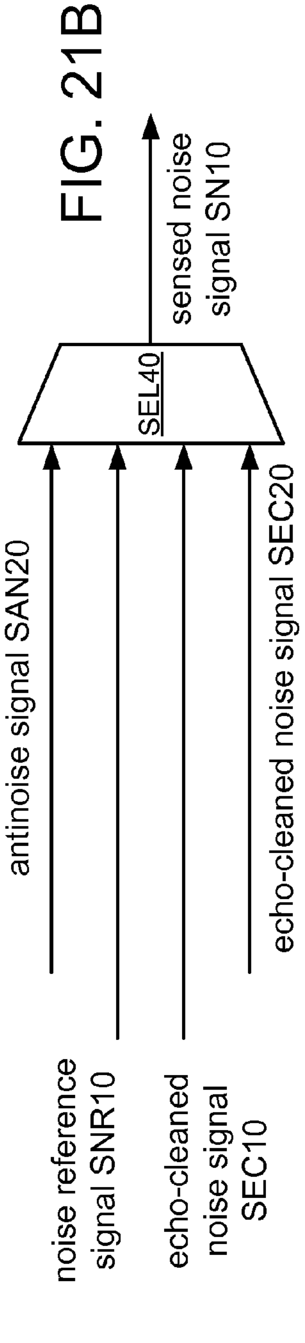
FIG. 21B shows a selector SEL40 that may be included within apparatus A430.

FIG. 21A shows a block diagram of an implementation A430 of apparatus A400 that is similar to apparatus A130. Apparatus A430 includes an instance of ANC module NC60 (or NC50) and an instance of noise suppression module NS60 (or NS50). Apparatus A430 also includes an instance of transfer function XF10 that is arranged to receive a sensed noise signal SN10 as a control signal and to filter near-end noise estimate SNN10, based on information from the control signal, to produce a filtered noise estimate output. Sensed noise signal SN10 may be any of antinoise signal SAN20, noise reference signal SNR10, echo-cleaned noise signal SEC10, and echo-cleaned noise signal SEC20. Apparatus A430 may be configured to include a selector (e.g., a multiplexer SEL40 as shown in FIG. 21B) to support run-time selection (e.g., based on a current value of a measure of the performance of echo canceller EC10 and/or a current value of a measure of the performance of echo canceller EC20) of sensed noise signal SN10 from among two of more of these signals.

Figure 22:
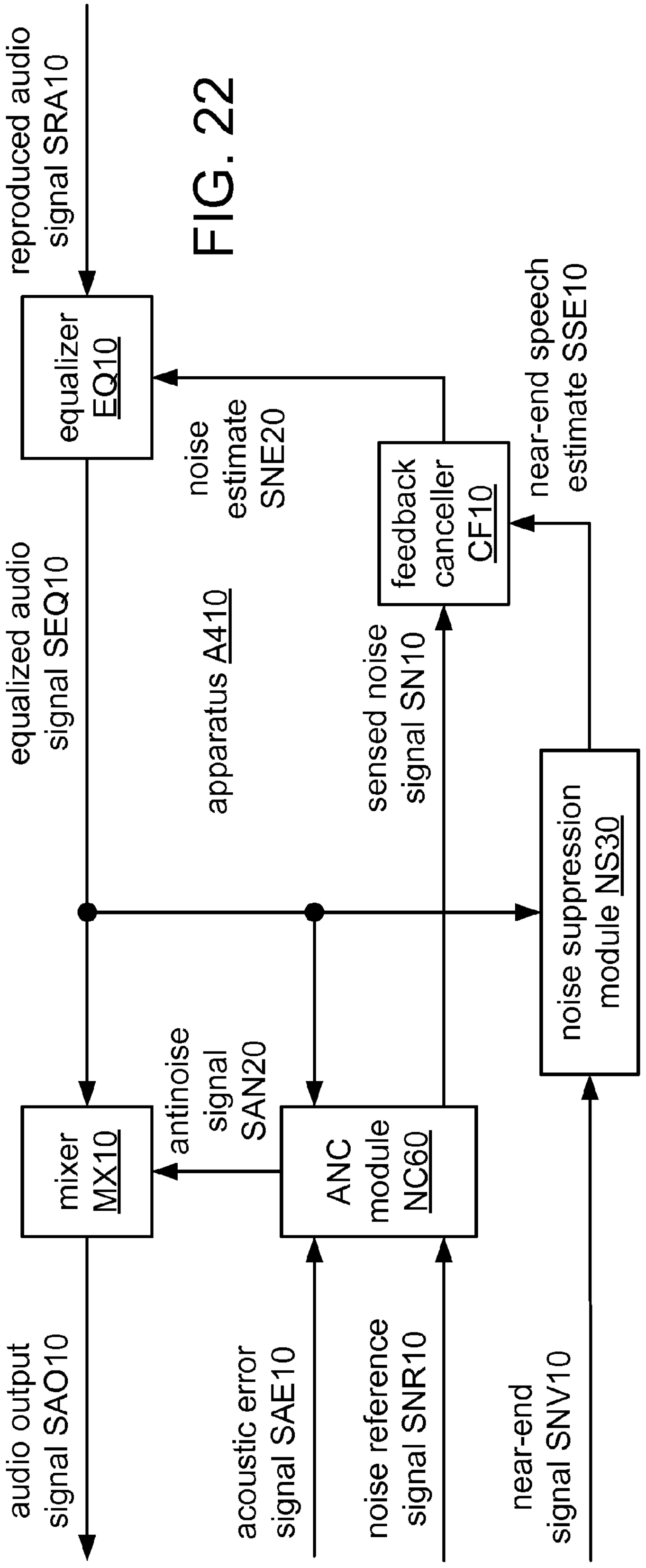
FIG. 22 shows a block diagram of an implementation A410 of apparatus A400.

FIG. 22 shows a block diagram of an implementation A410 of apparatus A400 that is similar to apparatus A110. Apparatus A410 includes an instance of noise suppression module NS30 (or NS20) and an instance of feedback canceller CF10 that is arranged to produce noise estimate SNE20 from sensed noise signal SN10. As discussed herein with reference to apparatus A430, sensed noise signal SN10 is based on information from acoustic error signal SAE10 and/or information from noise reference signal SNR10. For example, sensed noise signal SN10 may be any of antinoise signal SAN10, noise reference signal SNR10, echo-cleaned noise signal SEC10, and echo-cleaned noise signal SEC20, and apparatus A410 may be configured to include a multiplexer (e.g., as shown in FIG. 21B and discussed herein) for run-time selection of sensed noise signal SN10 from among two of more of these signals.

As discussed herein with reference to apparatus A110, feedback canceller CF10 is arranged to receive, as a control signal, a near-end speech estimate SSE10 that may be any among near-end signal SNV10, echo-cleaned near-end signal SCN10, and noise-suppressed signal SNP10. Apparatus A410 may be configured to include a multiplexer as shown in FIG. 11A to support run-time selection (e.g., based on a current value of a measure of the performance of echo canceller EC30) among two or more such near-end speech signals.

Figure 23:
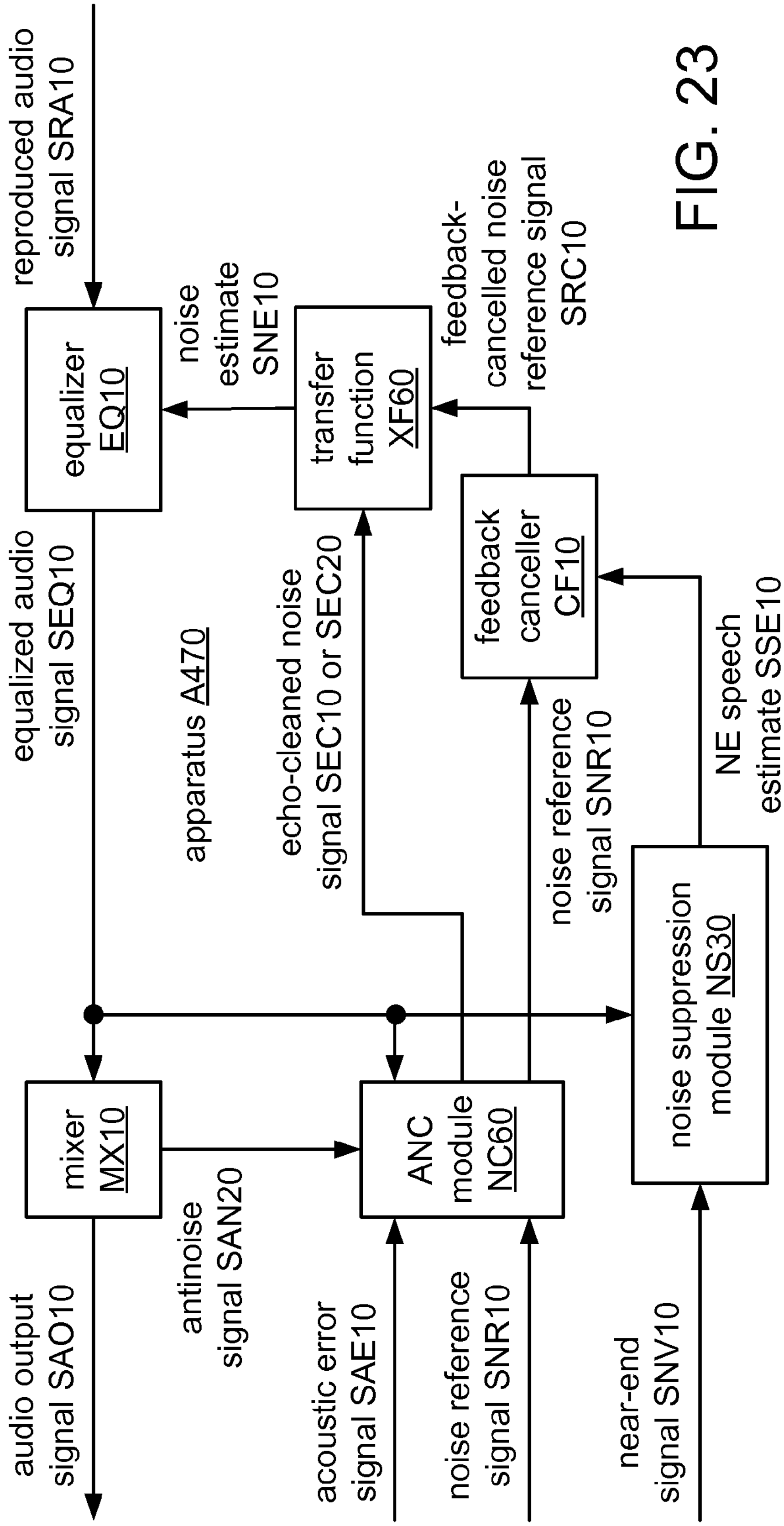
FIG. 23 shows a block diagram of an implementation A470 of apparatus A410.

FIG. 23 shows a block diagram of an implementation A470 of apparatus A410. Apparatus A470 includes an instance of noise suppression module NS30 (or NS20) and an instance of feedback canceller CF10 that is arranged to produce a feedback-cancelled noise reference signal SRC10 from noise reference signal SNR10. Apparatus A470 also includes an instance of adaptive transfer function XF60 that is arranged to filter feedback-cancelled noise reference signal SRC10 to produce noise estimate SNE10. Apparatus A470 may also be implemented with a controllable implementation XF70 of adaptive transfer function XF60 and to include an instance of activity detector AD10 (e.g., configured and arranged as described herein with reference to apparatus A380).

Figure 24:
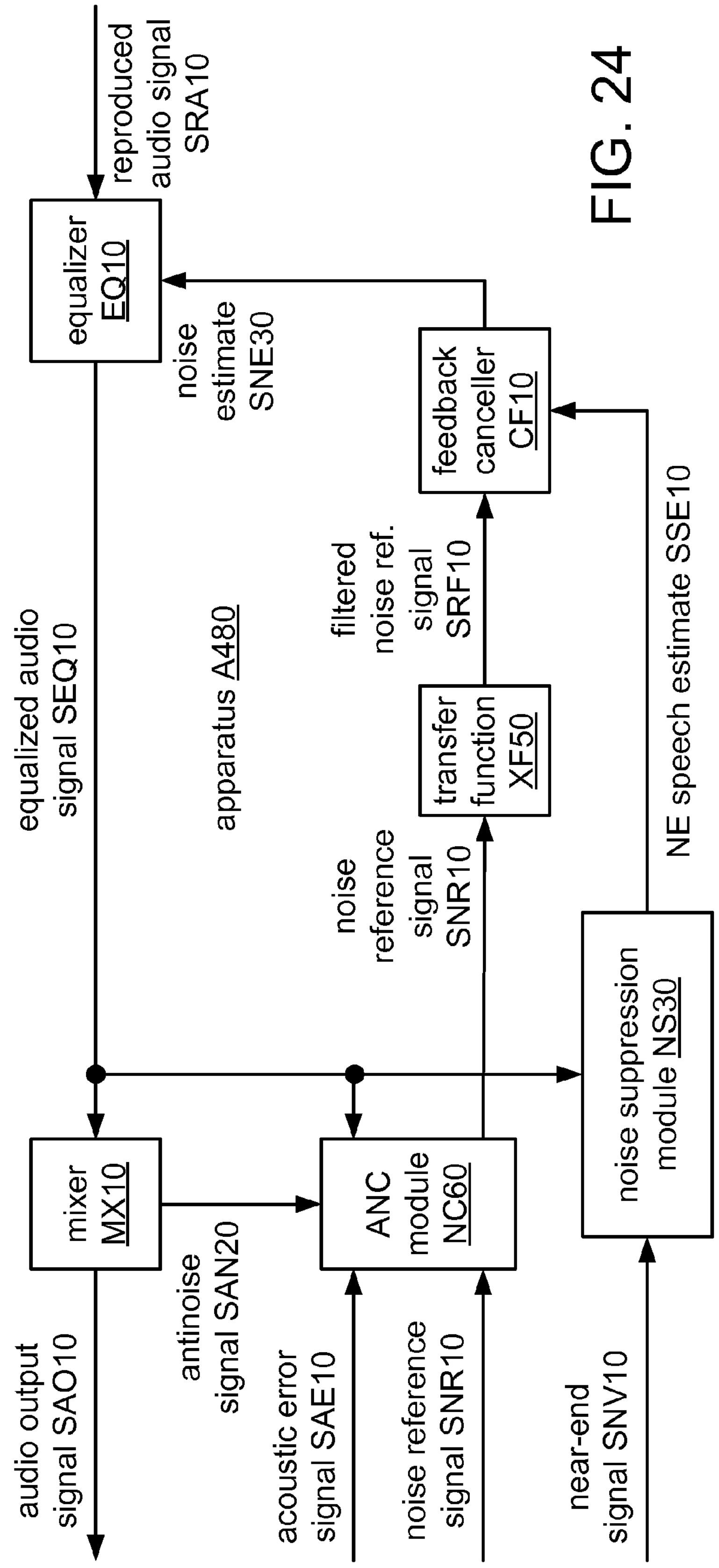
FIG. 24 shows a block diagram of an implementation A480 of apparatus A410.
Figure 25:
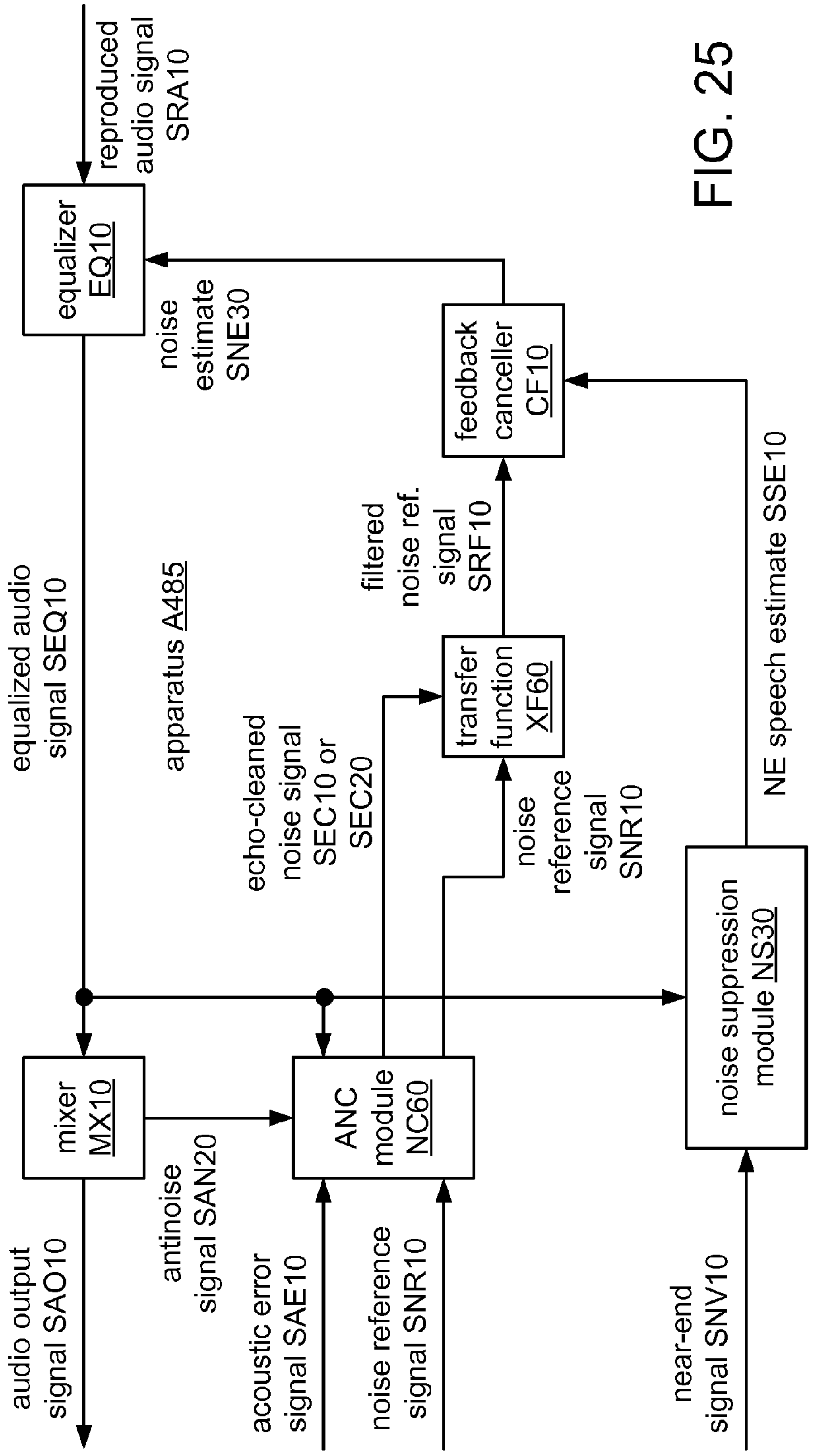
FIG. 25 shows a block diagram of an implementation A485 of apparatus A480.

FIG. 24 shows a block diagram of an implementation A480 of apparatus A410. Apparatus A480 includes an instance of noise suppression module NS30 (or NS20) and an instance of transfer function XF50 that is arranged upstream of feedback canceller CF10 to filter noise reference signal SNR10 to produce a filtered noise reference signal SRF10. FIG. 25 shows a block diagram of an implementation A485 of apparatus A480 in which transfer function XF50 is implemented as an instance of adaptive transfer function XF60.

It may be desirable to implement apparatus A100 or A300 to support run-time selection from among two or more noise estimates, or to otherwise combine two or more noise estimates, to obtain the noise estimate applied by equalizer EQ10. For example, such an apparatus may be configured to combine a noise estimate that is based on information from a single voice microphone, a noise estimate that is based on information from two or more voice microphones, and a noise estimate that is based on information from acoustic error signal SAE10 and/or noise reference signal SNR10.

Figure 26:
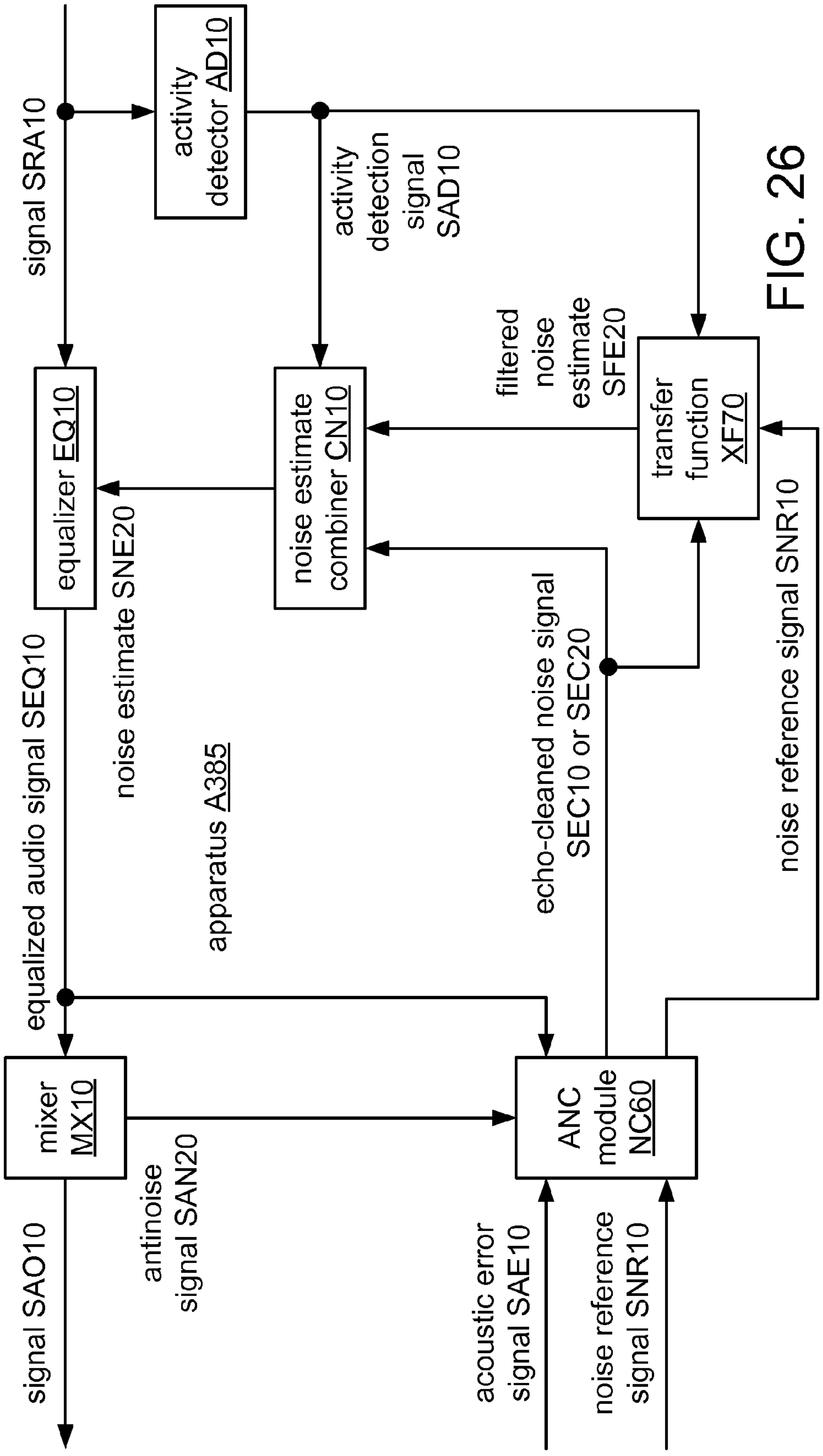
FIG. 26 shows a block diagram of an implementation A385 of apparatus A380.

FIG. 26 shows a block diagram of an implementation A385 of apparatus A380 that includes a noise estimate combiner CN10. Noise estimate combiner CN10 is configured (e.g., as a selector) to select among a noise estimate based on information from error microphone signal SME10 and a noise estimate based on information from an external microphone signal.

Apparatus A385 also includes an instance of activity detector AD10 that is arranged to monitor reproduced audio signal SRA10. In an alternative example, activity detector AD10 is arranged within apparatus A385 such that the state of activity detection signal SAD10 indicates a level of audio activity on equalized audio signal SEQ10.

In apparatus A385, noise estimate combiner CN10 is arranged to select among the noise estimate inputs in response to the state of activity detection signal SAD10. For example, it may be desirable to avoid use of a noise estimate that is based on information from acoustic error signal SAE10 when the level of signal SRA10 or SEQ10 is too high. In such case, noise estimate combiner CN10 may be configured to select a noise estimate that is based on information from acoustic error signal SAE10 (e.g., echo-cleaned noise signal SEC10 or SEC20) as noise estimate SNE20 when the far-end signal is not active, and select a noise estimate based on information from an external microphone signal (e.g., noise reference signal SNR10) as noise estimate SNE20 when the far-end signal is active.

Figure 27:
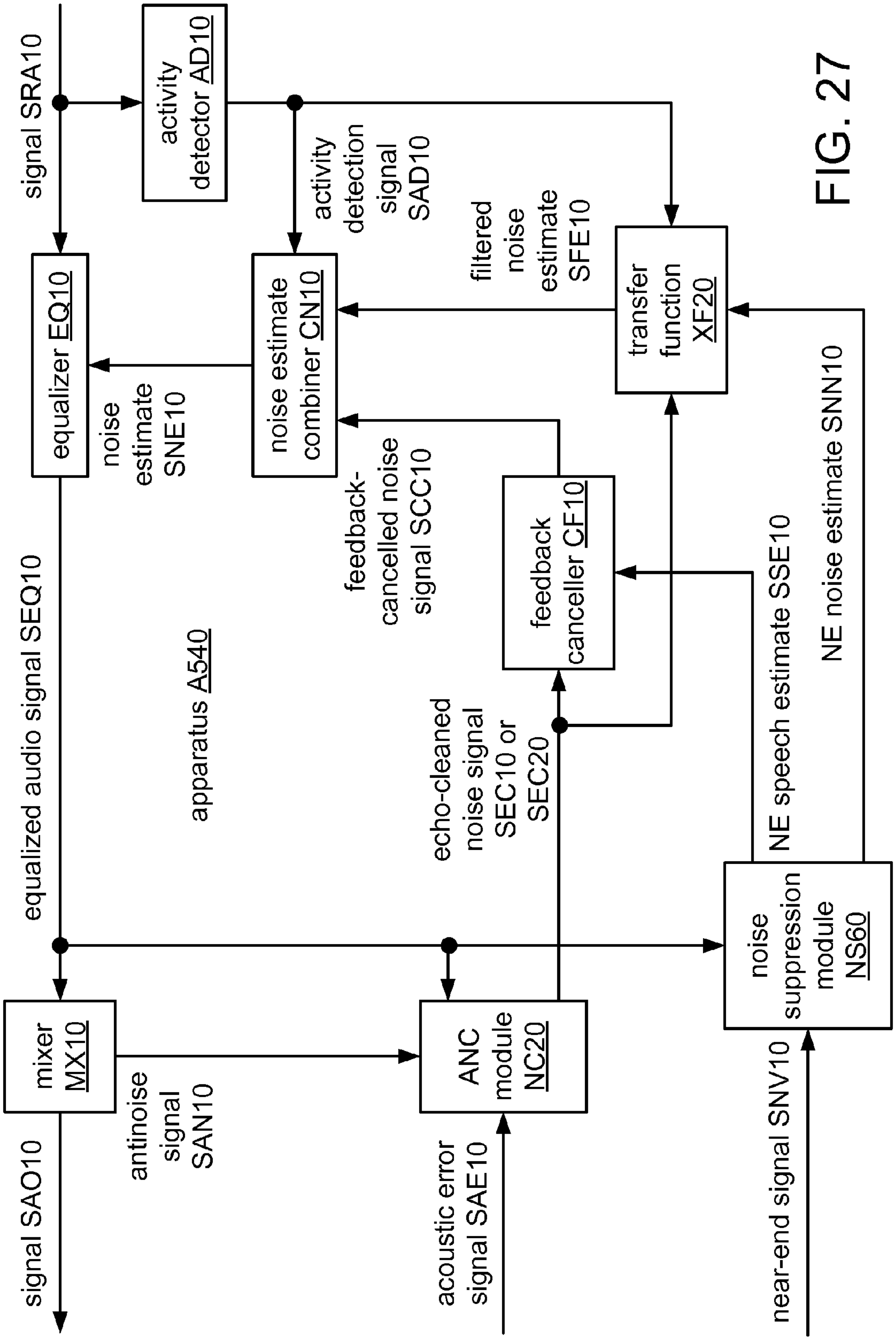
FIG. 27 shows a block diagram of an implementation A540 of apparatus A120 and A140.

FIG. 27 shows a block diagram of an implementation A540 of apparatus A120 and A140 that includes an instance of noise suppression module NS60 (or NS50), an instance of ANC module NC20 (or NC60), and an instance of activity detector AD10. Apparatus A540 also includes an instance of feedback canceller CF10 that is arranged, as described herein with reference to apparatus A120, to produce a feedback-cancelled noise signal SCC10 based on information from echo-cleaned noise signal SEC10 or SEC20. Apparatus A540 also includes an instance of transfer function XF20 that is arranged, as described herein with reference to apparatus A140, to produce a filtered noise estimate SFE10 based on information from near-end noise estimate SNN10. In this case, noise estimate combiner CN10 is arranged to select a noise estimate based on information from an external microphone signal (e.g., filtered noise estimate SFE10) as noise estimate SNE10 when the far-end signal is active.

In the example of FIG. 27, activity detector AD10 is arranged to monitor reproduced audio signal SRA10. In an alternative example, activity detector AD10 is arranged within apparatus A540 such that the state of activity detection signal SAD10 indicates a level of audio activity on equalized audio signal SEQ10.

It may be desirable to operate apparatus A540 such that combiner CN10 selects noise signal SCC10 by default, as this signal may be expected to provide a more accurate estimate of the noise spectrum at ERP. During far-end activity, however, it may be expected that this noise estimate may be dominated by far-end speech, which may impede the effectiveness of equalizer EQ10 or even give rise to undesirable feedback. Consequently, it may be desirable to operate apparatus A540 such that combiner CN10 selects noise signal SCC10 only during far-end silence periods. It may also be desirable to operate apparatus A540 such that transfer function XF20 is updated (e.g., to adaptively match noise estimate SNN10 to noise signal SEC10 or SEC20) only during far-end silence periods. In the remaining time frames (i.e., during far-end activity), it may be desirable to operate apparatus A540 such that combiner CN10 selects noise estimate SFE10. It may be expected that most of the far-end speech has been removed from estimate SFE10 by echo canceller EC30.

Figure 28:
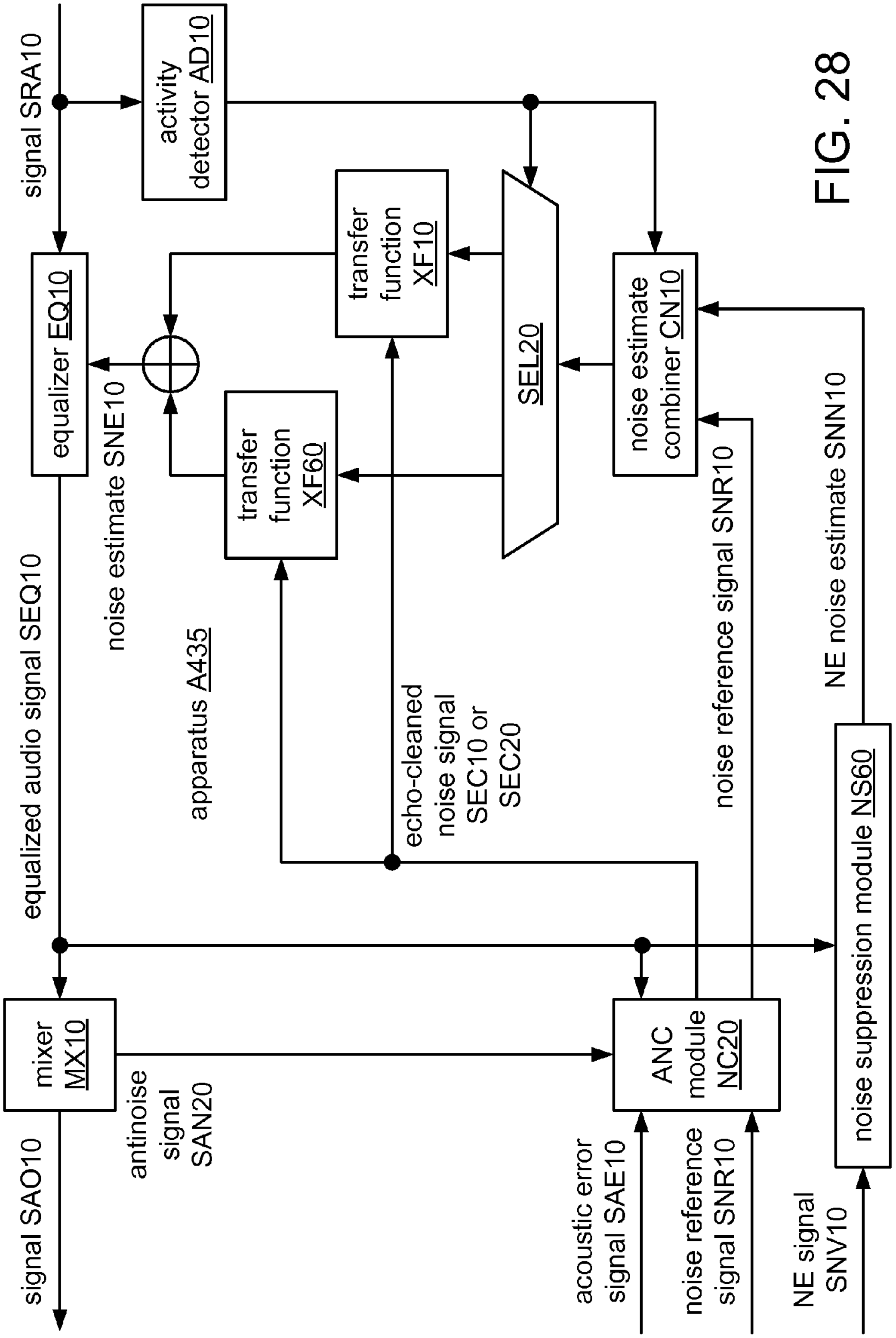
FIG. 28 shows a block diagram of an implementation A435 of apparatus A130 and A430.

FIG. 28 shows a block diagram of an implementation A435 of apparatus A130 and A430 that is configured to apply an appropriate transfer function to the selected noise estimate. In this case, noise estimate combiner CN10 is arranged to select among a noise estimate that is based on information from noise reference signal SNR10 and a noise estimate that is based on information from near-end microphone signal SNV10. Apparatus A435 also includes a selector SEL20 that is configured to direct the selected noise estimate to the appropriate one of adaptive transfer functions XF10 and XF60. In other examples of apparatus A435, transfer function XF20 is implemented as an instance of transfer function XF20 as described herein and/or transfer function XF60 is implemented as an instance of transfer function XF50 or XF70 as described herein.

It is expressly noted that activity detector AD10 may be configured to produce different instances of activity detection signal SAD10 for control of transfer function adaptation and for noise estimate selection. For example, such different instances may be obtained by comparing a level of the monitored signal to different corresponding thresholds (e.g., such that the threshold value for selecting an external noise estimate is higher than the threshold value for disabling adaptation, or vice versa).

Insufficient echo cancellation in the noise estimation path may lead to suboptimal performance of equalizer EQ10. If the noise estimate applied by equalizer EQ10 includes uncancelled acoustic echo from audio output signal SAO10, then a positive feedback loop may be created between equalized audio signal SEQ10 and the subband gain factor computation path in equalizer EQ10. In this feedback loop, the higher the level of equalized audio signal SEQ10 in an acoustic signal based on audio output signal SAO10 (e.g., as reproduced by loudspeaker LS10), the more that equalizer EQ10 will tend to increase the subband gain factors.

It may be desirable to implement apparatus A100 or A300 to determine that a noise estimate based on information from acoustic error signal SAE10 and/or noise reference signal SNR10 has become unreliable (e.g., due to insufficient echo cancellation). Such a method may be configured to detect a rise in noise estimate power over time as an indication of unreliability. In such case, the power of a noise estimate that is based on information from one or more voice microphones (e.g., near-end noise estimate SNN10) may be used as a reference, as failure of the echo cancellation in the near-end transmit path would not be expected to cause the power of the near-end noise estimate to increase in such manner.

Figure 29:
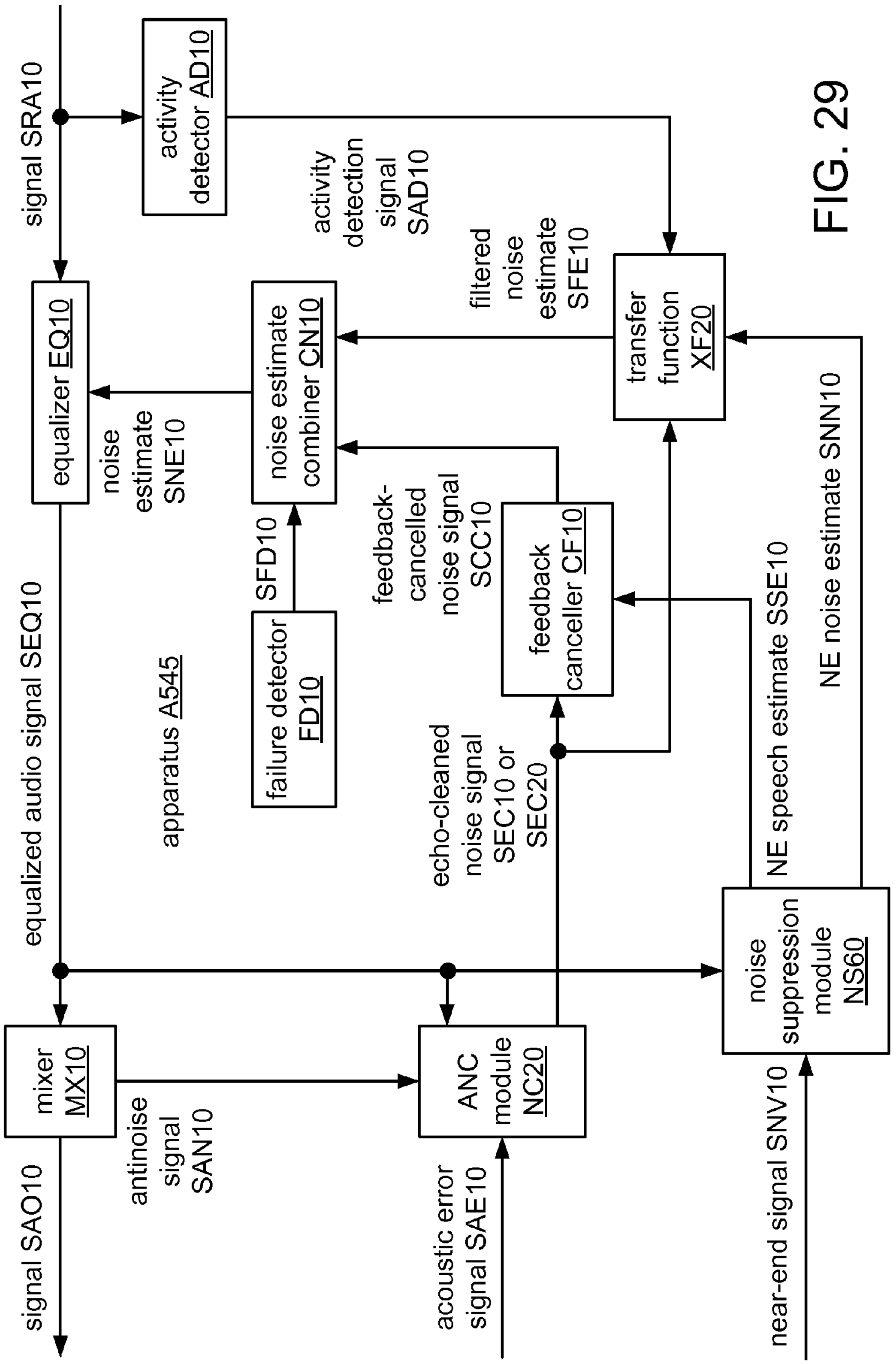
FIG. 29 shows a block diagram of an implementation A545 of apparatus A140.

FIG. 29 shows a block diagram of such an implementation A545 of apparatus A140 that includes an instance of noise suppression module NS60 (or NS50) and a failure detector FD10. Failure detector FD10 is configured to produce a failure detection signal SFD10 whose state indicates the value of a measure of reliability of a monitored noise estimate. For example, failure detector FD10 may be configured to produce failure detection signal SFD10 based on a state of a relation between a change over time dM (e.g., a difference between adjacent frames) of the power level of the monitored noise estimate and a change over time dN of the power level of a near-end noise estimate. An increase in dM, in the absence of a corresponding increase in dN, may be expected to indicate that the monitored noise estimate is not currently reliable. In this case, noise estimate combiner CN10 is arranged to select another noise estimate in response to an indication by failure detection signal SFD10 that the monitored noise estimate is currently unreliable. The power level during a segment of a noise estimate may be calculated, for example, as a sum of the squared samples of the segment.

In one example, failure detection signal SFD10 has a first state (e.g., on, one, high, select external) when a ratio of dM to dN (or a difference between dM and dN, in a decibel or other logarithmic domain) is above a threshold value (alternatively, not less than the threshold value), and a second state (e.g., off, zero, low, select internal) otherwise. The threshold value may be a fixed value or an adaptive value (e.g., based on a time-averaged energy of the near-end noise estimate).

It may be desirable to configure failure detector FD10 to be responsive to a steady trend rather than to transients. For example, it may be desirable to configure failure detector FD10 to temporally smooth dM and dN before evaluating the relation between them (e.g., a ratio or difference as described above). Additionally or alternatively, it may be desirable to configure failure detector FD10 to temporally smooth the calculated value of the relation before applying the threshold value. In either case, examples of such a temporal smoothing operation include averaging, lowpass filtering, and applying a first-order IIR filter or "leaky integrator."

Tuning noise suppression filter FN10 (or FN30) to produce a near-end noise estimate SNN10 that is suitable for noise suppression may result in a noise estimate that is less suitable for equalization. It may be desirable to inactivate noise suppression filter FN10 at some times during use of device A100 or A300 (e.g., to conserve power when spatially selective processing filter FN30 is not needed on the transmit path). It may be desirable to provide for a backup near-end noise estimate in case of failure of echo canceller EC10 and/or EC20.

Figure 30:
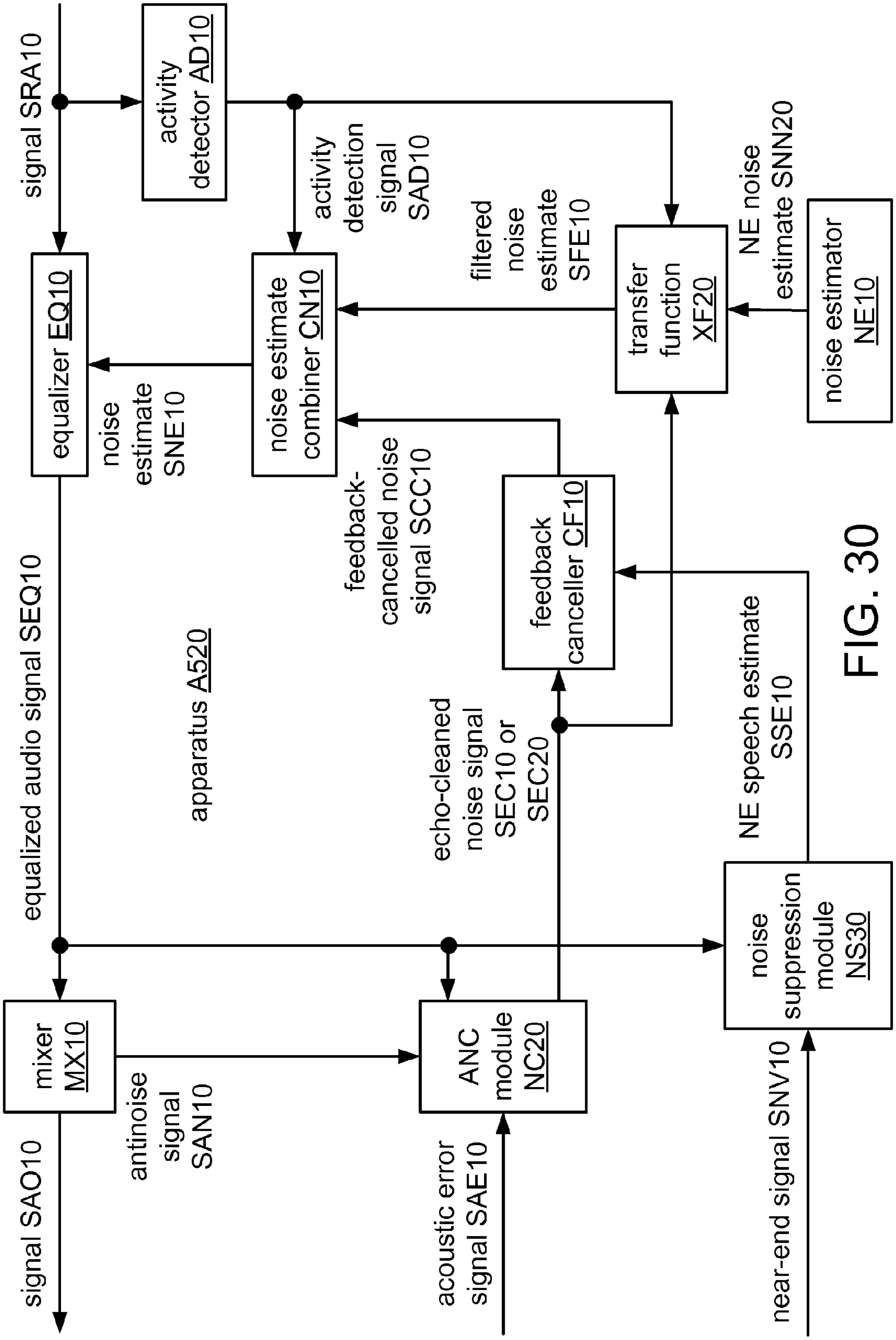
FIG. 30 shows a block diagram of an implementation A520 of apparatus A120.

For such cases, it may be desirable to configure apparatus A100 or A300 to include a noise estimation module that is configured to calculate another near-end noise estimate based on information from near-end signal SNV10. FIG. 30 shows a block diagram of such an implementation A520 of apparatus A120. Apparatus A520 includes a near-end noise estimator NE10 that is configured to calculate a near-end noise estimate SNN20 based on information from near-end signal SNV10 or echo-cleaned near-end signal SCN10. In one example, noise estimator NE10 is configured to calculate near-end noise estimate SNN20 by time-averaging noise frames of near-end signal SNV10 or echo-cleaned near-end signal SCN10 in a frequency domain, such as a transform domain (e.g., an FFT domain) or a subband domain. As compared to apparatus A140, apparatus A520 uses near-end noise estimate SNN20 instead of noise estimate SNN10. In another example, near-end noise estimate SNN20 is combined (e.g., averaged) with noise estimate SNN10 (e.g., upstream of transfer function XF20, noise estimate combiner CN10, and/or equalizer EQ10) to obtain a near-end noise estimate to support equalization of reproduced audio signal SRA10.

Figure 31A:
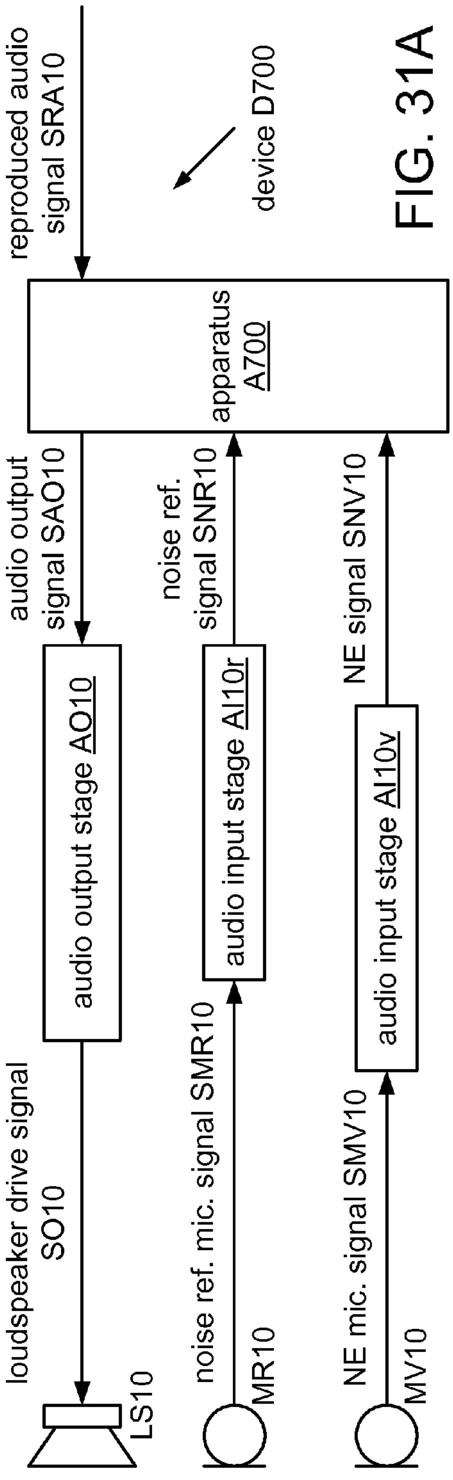
FIG. 31A shows a block diagram of an apparatus D700 according to a general configuration.
Figure 31B:
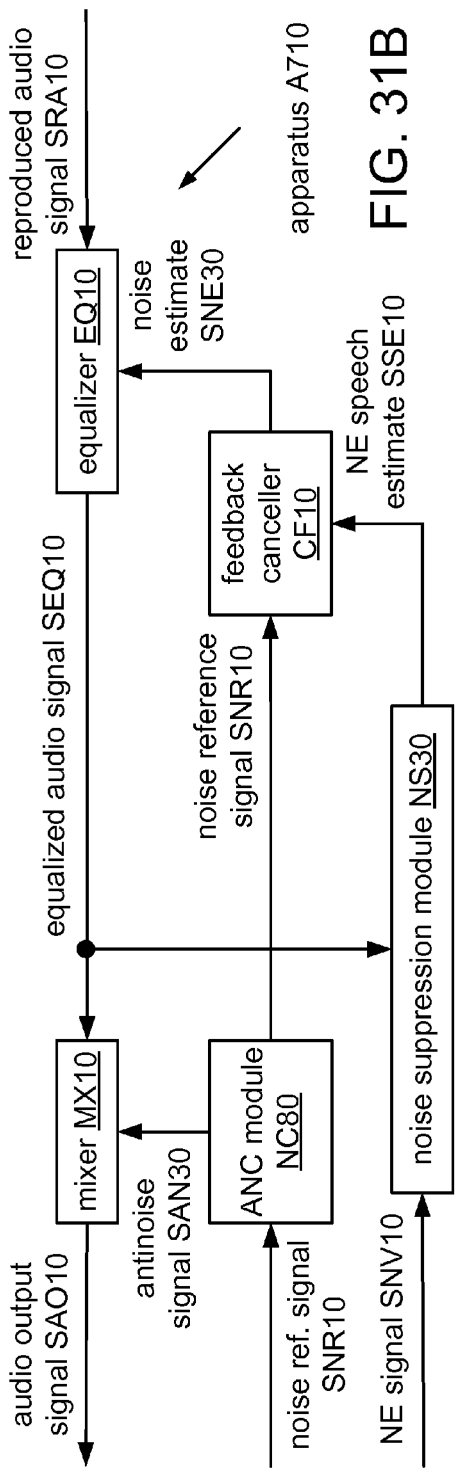
FIG. 31B shows a block diagram of an implementation A710 of apparatus A700.

FIG. 31A shows a block diagram of an apparatus D700 according to a general configuration that does not include error microphone ME10. FIG. 31B shows a block diagram of an implementation A710 of apparatus A700, which is analogous to apparatus A410 without error signal SAE10. Apparatus A710 includes an instance of noise suppression module NS30 (or NS20) and an ANC module NC80 that is configured to produce an antinoise signal SAN20 based on information from noise reference signal SNR10.

Figure 32A:
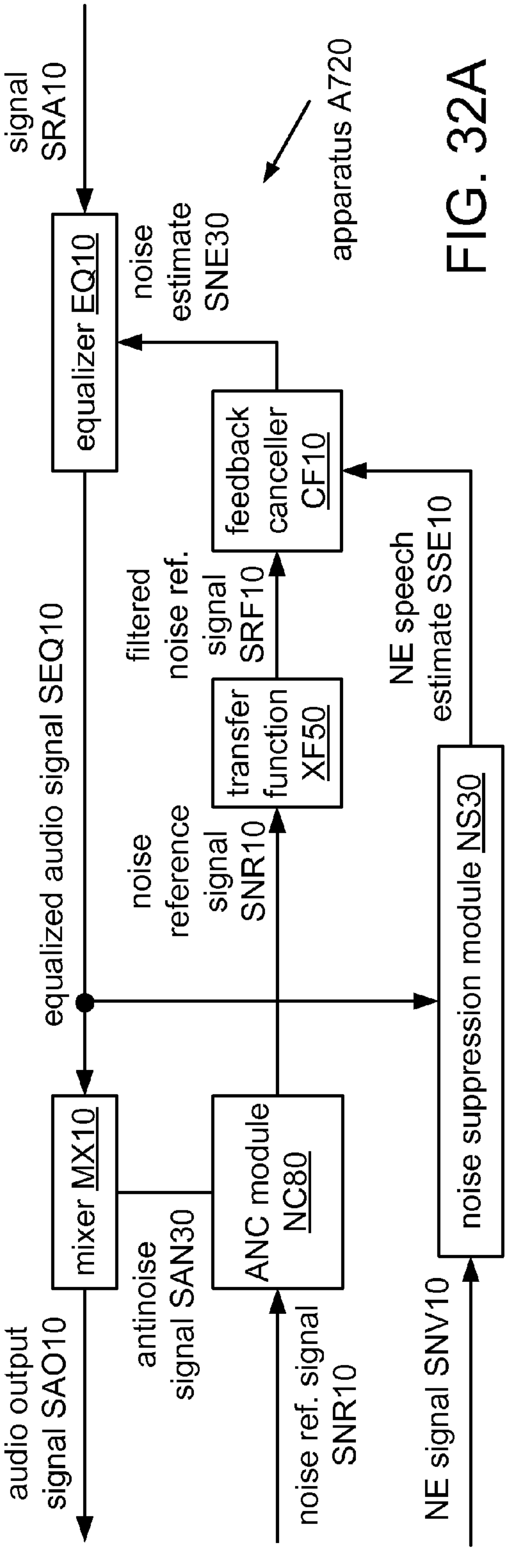
FIG. 32A shows a block diagram of an implementation A720 of apparatus A710.
Figure 32B:
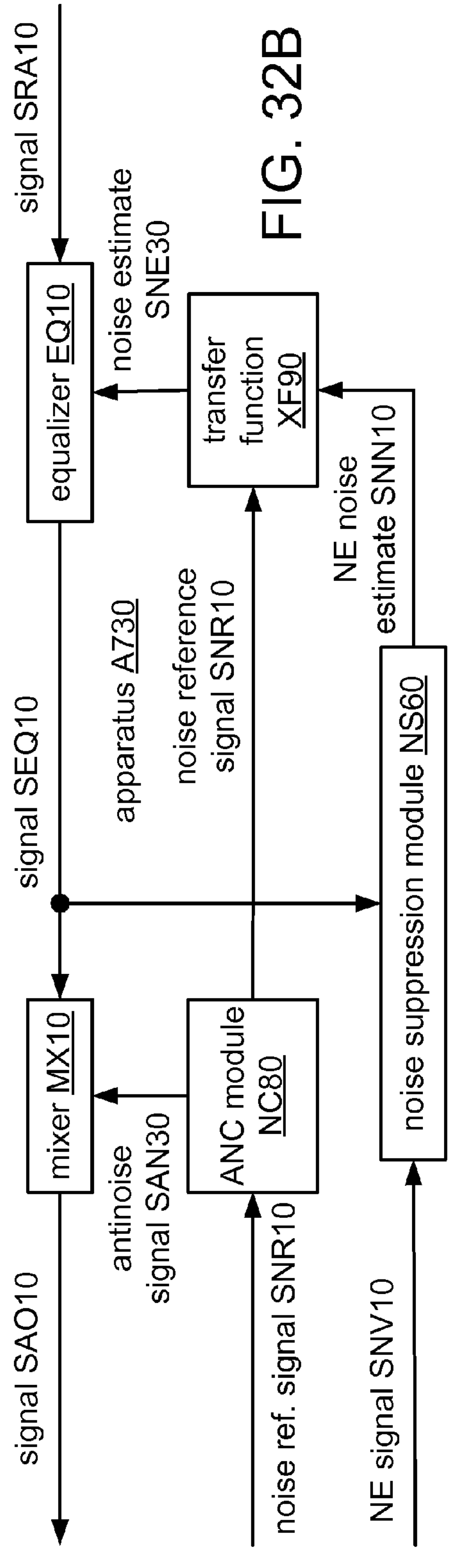
FIG. 32B shows a block diagram of an implementation A730 of apparatus A700.

FIG. 32A shows a block diagram of an implementation A720 of apparatus A710, which includes an instance of noise suppression module NS30 (or NS20) and is analogous to apparatus A480 without error signal SAE10. FIG. 32B shows a block diagram of an implementation A730 of apparatus A700, which includes an instance of noise suppression module NS60 (or NS50) and a transfer function XF90 that compensates near-end noise estimate SNN100, according to a model of the primary acoustic path P3 from noise reference point NRP1 to noise reference point NRP2, to produce noise estimate SNE30. It may be desirable to model the primary acoustic path P3 as a linear transfer function. A fixed state of this transfer function may be estimated offline by comparing the responses of microphones MV10 and MR10 in the presence of an acoustic noise signal during a simulated use of the device D700 (e.g., while it is held at the ear of a simulated user, such as a Head and Torso Simulator (HATS), Bruel and Kjaer, DK). Such an offline procedure may also be used to obtain an initial state of the transfer function for an adaptive implementation of the transfer function. Primary acoustic path P3 may also be modeled as a nonlinear transfer function.

Figure 33:
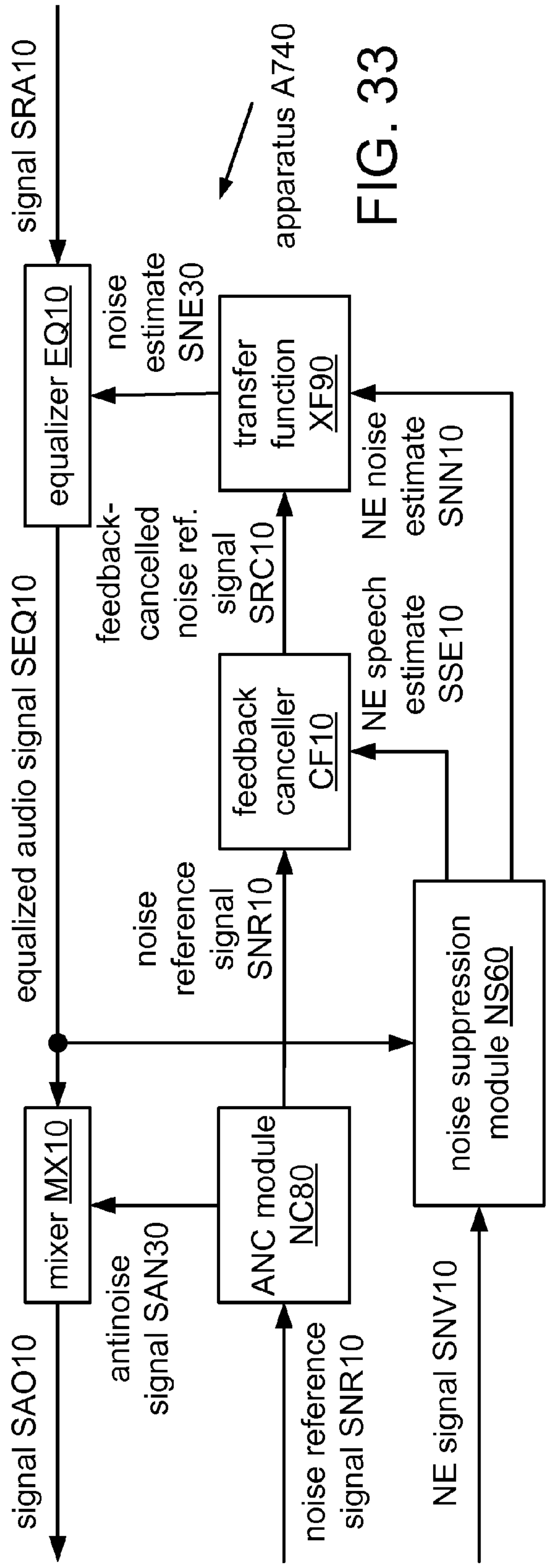
FIG. 33 shows a block diagram of an implementation A740 of apparatus A730.

FIG. 33 shows a block diagram of an implementation A740 of apparatus A730 that includes an instance of feedback canceller CF10 arranged to cancel near-end speech estimate SSE10 from noise reference signal SNR10 to produce a feedback-cancelled noise reference signal SRC10. Apparatus A740 may also be implemented such that transfer function XF90 is configured to receive a control input from an instance of activity detector AD10 that is arranged as described herein with reference to apparatus A140 and to enable or disable adaptation according to the state of the control input (e.g., in response to a level of activity of signal SRA10 or SEQ10).

Apparatus A700 may be implemented to include an instance of noise estimate combiner CN10 that is arranged to select among near-end noise estimate SNN10 and a synthesized estimate of the noise signal at ear reference point ERP. Alternatively, apparatus A700 may be implemented to calculate noise estimate SNE30 by filtering near-end noise estimate SNN10, noise reference signal SNR10, or feedback-cancelled noise reference signal SRC10 according to a prediction of the spectrum of the noise signal at ear reference point ERP.

It may be desirable to implement an adaptive equalization apparatus as described herein (e.g., apparatus A100, A300 or A700) to include compensation for a secondary path. Such compensation may be performed using an adaptive inverse filter. In one example, the apparatus is configured to compare the monitored power spectral density (PSD) at ERP (e.g., from acoustic error signal SAE10) to the PSD applied at the output of a digital signal processor in the receive path (e.g., from audio output signal SAO10). The adaptive filter may be configured to correct equalized audio signal SEQ10 or audio output signal SAO10 for any deviation of the frequency response, which may be caused by variation of the acoustical load.

Figure 34:
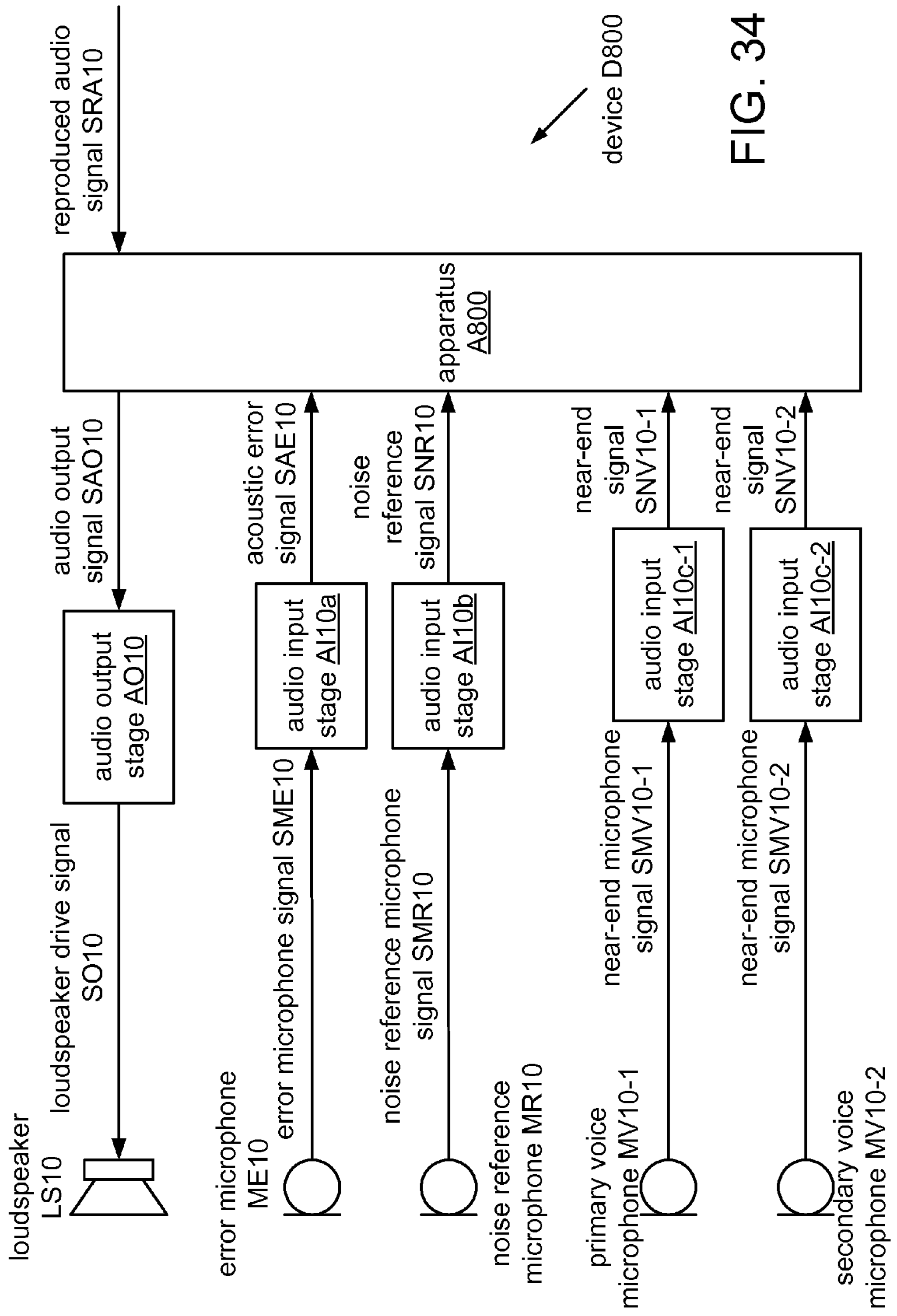
FIG. 34 shows a block diagram of a multichannel implementation D800 of device D400.
Figure 35:
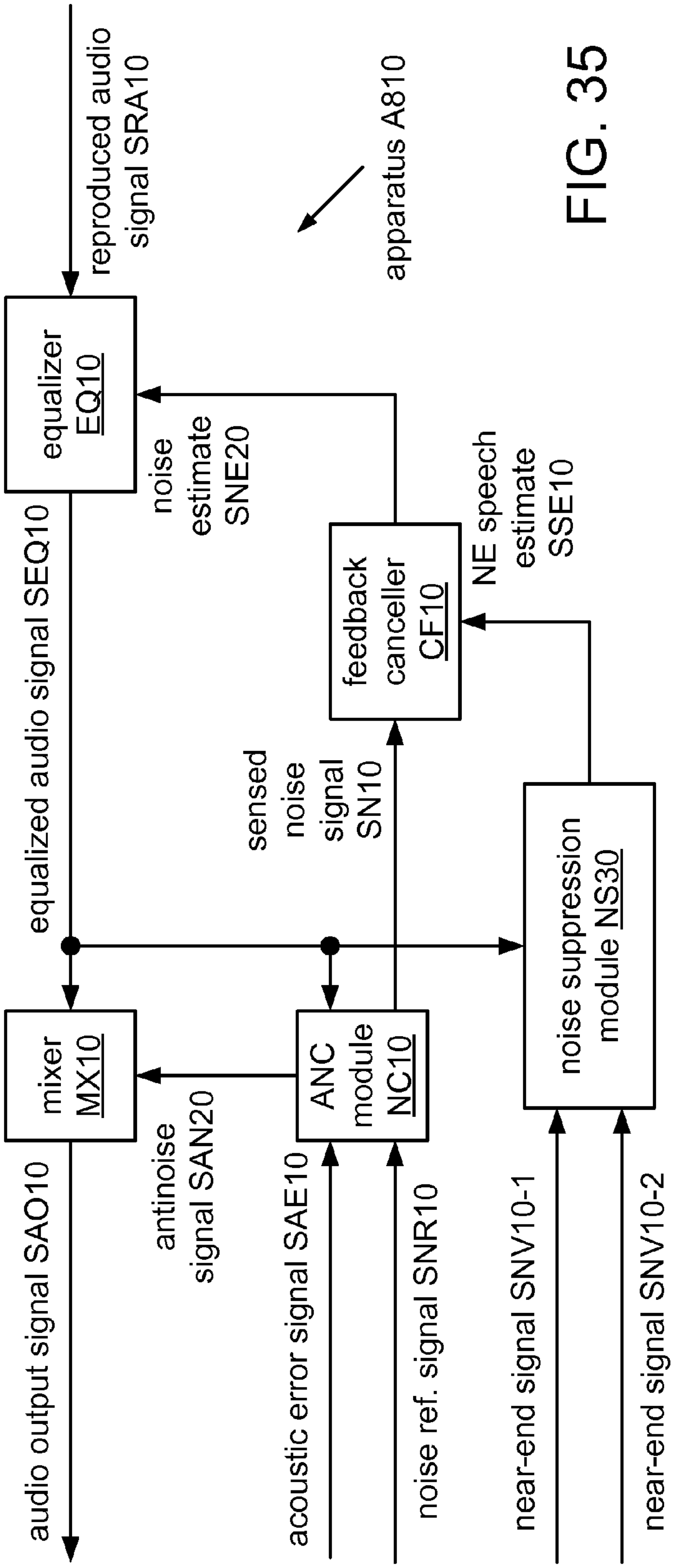
FIG. 35 shows a block diagram of an implementation A810 of apparatus A410 and A800.

In general, any implementation of device D100, D300, D400, or D700 as described herein may be constructed to include multiple instances of voice microphone MV10, and all such implementations are expressly contemplated and hereby disclosed. For example, FIG. 34 shows a block diagram of a multichannel implementation D800 of device D400 that includes apparatus A800, and FIG. 35 shows a block diagram of an implementation A810 of apparatus A800 that is a multichannel implementation of apparatus A410. It is possible for device D800 (or a multichannel implementation of device D700) to be configured such that the same microphone serves as both noise reference microphone MR10 and secondary voice microphone MV10-2.

A combination of a near-end noise estimate based on information from a multichannel near-end signal and a noise estimate based on information from error microphone signal SME10 may be expected to yield a robust nonstationary noise estimate for equalization purposes. It should be kept in mind that a handset is typically only held to one ear, so that the other ear is exposed to the background noise. In such applications, a noise estimate based on information from an error microphone signal at one ear may not be sufficient by itself, and it may be desirable to configure noise estimate combiner CN10 to combine (e.g., to mix) such a noise estimate with a noise estimate that is based on information from one or more voice microphone and/or noise reference microphone signals.

Each of the various transfer functions described herein may be implemented as a set of time-domain coefficients or a set of frequency-domain (e.g., subband or transform-domain) factors. Adaptive implementation of such transfer functions may be performed by altering the values of one or more such coefficients or factors or by selecting among a plurality of fixed sets of such coefficients or factors. It is expressly noted that any implementation as described herein that includes an adaptive implementation of a transfer function (e.g., XF10, XF60, XF70) may also be implemented to include an instance of activity detector AD10 arranged as described herein (e.g., to monitor signal SRA10 and/or SEQ10) to enable or disable the adaptation. It is also expressly noted that in any implementation as described herein that includes an instance of noise estimate combiner CN10, the combiner may be configured to select among and/or otherwise combine three or more noise estimates (e.g., a noise estimate based on information from error signal SAE10, a near-end noise estimate SNN10, and a near-end noise estimate SNN20).

The processing elements of an implementation of apparatus A100, A200, A300, A400, or A700 as described herein (i.e., the elements that are not transducers) may be implemented in hardware and/or in a combination of hardware with software and/or firmware. For example, one or more (possibly all) of these processing elements may be implemented on a processor that is also configured to perform one or more other operations (e.g., vocoding) on speech information from signal SNV10 (e.g., near-end speech estimate SSE10).

An adaptive equalization device as described herein (e.g., device D100, D200, D300, D400, or D700) may include a chip or chipset that includes an implementation of the corresponding apparatus A100, A200, A300, A400, or A700 as described herein. The chip or chipset (e.g., a mobile station modem (MSM) chipset) may include one or more processors, which may be configured to execute all or part of the apparatus (e.g., as instructions). The chip or chipset may also include other processing elements of the device (e.g., elements of audio input stage AI10 and/or elements of audio output stage A010).

Such a chip or chipset may also include a receiver, which is configured to receive a radio-frequency (RF) communications signal via a wireless transmission channel and to decode an audio signal encoded within the RF signal (e.g., reproduced audio signal SRA10), and a transmitter, which is configured to encode an audio signal that is based on speech information from signal SNV10 (e.g., near-end speech estimate SSE10) and to transmit an RF communications signal that describes the encoded audio signal.

Such a device may be configured to transmit and receive voice communications data wirelessly via one or more encoding and decoding schemes (also called "codecs"). Examples of such codecs include the Enhanced Variable Rate Codec, as described in the Third Generation Partnership Project 2 (3GPP2) document C.S0014-C, v1.0, entitled "Enhanced Variable Rate Codec, Speech Service Options 3, 68, and 70 for Wideband Spread Spectrum Digital Systems," February 2007 (available online at www-dot-3gpp-dot-org); the Selectable Mode Vocoder speech codec, as described in the 3GPP2 document C.S0030-0, v3.0, entitled "Selectable Mode Vocoder (SMV) Service Option for Wideband Spread Spectrum Communication Systems," January 2004 (available online at www-dot-3gpp-dot-org); the Adaptive Multi Rate (AMR) speech codec, as described in the document ETSI TS126 092 V6.0.0 (European Telecommunications Standards Institute (ETSI), Sophia Antipolis Cedex, FR, December 2004); and the AMR Wideband speech codec, as described in the document ETSI TS126 192 V6.0.0 (ETSI, December 2004). In such case, the chip or chipset CS10 be implemented as a Bluetooth™ and/or mobile station modem (MSM) chipset.

Figure 36:
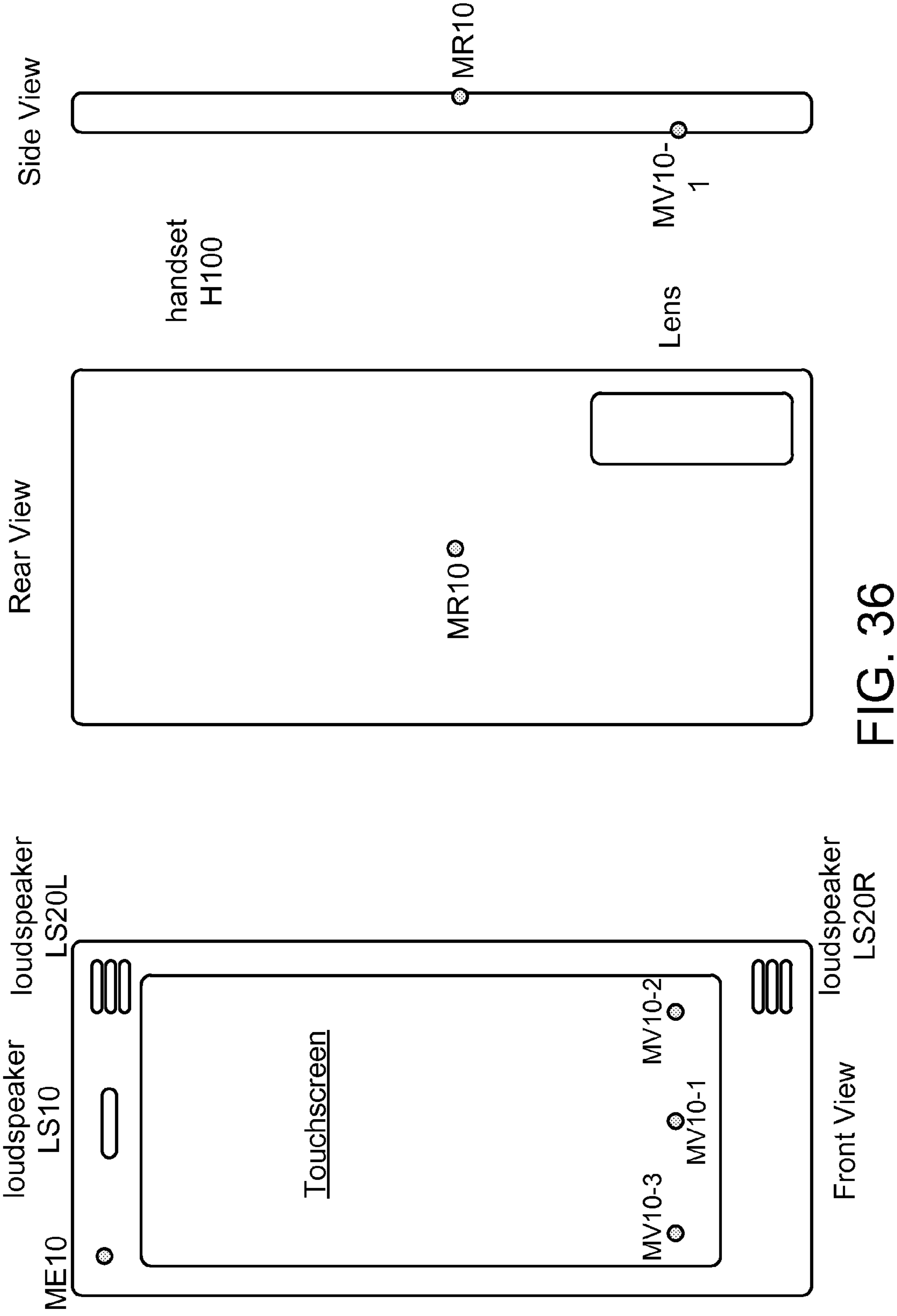
FIG. 36 shows front, rear, and side views of a handset H100.
Figure 37:
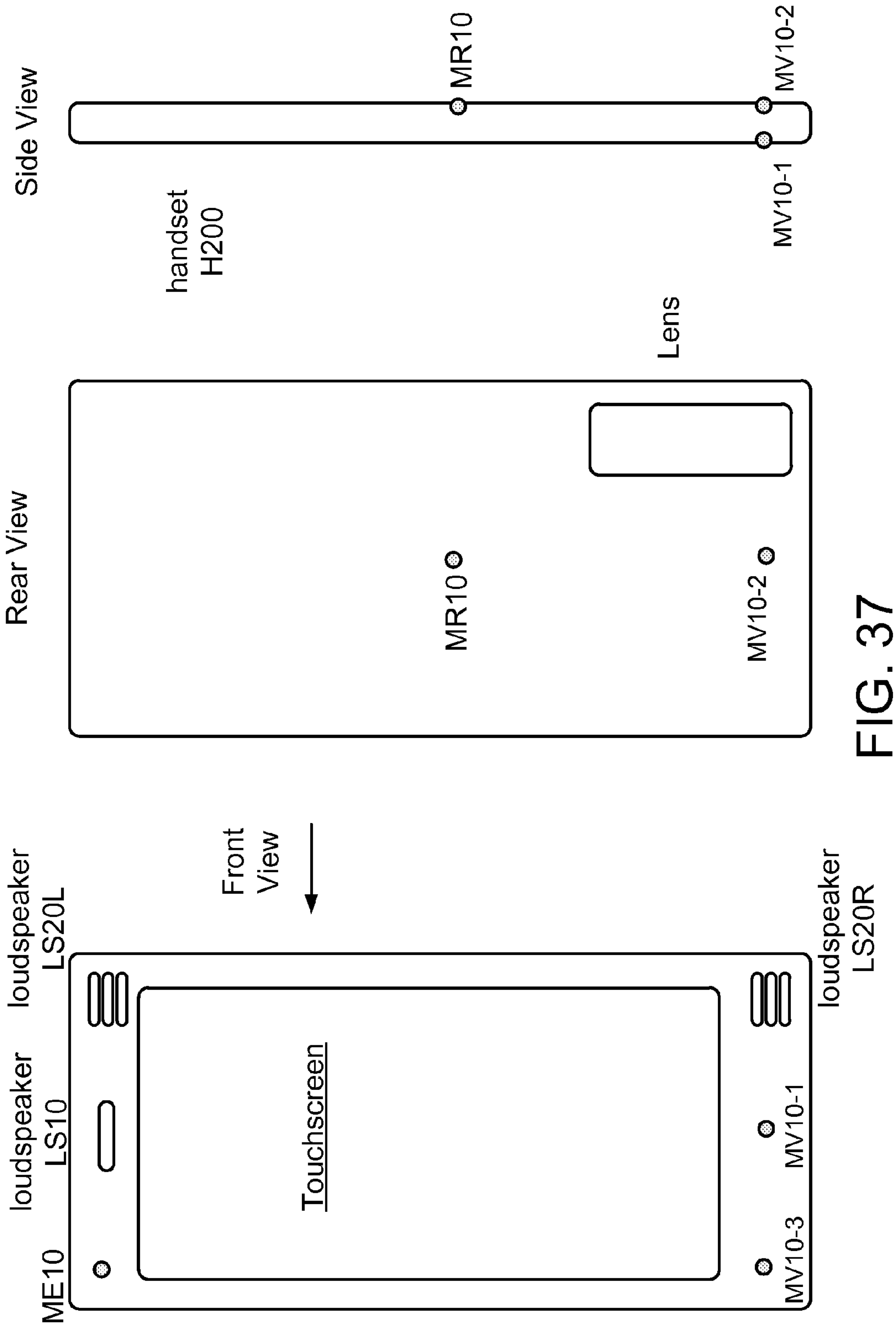
FIG. 37 shows front, rear, and side views of a handset H200.

Implementations of devices D100, D200, D300, D400, and D700 as described herein may be embodied in a variety of communications devices, including headsets, headsets, earbuds, and earcups. FIG. 36 shows front, rear, and side views of a handset H100 having three voice microphones MV10-1, MV10-2, and MV10-3 arranged in a linear array on the front face, error microphone ME10 located in a top corner of the front face, and noise reference microphone MR10 located on the back face. Loudspeaker LS10 is arranged in the top center of the front face near error microphone ME10. FIG. 37 shows front, rear, and side views of a handset H200 having a different arrangement of the voice microphones. In this example, voice microphones MV10-1 and MV10-3 are located on the front face, and voice microphone MV10-2 is located on the back face. A maximum distance between the microphones of such handsets is typically about ten or twelve centimeters.

In a further example, a communications handset (e.g., a cellular telephone handset) that includes the processing elements of an implementation of an adaptive equalization apparatus as described herein (e.g., apparatus A100, A200, A300, or A400) is configured to receive acoustic error signal SAE10 from a headset that includes error microphone ME10 and to output audio output signal SAO10 to the headset over a wired and/or wireless communications link (e.g., using a version of the Bluetooth™ protocol as promulgated by the Bluetooth Special Interest Group, Inc., Bellevue, Wash.). Device D700 may be similarly implemented by a handset that receives noise reference signal SNR10 from a headset and outputs audio output signal SAO10 to the headset.

An earpiece or other headset having one or more microphones is one kind of portable communications device that may include an implementation of an equalization device as described herein (e.g., device D100, D200, D300, D400, or D700). Such a headset may be wired or wireless. For example, a wireless headset may be configured to support half- or full-duplex telephony via communication with a telephone device such as a cellular telephone handset (e.g., using a version of the Bluetooth™ protocol).

Figures 38A, 38B, 38C, 38D:
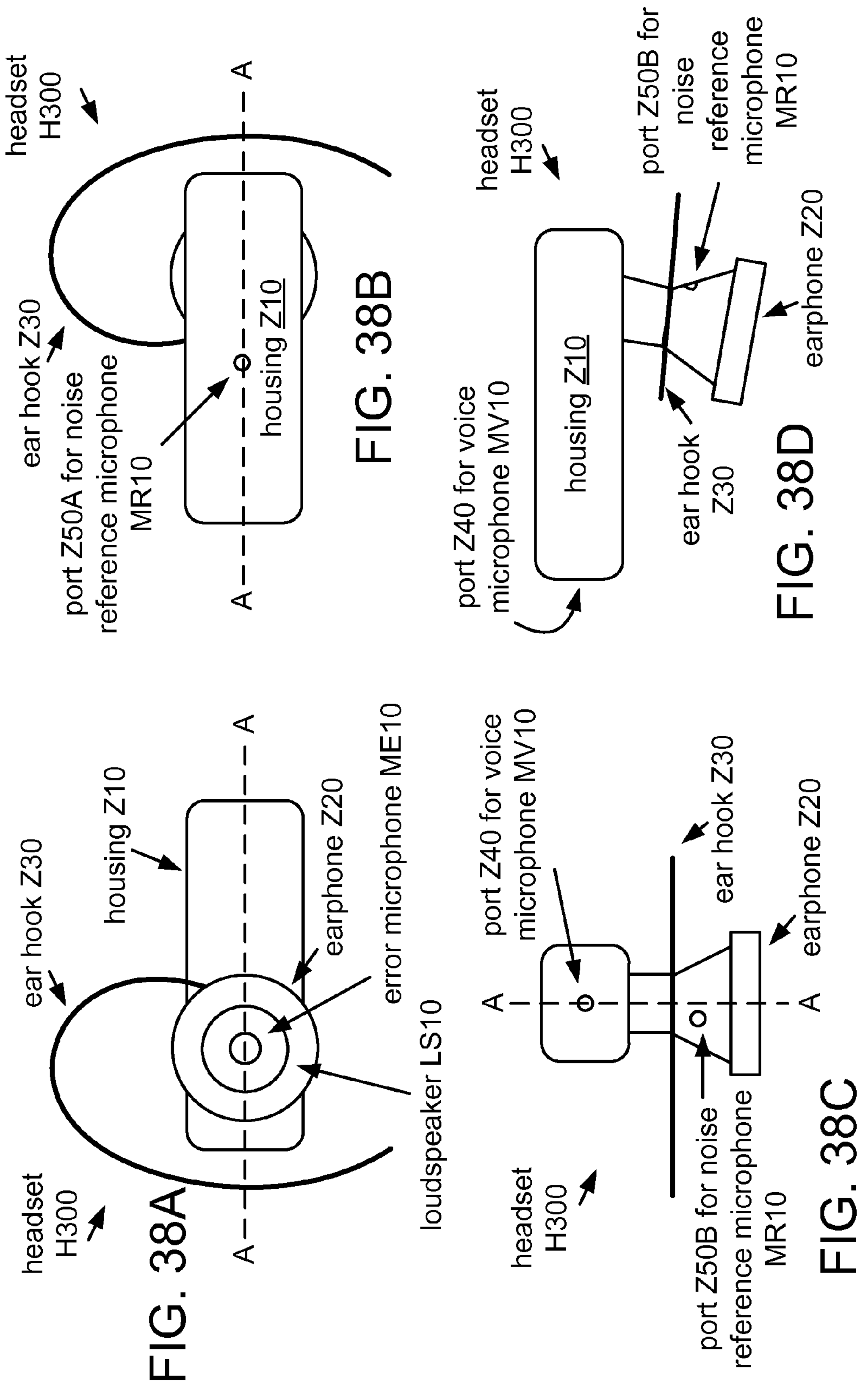
FIGS. 38A-38D show various views of a headset H300.

FIGS. 38A to 38D show various views of a multi-microphone portable audio sensing device H300 that may include an implementation of an equalization device as described herein. Device H300 is a wireless headset that includes a housing Z10 which carries voice microphone MV10 and noise reference microphone MR10, and an earphone Z20 that includes error microphone ME10 and loudspeaker LS10 and extends from the housing. In general, the housing of a headset may be rectangular or otherwise elongated as shown in FIGS. 38A, 38B, and 38D (e.g., shaped like a miniboom) or may be more rounded or even circular. The housing may also enclose a battery and a processor and/or other processing circuitry (e.g., a printed circuit board and components mounted thereon) and may include an electrical port (e.g., a mini-Universal Serial Bus (USB) or other port for battery charging) and user interface features such as one or more button switches and/or LEDs. Typically the length of the housing along its major axis is in the range of from one to three inches.

Figure 39:
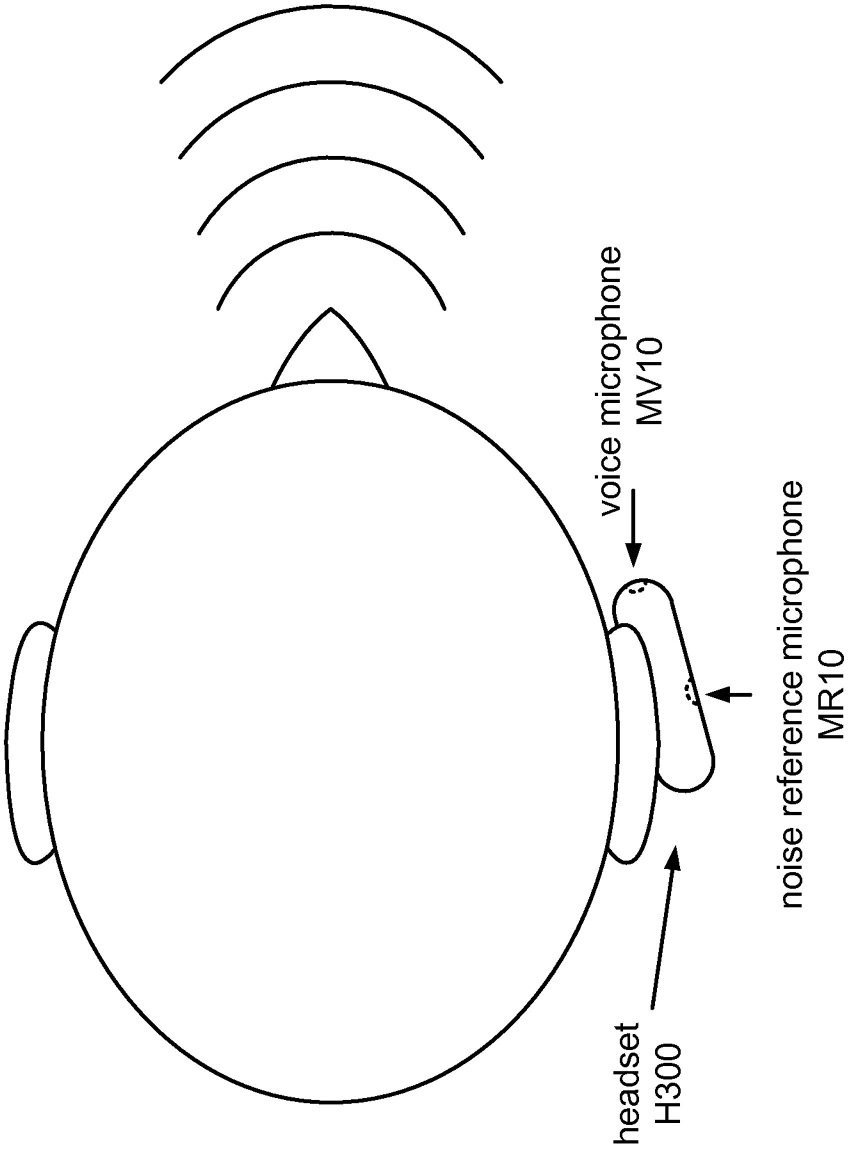
FIG. 39 shows a top view of an example of headset H300 in use being worn at the user's right ear.
Figure 40A:
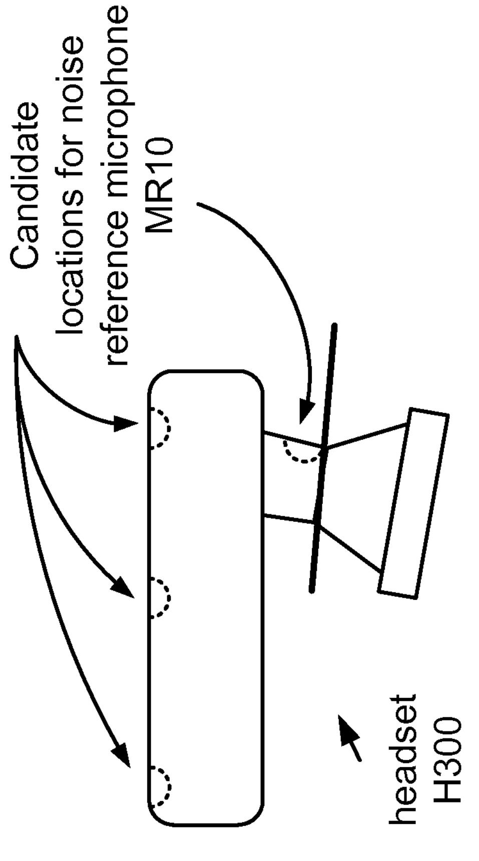
FIG. 40A shows several candidate locations for noise reference microphone MR10.

Error microphone ME10 of device H300 is directed at the entrance to the user's ear canal (e.g., down the user's ear canal). Typically each of voice microphone MV10 and noise reference microphone MR10 of device H300 is mounted within the device behind one or more small holes in the housing that serve as an acoustic port. FIGS. 38B to 38D show the locations of the acoustic port Z40 for voice microphone MV10 and two examples Z50A, Z50B of the acoustic port Z50 for noise reference microphone MR10 (and/or for a secondary voice microphone). In this example, microphones MV10 and MR10 are directed away from the user's ear to receive external ambient sound. FIG. 39 shows a top view of headset H300 mounted on a user's ear in a standard orientation relative to the user's mouth. FIG. 40A shows several candidate locations at which noise reference microphone MR10 (and/or a secondary voice microphone) may be disposed within headset H300.

A headset may include a securing device, such as ear hook Z30, which is typically detachable from the headset. An external ear hook may be reversible, for example, to allow the user to configure the headset for use on either ear. Alternatively or additionally, the earphone of a headset may be designed as an internal securing device (e.g., an earplug) which may include a removable earpiece to allow different users to use an earpiece of different size (e.g., diameter) for better fit to the outer portion of the particular user's ear canal. As shown in FIG. 38A, the earphone of a headset may also include error microphone ME10.

Figure 40B:
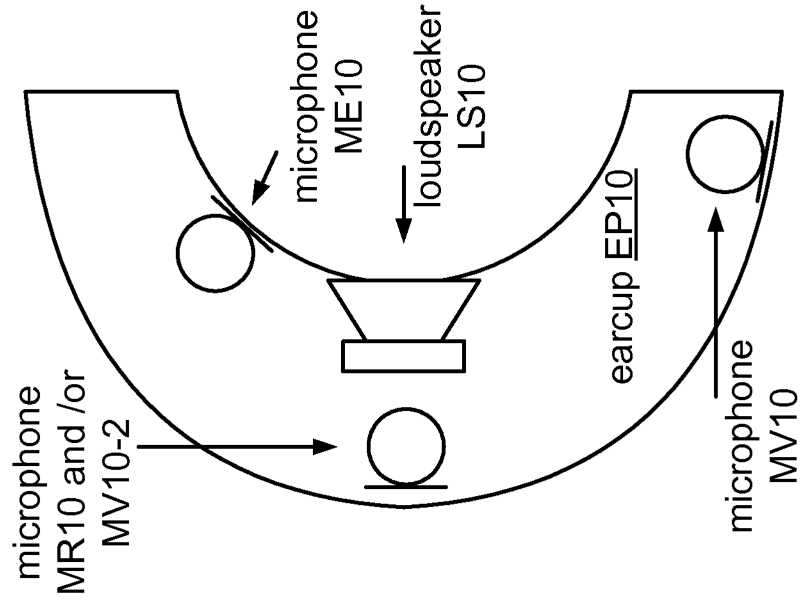
FIG. 40B shows a cross-sectional view of an earcup EP10.

An equalization device as described herein (e.g., device D100, D200, D300, D400, or D700) may be implemented to include one or a pair of earcups, which are typically joined by a band to be worn over the user's head. FIG. 40B shows a cross-sectional view of an earcup EP10 that contains loudspeaker LS10, arranged to produce an acoustic signal to the user's ear (e.g., from a signal received wirelessly or via a cord). Earcup EP10 may be configured to be supra-aural (i.e., to rest over the user's ear without enclosing it) or circumaural (i.e., to enclose the user's ear).

Earcup EP10 includes a loudspeaker LS10 that is arranged to reproduce loudspeaker drive signal SO10 to the user's ear and an error microphone ME10 that is directed at the entrance to the user's ear canal and arranged to sense an acoustic error signal (e.g., via an acoustic port in the earcup housing). It may be desirable in such case to insulate microphone ME10 from receiving mechanical vibrations from loudspeaker LS10 through the material of the earcup.

In this example, earcup EP10 also includes voice microphone MC10. In other implementations of such an earcup, voice microphone MV10 may be mounted on a boom or other protrusion that extends from a left or right instance of earcup EP10. In this example, earcup EP10 also includes noise reference microphone MR10 arranged to receive the environmental noise signal via an acoustic port in the earcup housing. It may be desirable to configure earcup EP10 such that noise reference microphone MR10 also serves as secondary voice microphone MV10-2.

Figure 41B:
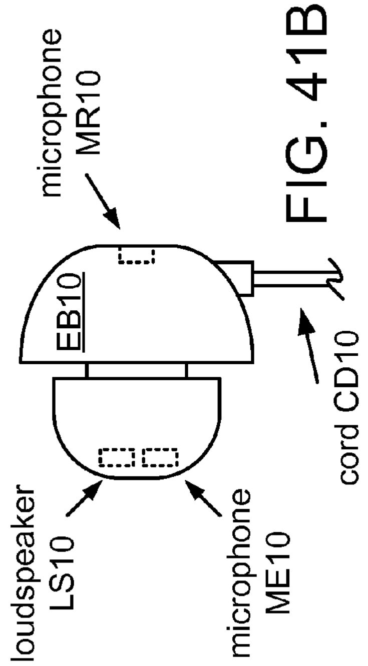
FIG. 41B shows a front view of earbud EB10.

As an alternative to earcups, an equalization device as described herein (e.g., device D100, D200, D300, D400, or D700) may be implemented to include one or a pair of earbuds. FIG. 41A shows an example of a pair of earbuds in use, with noise reference microphone MR10 mounted on an earbud at the user's ear and voice microphone MV10 mounted on a cord CD10 that connects the earbud to a portable media player MP100. FIG. 41B shows a front view of an example of an earbud EB10 that contains loudspeaker LS10 error microphone ME10 directed at the entrance to the user's ear canal, and noise reference microphone MR10 directed away from the user's ear canal. During use, earbud EB10 is worn at the user's ear to direct an acoustic signal produced by loudspeaker LS10 (e.g., from a signal received via cord CD10) into the user's ear canal. It may be desirable for a portion of earbud EB10 which directs the acoustic signal into the user's ear canal to be made of or covered by a resilient material, such as an elastomer (e.g., silicone rubber), such that it may be comfortably worn to form a seal with the user's ear canal. It may be desirable to insulate microphones ME10 and MR10 from receiving mechanical vibrations from loudspeaker LS10 through the structure of the earbud.

Figure 41C:
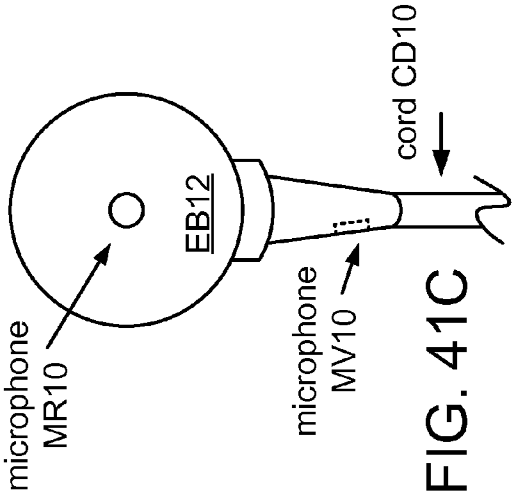
FIG. 41C shows a side view of an implementation EB12 of earbud EB10.
Figure 41A:
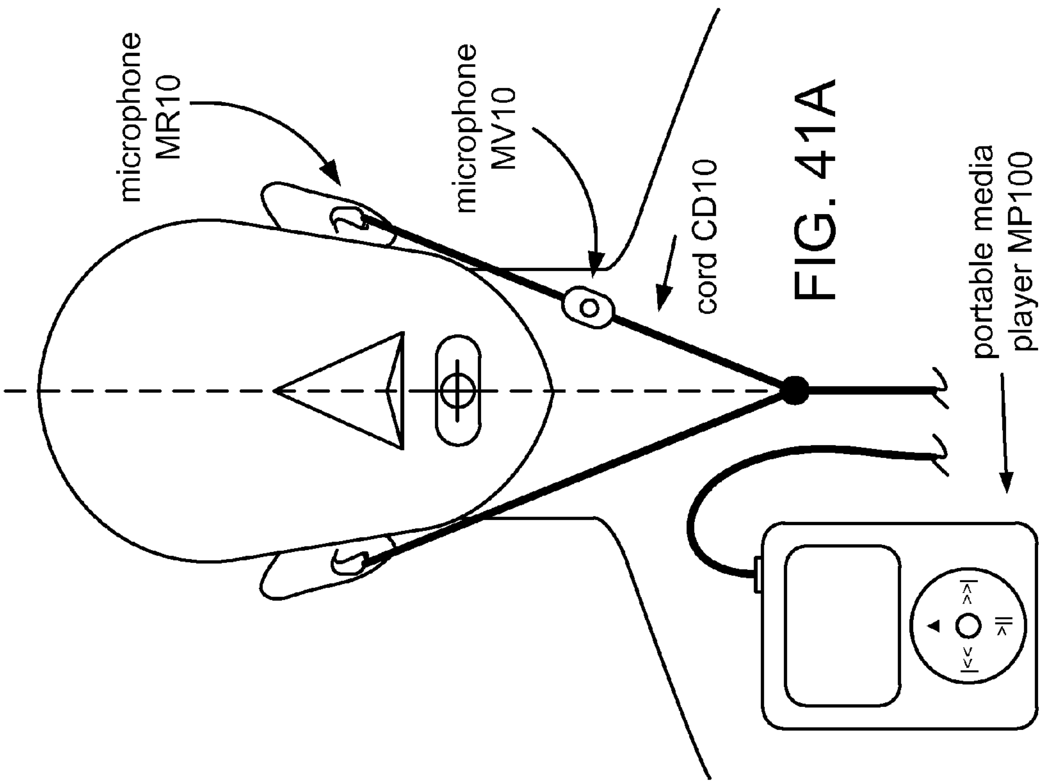
FIG. 41A shows an example of a pair of earbuds in use.

FIG. 41C shows a side view of an implementation EB12 of earbud EB10 in which microphone MV10 is mounted within a strain-relief portion of cord CD10 at the earbud such that microphone MV10 is directed toward the user's mouth during use. In another example, microphone MV10 is mounted on a semi-rigid cable portion of cord CD10 at a distance of about three to four centimeters from microphone MR10. The semi-rigid cable may be configured to be flexible and lightweight yet stiff enough to keep microphone MV10 directed toward the user's mouth during use.

In a further example, a communications handset (e.g., a cellular telephone handset) that includes the processing elements of an implementation of an adaptive equalization apparatus as described herein (e.g., apparatus A100, A200, A300, or A400) is configured to receive acoustic error signal SAE10 from an earcup or earbud that includes error microphone ME10 and to output audio output signal SAO10 to the earcup or earbud over a wired and/or wireless communications link (e.g., using a version of the Bluetooth™ protocol). Device D700 may be similarly implemented by a handset that receives noise reference signal SNR10 from an earcup or earbud and outputs audio output signal SAO10 to the earcup or earbud.

An equalization device, such as an earcup or headset, may be implemented to produce a monophonic audio signal. Alternatively, such a device may be implemented to produce a respective channel of a stereophonic signal at each of the user's ears (e.g., as stereo earphones or a stereo headset). In this case, the housing at each ear carries a respective instance of loudspeaker LS10. It may be sufficient to use the same near-end noise estimate SNN10 for both ears, but it may be desirable to provide a different instance of the internal noise estimate (e.g., echo-cleaned noise signal SEC10 or SEC20) for each ear. For example, it may be desirable to include one or more microphones at each ear to produce a respective instance of error microphone ME10 and/or noise reference signal SNR10 for that ear, and it may also be desirable to include a respective instance of ANC module NC10, NC20, or NC80 for each ear to produce a corresponding instance of anti-noise signal SAN10. For a case in which reproduced audio signal SRA10 is stereophonic, equalizer EQ10 may be implemented to process each channel separately according to the equalization noise estimate (e.g., signal SNE10, SNE20, or SNE30).

It is expressly disclosed that applicability of systems, methods, devices, and apparatus disclosed herein includes and is not limited to the particular examples disclosed herein and/or shown in FIGS. 36 to 41C.

Figure 42B:
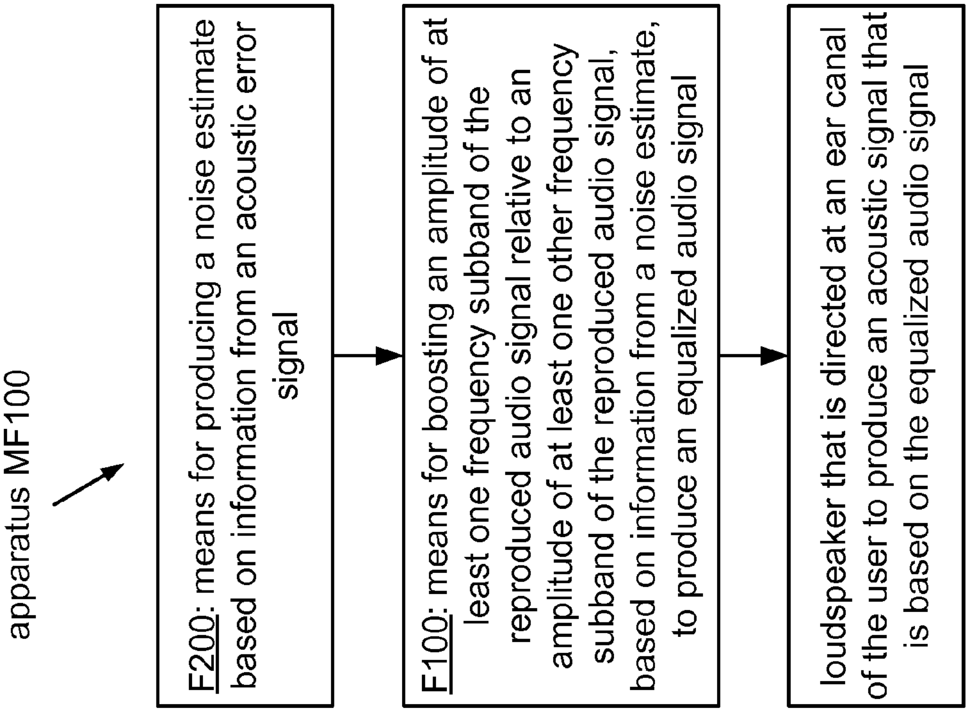
FIG. 42B shows a block diagram of an apparatus MF100 according to a general configuration.
Figure 42A:
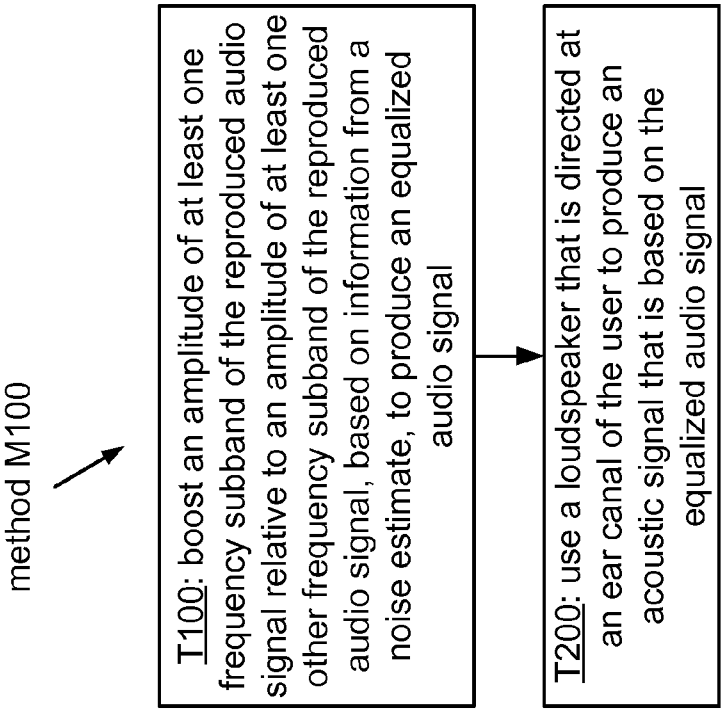
FIG. 42A shows a flowchart of a method M100 according to a general configuration.

FIG. 42A shows a flowchart of a method M100 of processing a reproduced audio signal according to a general configuration that includes tasks T100 and T200. Method M100 may be performed within a device that is configured to process audio signals, such as any of implementations of device D100, D200, D300, and D400 described herein. Task T100 boosts an amplitude of at least one frequency subband of the reproduced audio signal relative to an amplitude of at least one other frequency subband of the reproduced audio signal, based on information from a noise estimate, to produce an equalized audio signal (e.g., as described herein with reference to equalizer EQ10). Task T200 uses a loudspeaker that is directed at an ear canal of the user to produce an acoustic signal that is based on the equalized audio signal. In this method, the noise estimate is based on information from an acoustic error signal produced by an error microphone that is directed at the ear canal of the user.

FIG. 42B shows a block diagram of an apparatus MF100 for processing a reproduced audio signal according to a general configuration. Apparatus MF100 may be included within a device that is configured to process audio signals, such as any of implementations of device D100, D200, D300, and D400 described herein. Apparatus MF100 includes means F200 for producing a noise estimate based on information from an acoustic error signal. In this apparatus, the acoustic error signal that is produced by an error microphone that is directed at the ear canal of the user. Apparatus MF100 also includes means F100 for boosting an amplitude of at least one frequency subband of the reproduced audio signal relative to an amplitude of at least one other frequency subband of the reproduced audio signal, based on information from a noise estimate, to produce an equalized audio signal (e.g., as described herein with reference to equalizer EQ10). Apparatus MF100 also includes a loudspeaker that is directed at an ear canal of the user to produce an acoustic signal that is based on the equalized audio signal.

Figure 43A:
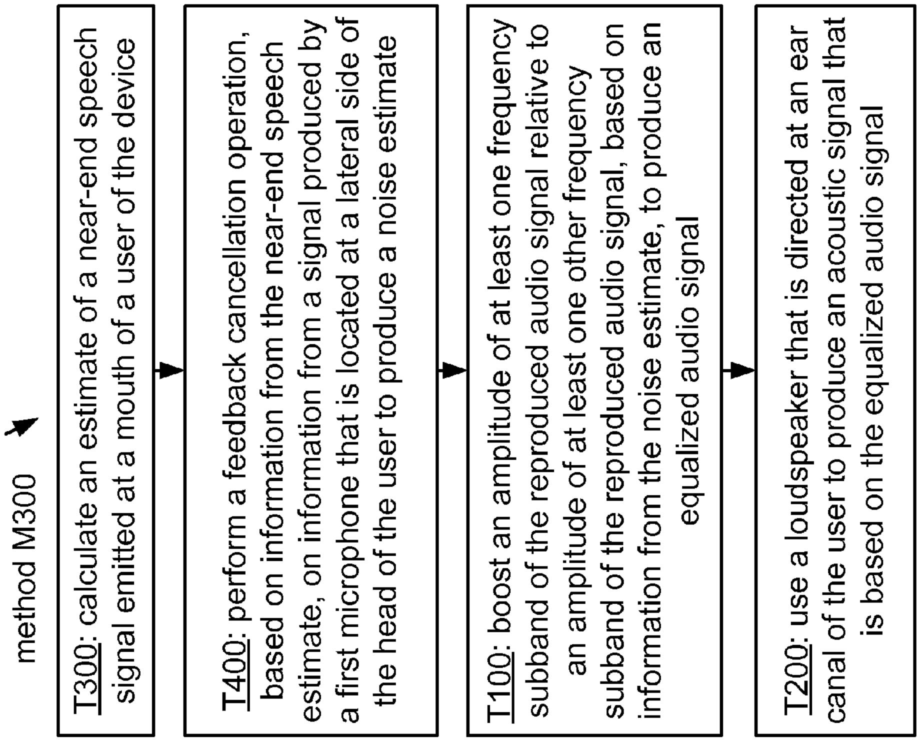
FIG. 43A shows a flowchart of a method M300 according to a general configuration.

FIG. 43A shows a flowchart of a method M300 of processing a reproduced audio signal according to a general configuration that includes tasks T100, T200, T300, and T400. Method M300 may be performed within a device that is configured to process audio signals, such as any of implementations of device D300, D400, and D700 described herein. Task T300 calculates an estimate of a near-end speech signal emitted at a mouth of a user of the device (e.g., as described herein with reference to noise suppression module NS10). Task T400 performs a feedback cancellation operation, based on information from the near-end speech estimate, on information from a signal produced by a first microphone that is located at a lateral side of the head of the user to produce the noise estimate (e.g., as described herein with reference to feedback canceller CF10).

Figure 43B:
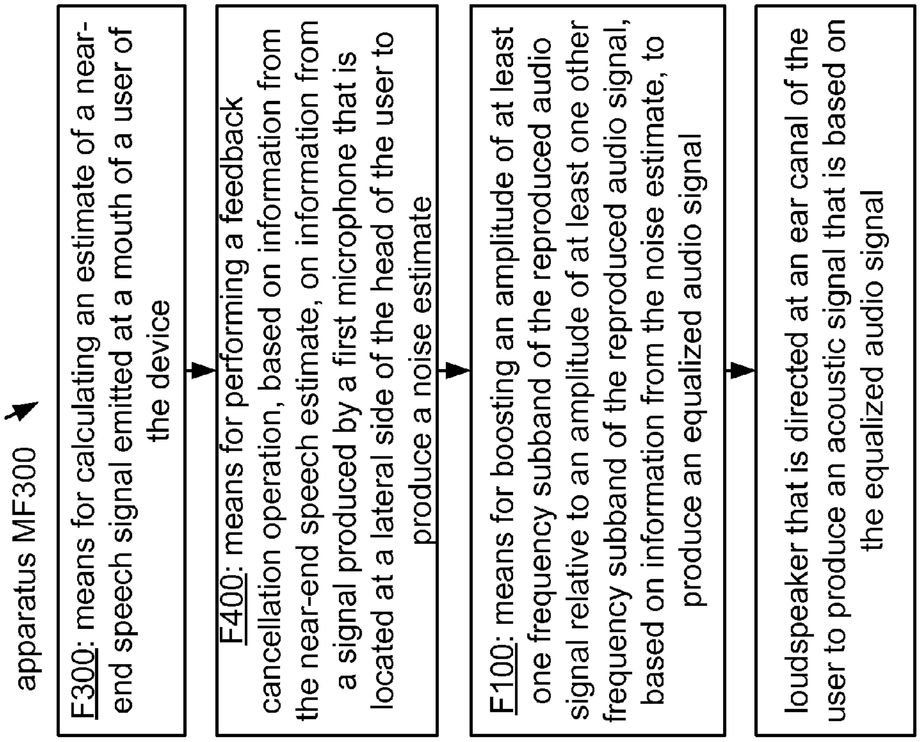
FIG. 43B shows a block diagram of an apparatus MF300 according to a general configuration.

FIG. 43B shows a block diagram of an apparatus MF300 for processing a reproduced audio signal according to a general configuration. Apparatus MF300 may be included within a device that is configured to process audio signals, such as any of implementations of device D300, D400, and D700 described herein. Apparatus MF300 includes means F300 for calculating an estimate of a near-end speech signal emitted at a mouth of a user of the device (e.g., as described herein with reference to noise suppression module NS10). Apparatus MF300 also includes means F300 for performing a feedback cancellation operation, based on information from the near-end speech estimate, on information from a signal produced by a first microphone that is located at a lateral side of the head of the user to produce the noise estimate (e.g., as described herein with reference to feedback canceller CF10).

The methods and apparatus disclosed herein may be applied generally in any transceiving and/or audio sensing application, especially mobile or otherwise portable instances of such applications. For example, the range of configurations disclosed herein includes communications devices that reside in a wireless telephony communication system configured to employ a code-division multiple-access (CDMA) over-the-air interface. Nevertheless, it would be understood by those skilled in the art that a method and apparatus having features as described herein may reside in any of the various communication systems employing a wide range of technologies known to those of skill in the art, such as systems employing Voice over IP (VoIP) over wired and/or wireless (e.g., CDMA, TDMA, FDMA, and/or TD-SCDMA) transmission channels.

It is expressly contemplated and hereby disclosed that communications devices disclosed herein may be adapted for use in networks that are packet-switched (for example, wired and/or wireless networks arranged to carry audio transmissions according to protocols such as VoIP) and/or circuit-switched. It is also expressly contemplated and hereby disclosed that communications devices disclosed herein may be adapted for use in narrowband coding systems (e.g., systems that encode an audio frequency range of about four or five kilohertz) and/or for use in wideband coding systems (e.g., systems that encode audio frequencies greater than five kilohertz), including whole-band wideband coding systems and split-band wideband coding systems.

The presentation of the configurations described herein is provided to enable any person skilled in the art to make or use the methods and other structures disclosed herein. The flowcharts, block diagrams, and other structures shown and described herein are examples only, and other variants of these structures are also within the scope of the disclosure. Various modifications to these configurations are possible, and the generic principles presented herein may be applied to other configurations as well. Thus, the present disclosure is not intended to be limited to the configurations shown above but rather is to be accorded the widest scope consistent with the principles and novel features disclosed in any fashion herein, including in the attached claims as filed, which form a part of the original disclosure.

Those of skill in the art will understand that information and signals may be represented using any of a variety of different technologies and techniques. For example, data, instructions, commands, information, signals, bits, and symbols that may be referenced throughout the above description may be represented by voltages, currents, electromagnetic waves, magnetic fields or particles, optical fields or particles, or any combination thereof.

Important design requirements for implementation of a configuration as disclosed herein may include minimizing processing delay and/or computational complexity (typically measured in millions of instructions per second or MIPS), especially for computation-intensive applications, such as playback of compressed audio or audiovisual information (e.g., a file or stream encoded according to a compression format, such as one of the examples identified herein) or applications for wideband communications (e.g., voice communications at sampling rates higher than eight kilohertz, such as 12, 16, 44.1, 48, or 192 kHz).

Goals of a multi-microphone processing system as described herein may include achieving ten to twelve dB in overall noise reduction, preserving voice level and color during movement of a desired speaker, obtaining a perception that the noise has been moved into the background instead of an aggressive noise removal, dereverberation of speech, and/or enabling the option of post-processing (e.g., spectral masking and/or another spectral modification operation based on a noise estimate, such as spectral subtraction or Wiener filtering) for more aggressive noise reduction.

The various processing elements of an implementation of an adaptive equalization apparatus as disclosed herein (e.g., apparatus A100, A200, A300, A400, A700, or MF100, or MF300) may be embodied in any combination of hardware, software, and/or firmware that is deemed suitable for the intended application. For example, such elements may be fabricated as electronic and/or optical devices residing, for example, on the same chip or among two or more chips in a chipset. One example of such a device is a fixed or programmable array of logic elements, such as transistors or logic gates, and any of these elements may be implemented as one or more such arrays. Any two or more, or even all, of these elements may be implemented within the same array or arrays. Such an array or arrays may be implemented within one or more chips (for example, within a chipset including two or more chips).

One or more elements of the various implementations of the apparatus disclosed herein (e.g., apparatus A100, A200, A300, A400, A700, or MF100, or MF300) may also be implemented in whole or in part as one or more sets of instructions arranged to execute on one or more fixed or programmable arrays of logic elements, such as microprocessors, embedded processors, IP cores, digital signal processors, FPGAs (field-programmable gate arrays), ASSPs (application-specific standard products), and ASICs (application-specific integrated circuits). Any of the various elements of an implementation of an apparatus as disclosed herein may also be embodied as one or more computers (e.g., machines including one or more arrays programmed to execute one or more sets or sequences of instructions, also called "processors"), and any two or more, or even all, of these elements may be implemented within the same such computer or computers.

A processor or other means for processing as disclosed herein may be fabricated as one or more electronic and/or optical devices residing, for example, on the same chip or among two or more chips in a chipset. One example of such a device is a fixed or programmable array of logic elements, such as transistors or logic gates, and any of these elements may be implemented as one or more such arrays. Such an array or arrays may be implemented within one or more chips (for example, within a chipset including two or more chips). Examples of such arrays include fixed or programmable arrays of logic elements, such as microprocessors, embedded processors, IP cores, DSPs, FPGAs, ASSPs, and ASICs. A processor or other means for processing as disclosed herein may also be embodied as one or more computers (e.g., machines including one or more arrays programmed to execute one or more sets or sequences of instructions) or other processors. It is possible for a processor as described herein to be used to perform tasks or execute other sets of instructions that are not directly related to a procedure of an implementation of method M100 or M300 (or another method as disclosed with reference to operation of an apparatus or device described herein), such as a task relating to another operation of a device or system in which the processor is embedded (e.g., a voice communications device). It is also possible for part of a method as disclosed herein (e.g., generating an antinoise signal) to be performed by a processor of the audio sensing device and for another part of the method (e.g., equalizing the reproduced audio signal) to be performed under the control of one or more other processors.

Those of skill will appreciate that the various illustrative modules, logical blocks, circuits, and tests and other operations described in connection with the configurations disclosed herein may be implemented as electronic hardware, computer software, or combinations of both. Such modules, logical blocks, circuits, and operations may be implemented or performed with a general purpose processor, a digital signal processor (DSP), an ASIC or ASSP, an FPGA or other programmable logic device, discrete gate or transistor logic, discrete hardware components, or any combination thereof designed to produce the configuration as disclosed herein. For example, such a configuration may be implemented at least in part as a hard-wired circuit, as a circuit configuration fabricated into an application-specific integrated circuit, or as a firmware program loaded into non-volatile storage or a software program loaded from or into a data storage medium as machine-readable code, such code being instructions executable by an array of logic elements such as a general purpose processor or other digital signal processing unit. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. A software module may reside in a non-transitory storage medium such as RAM (random-access memory), ROM (read-only memory), nonvolatile RAM (NVRAM) such as flash RAM, erasable programmable ROM (EPROM), electrically erasable programmable ROM (EEPROM), registers, hard disk, a removable disk, or a CD-ROM; or in any other form of storage medium known in the art. An illustrative storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

It is noted that the various methods disclosed herein (e.g., methods M100 and M300, and the other methods disclosed with reference to operation of the various apparatus and devices described herein) may be performed by an array of logic elements such as a processor, and that the various elements of an apparatus as described herein may be implemented in part as modules designed to execute on such an array. As used herein, the term "module" or "sub-module" can refer to any method, apparatus, device, unit or computer-readable data storage medium that includes computer instructions (e.g., logical expressions) in software, hardware or firmware form. It is to be understood that multiple modules or systems can be combined into one module or system and one module or system can be separated into multiple modules or systems to perform the same functions. When implemented in software or other computer-executable instructions, the elements of a process are essentially the code segments to perform the related tasks, such as with routines, programs, objects, components, data structures, and the like. The term "software" should be understood to include source code, assembly language code, machine code, binary code, firmware, macrocode, microcode, any one or more sets or sequences of instructions executable by an array of logic elements, and any combination of such examples. The program or code segments can be stored in a processor-readable storage medium or transmitted by a computer data signal embodied in a carrier wave over a transmission medium or communication link.

The implementations of methods, schemes, and techniques disclosed herein may also be tangibly embodied (for example, in tangible, computer-readable features of one or more computer-readable storage media as listed herein) as one or more sets of instructions executable by a machine including an array of logic elements (e.g., a processor, microprocessor, microcontroller, or other finite state machine). The term "computer-readable medium" may include any medium that can store or transfer information, including volatile, nonvolatile, removable, and non-removable storage media. Examples of a computer-readable medium include an electronic circuit, a semiconductor memory device, a ROM, a flash memory, an erasable ROM (EROM), a floppy diskette or other magnetic storage, a CD-ROM/DVD or other optical storage, a hard disk or any other medium which can be used to store the desired information, a fiber optic medium, a radio frequency (RF) link, or any other medium which can be used to carry the desired information and can be accessed. The computer data signal may include any signal that can propagate over a transmission medium such as electronic network channels, optical fibers, air, electromagnetic, RF links, etc. The code segments may be downloaded via computer networks such as the Internet or an intranet. In any case, the scope of the present disclosure should not be construed as limited by such embodiments.

Each of the tasks of the methods described herein may be embodied directly in hardware, in a software module executed by a processor, or in a combination of the two. In a typical application of an implementation of a method as disclosed herein, an array of logic elements (e.g., logic gates) is configured to perform one, more than one, or even all of the various tasks of the method. One or more (possibly all) of the tasks may also be implemented as code (e.g., one or more sets of instructions), embodied in a computer program product (e.g., one or more data storage media such as disks, flash or other nonvolatile memory cards, semiconductor memory chips, etc.), that is readable and/or executable by a machine (e.g., a computer) including an array of logic elements (e.g., a processor, microprocessor, microcontroller, or other finite state machine). The tasks of an implementation of a method as disclosed herein may also be performed by more than one such array or machine. In these or other implementations, the tasks may be performed within a device for wireless communications such as a cellular telephone or other device having such communications capability. Such a device may be configured to communicate with circuit-switched and/or packet-switched networks (e.g., using one or more protocols such as VoIP). For example, such a device may include RF circuitry configured to receive and/or transmit encoded frames.

It is expressly disclosed that the various methods disclosed herein may be performed by a portable communications device such as a handset, headset, or portable digital assistant (PDA), and that the various apparatus described herein may be included within such a device. A typical real-time (e.g., online) application is a telephone conversation conducted using such a mobile device.

In one or more exemplary embodiments, the operations described herein may be implemented in hardware, software, firmware, or any combination thereof. If implemented in software, such operations may be stored on or transmitted over a computer-readable medium as one or more instructions or code. The term "computer-readable media" includes both computer-readable storage media and communication (e.g., transmission) media. By way of example, and not limitation, computer-readable storage media can comprise an array of storage elements, such as semiconductor memory (which may include without limitation dynamic or static RAM, ROM, EEPROM, and/or flash RAM), or ferroelectric, magnetoresistive, ovonic, polymeric, or phase-change memory; CD-ROM or other optical disk storage; and/or magnetic disk storage or other magnetic storage devices. Such storage media may store information in the form of instructions or data structures that can be accessed by a computer. Communication media can comprise any medium that can be used to carry desired program code in the form of instructions or data structures and that can be accessed by a computer, including any medium that facilitates transfer of a computer program from one place to another. Also, any connection is properly termed a computer-readable medium. For example, if the software is transmitted from a website, server, or other remote source using a coaxial cable, fiber optic cable, twisted pair, digital subscriber line (DSL), or wireless technology such as infrared, radio, and/or microwave, then the coaxial cable, fiber optic cable, twisted pair, DSL, or wireless technology such as infrared, radio, and/or microwave are included in the definition of medium. Disk and disc, as used herein, includes compact disc (CD), laser disc, optical disc, digital versatile disc (DVD), floppy disk and Blu-ray Disc™ (Blu-Ray Disc Association, Universal City, Calif.), where disks usually reproduce data magnetically, while discs reproduce data optically with lasers. Combinations of the above should also be included within the scope of computer-readable media.

An acoustic signal processing apparatus as described herein may be incorporated into an electronic device that accepts speech input in order to control certain operations, or may otherwise benefit from separation of desired noises from background noises, such as communications devices. Many applications may benefit from enhancing or separating clear desired sound from background sounds originating from multiple directions. Such applications may include human-machine interfaces in electronic or computing devices which incorporate capabilities such as voice recognition and detection, speech enhancement and separation, voice-activated control, and the like. It may be desirable to implement such an acoustic signal processing apparatus to be suitable in devices that only provide limited processing capabilities.

The elements of the various implementations of the modules, elements, and devices described herein may be fabricated as electronic and/or optical devices residing, for example, on the same chip or among two or more chips in a chipset. One example of such a device is a fixed or programmable array of logic elements, such as transistors or gates. One or more elements of the various implementations of the apparatus described herein may also be implemented in whole or in part as one or more sets of instructions arranged to execute on one or more fixed or programmable arrays of logic elements such as microprocessors, embedded processors, IP cores, digital signal processors, FPGAs, ASSPs, and ASICs.

It is possible for one or more elements of an implementation of an apparatus as described herein to be used to perform tasks or execute other sets of instructions that are not directly related to an operation of the apparatus, such as a task relating to another operation of a device or system in which the apparatus is embedded. It is also possible for one or more elements of an implementation of such an apparatus to have structure in common (e.g., a processor used to execute portions of code corresponding to different elements at different times, a set of instructions executed to perform tasks corresponding to different elements at different times, or an arrangement of electronic and/or optical devices performing operations for different elements at different times).

The invention claimed is:

1. A method of processing a reproduced audio signal, said method comprising performing each of the following acts within a device that is configured to process audio signals:

based on information from a noise estimate, boosting an amplitude of at least one frequency subband of the reproduced audio signal relative to an amplitude of at least one other frequency subband of the reproduced audio signal to produce an equalized audio signal;

performing an echo cancellation operation on an acoustic error signal according to an echo reference signal to produce an echo-cleaned noise signal, wherein the acoustic error signal is obtained by an error microphone;

filtering the echo-cleaned noise signal to produce an antinoise signal;

selecting the noise estimate from among the antinoise signal and the echo-cleaned noise signal; and using a loudspeaker that is directed at an ear canal of the user to produce an acoustic signal that is based on a combination of the antinoise signal and the equalized audio signal.

2. The method according to claim 1, wherein said method comprises applying a transfer function to a sensed noise signal to produce the noise estimate, wherein the transfer function is based on the information from the acoustic error signal.

3. The method according to claim 2, wherein the sensed noise signal is based on a signal produced by a noise reference microphone that is located at a lateral side of a head of the user and directed away from the head.

4. The method according to claim 2, wherein the sensed noise signal is based on a signal produced by a voice microphone that is located closer to a mouth of the user than the acoustic error microphone.

5. The method according to claim 2, wherein said method includes:

performing an activity detection operation on the reproduced audio signal; and based on a result of said performing an activity detection operation, updating the transfer function.

6. The method according to claim 1, wherein said method includes:

calculating an estimate of a near-end speech signal emitted at a mouth of the user; and performing a feedback cancellation operation, based on information from the near-end speech estimate, on a signal that is based on the acoustic error signal, wherein said noise estimate is based on a result of said feedback cancellation operation.

7. The method according to claim 1, wherein said method includes comparing (A) a change in power with respect to time of a first sensed noise signal that is based on a signal produced by a noise reference microphone that is located at a lateral side of a head of the user and directed away from the head and (B) a change in power with respect to time of a second sensed noise signal that is based on a signal produced by a voice microphone that is located closer to a mouth of the user than the acoustic error microphone, wherein the noise estimate is based on a result of said comparing.

8. The method according to claim 1, wherein said method comprises:

filtering the reproduced audio signal to obtain a first plurality of time-domain subband signals;

filtering the noise estimate to obtain a second plurality of time-domain subband signals;

based on information from the first plurality of time-domain subband signals, calculating a plurality of signal subband power estimates;

based on information from the second plurality of time-domain subband signals, calculating a plurality of noise subband power estimates; and based on information from the plurality of signal subband power estimates and on information from the noise subband power estimates, calculating a plurality of subband gains, and wherein said boosting is based on said calculated plurality of subband gains.

9. The method according to claim 8, wherein said boosting an amplitude of at least one frequency subband of the reproduced audio signal relative to an amplitude of at least one other frequency subband of the reproduced audio signal to produce the equalized audio signal comprises filtering the reproduced audio signal using a cascade of filter stages, wherein said filtering comprises:

applying a first subband gain, of the plurality of subband gains, to a corresponding filter stage of the cascade to boost an amplitude of a first frequency subband of the reproduced audio signal; and applying a second subband gain, of the plurality of subband gains, to a corresponding filter stage of the cascade to boost an amplitude of a second frequency subband of the reproduced audio signal, wherein the second subband gain has a different value than the first subband gain.

10. A method of processing a reproduced audio signal, said method comprising performing each of the following acts within a device that is configured to process audio signals:

calculating an estimate of a near-end speech signal emitted at a mouth of a user of the device;

performing a feedback cancellation operation, based on information from the near-end speech estimate, on information from a signal produced by a first microphone that is located at a lateral side of the head of the user to produce a noise estimate;

performing an echo cancellation operation on an acoustic error signal according to an echo reference signal to produce an echo-cleaned noise signal, wherein the acoustic error signal is obtained by an error microphone;

filtering the echo-cleaned noise signal to produce an antinoise signal;

selecting the noise estimate from among the antinoise signal and the echo-cleaned noise signal;

based on information from the noise estimate, boosting an amplitude of at least one frequency subband of the reproduced audio signal relative to an amplitude of at least one other frequency subband of the reproduced audio signal to produce an equalized audio signal; and using a loudspeaker that is directed at an ear canal of the user to produce an acoustic signal that is based on a combination of the antinoise signal and the equalized audio signal.

11. The method according to claim 10, wherein the first microphone is directed at the ear canal of the user.

12. The method according to claim 10, wherein the first microphone is directed away from the head of the user.

13. The method according to claim 10, wherein said noise estimate is based on a result of applying a transfer function to a sensed noise signal, wherein the transfer function is based on information from a signal produced by a microphone that is directed at the ear canal of the user.

14. The method according to claim 13, wherein the sensed noise signal is based on a signal produced by a noise reference microphone that is located at the lateral side of the head of the user and directed away from the head.

15. The method according to claim 13, wherein the sensed noise signal is based on a signal produced by a voice microphone that is located closer to a mouth of the user than the first microphone.

16. The method according to claim 13, wherein said method includes:

performing an activity detection operation on the reproduced audio signal; and based on a result of said performing an activity detection operation, updating the transfer function.

17. The method according to claim 10, wherein said method includes comparing (A) a change in power with respect to time of a first sensed noise signal that is based on a signal produced by a noise reference microphone that is located at the lateral side of the head of the user and directed away from the head and (B) a change in power with respect to time of a second sensed noise signal that is based on a signal produced by a voice microphone that is located closer to a mouth of the user than the first microphone, wherein the noise estimate is based on a result of said comparing.

18. The method according to claim 10, wherein said method comprises:

filtering the reproduced audio signal to obtain a first plurality of time-domain subband signals;

filtering the noise estimate to obtain a second plurality of time-domain subband signals;

based on information from the first plurality of time-domain subband signals, calculating a plurality of signal subband power estimates;

based on information from the second plurality of time-domain subband signals, calculating a plurality of noise subband power estimates; and based on information from the plurality of signal subband power estimates and on information from the noise subband power estimates, calculating a plurality of subband gains, and wherein said boosting is based on said calculated plurality of subband gains.

19. The method according to claim 18, wherein said boosting an amplitude of at least one frequency subband of the reproduced audio signal relative to an amplitude of at least one other frequency subband of the reproduced audio signal to produce the equalized audio signal comprises filtering the reproduced audio signal using a cascade of filter stages, wherein said filtering comprises:

applying a first subband gain, of the plurality of subband gains, to a corresponding filter stage of the cascade to boost an amplitude of a first frequency subband of the reproduced audio signal; and applying a second subband gain, of the plurality of subband gains, to a corresponding filter stage of the cascade to boost an amplitude of a second frequency subband of the reproduced audio signal, wherein the second subband gain has a different value than the first subband gain.

20. An apparatus for processing a reproduced audio signal, said apparatus comprising:

means for boosting an amplitude of at least one frequency subband of the reproduced audio signal relative to an amplitude of at least one other frequency subband of the reproduced audio signal, based on information from a noise estimate, to produce an equalized audio signal;

means for performing an echo cancellation operation on an acoustic error signal according to an echo reference signal to produce an echo-cleaned noise signal, wherein the acoustic error signal is obtained by an error microphone;

means for filtering the echo-cleaned noise signal to produce an antinoise signal;

means for selecting the noise estimate from among the antinoise signal and the echo-cleaned noise signal; and a loudspeaker configured to produce an acoustic signal that is based on a combination of the antinoise signal and the equalized audio signal.

21. The apparatus according to claim 20, wherein said apparatus comprises means for applying a transfer function to a sensed noise signal to produce the noise estimate, wherein the transfer function is based on the information from the acoustic error signal.

22. The apparatus according to claim 21, wherein the sensed noise signal is based on a signal produced by a noise reference microphone.

23. The apparatus according to claim 21, wherein the sensed noise signal is based on a signal produced by a voice microphone.

24. The apparatus according to claim 21, wherein said apparatus includes:

means for performing an activity detection operation on the reproduced audio signal; and means for updating the transfer function based on a result of said performing an activity detection operation.

25. The apparatus according to claim 20, wherein said apparatus includes:

means for calculating an estimate of a near-end speech signal emitted at a mouth of the user; and means for performing a feedback cancellation operation, based on information from the near-end speech estimate, on a signal that is based on the acoustic error signal, wherein said noise estimate is based on a result of said feedback cancellation operation.

26. The apparatus according to claim 20, wherein said apparatus includes means for comparing (A) a change in power with respect to time of a first sensed noise signal that is based on a signal produced by a noise reference microphone and (B) a change in power with respect to time of a second sensed noise signal that is based on a signal produced by a voice microphone, wherein the noise estimate is based on a result of said comparing.

27. The apparatus according to claim 20, wherein said apparatus comprises:

means for filtering the reproduced audio signal to obtain a first plurality of time-domain subband signals;

means for filtering the noise estimate to obtain a second plurality of time-domain subband signals;

means for calculating a plurality of signal subband power estimates based on information from the first plurality of time-domain subband signals;

means for calculating a plurality of noise subband power estimates based on information from the second plurality of time-domain subband signals; and means for calculating a plurality of subband gains based on information from the plurality of signal subband power estimates and on information from the noise subband power estimates, and wherein said boosting is based on said calculated plurality of subband gains.

28. The apparatus according to claim 27, wherein said means for boosting an amplitude of at least one frequency subband of the reproduced audio signal relative to an amplitude of at least one other frequency subband of the reproduced audio signal to produce the equalized audio signal comprises means for filtering the reproduced audio signal using a cascade of filter stages, wherein said means for filtering comprises:

means for applying a first subband gain, of the plurality of subband gains, to a corresponding filter stage of the cascade to boost an amplitude of a first frequency subband of the reproduced audio signal; and means for applying a second subband gain, of the plurality of subband gains, to a corresponding filter stage of the cascade to boost an amplitude of a second frequency subband of the reproduced audio signal, wherein the second subband gain has a different value than the first subband gain.

29. An apparatus for processing a reproduced audio signal, said apparatus comprising:

a subband filter array configured to boost an amplitude of at least one frequency subband of the reproduced audio signal relative to an amplitude of at least one other frequency subband of the reproduced audio signal, based on information from a noise estimate, to produce an equalized audio signal;

an echo canceller configured to perform an echo cancellation operation on an acoustic error signal according to an echo reference signal to produce an echo-cleaned noise signal, wherein the acoustic error signal is obtained by an error microphone;

a filter configured to filter the echo-cleaned noise signal to produce an antinoise signal;

a selector configured to select the noise estimate from among the antinoise signal and the echo-cleaned noise signal; and a loudspeaker configured to produce an acoustic signal that is based on a combination of the antinoise signal and the equalized audio signal.

30. The apparatus according to claim 29, wherein said apparatus comprises a filter configured to apply a transfer function to a sensed noise signal to produce the noise estimate, wherein the transfer function is based on the information from the acoustic error signal.

31. The apparatus according to claim 30, wherein the sensed noise signal is based on a signal produced by a noise reference microphone.

32. The apparatus according to claim 30, wherein the sensed noise signal is based on a signal produced by a voice microphone.

33. The apparatus according to claim 30, wherein said apparatus includes an activity detector configured to perform an activity detection operation on the reproduced audio signal, wherein said filter is configured to update the transfer function based on a result of said performing an activity detection operation.

34. The apparatus according to claim 29, wherein said apparatus includes:

a noise suppression module configured to calculate an estimate of a near-end speech signal emitted at a mouth of the user; and a feedback canceller configured to perform a feedback cancellation operation, based on information from the near-end speech estimate, on a signal that is based on the acoustic error signal, wherein said noise estimate is based on a result of said feedback cancellation operation.

35. The apparatus according to claim 29, wherein said apparatus includes a failure detector configured to compare (A) a change in power with respect to time of a first sensed noise signal that is based on a signal produced by a noise reference microphone and (B) a change in power with respect to time of a second sensed noise signal that is based on a signal produced by a voice microphone, wherein the noise estimate is based on a result of said comparing.

36. The apparatus according to claim 29, said apparatus comprising:

a first subband signal generator configured to filter the reproduced audio signal to obtain a first plurality of time-domain subband signals;

a second subband signal generator configured to filter the noise estimate to obtain a second plurality of time-domain subband signals;

a first subband power estimate calculator configured to calculate a plurality of signal subband power estimates based on information from the first plurality of time-domain subband signals;

a second subband power estimate calculator configured to calculate a plurality of noise subband power estimates based on information from the second plurality of time-domain subband signals; and a subband gain factor calculator configured to calculate a plurality of subband gains based on information from the plurality of signal subband power estimates and on information from the noise subband power estimates, wherein said boosting is based on said calculated plurality of subband gains.

37. The apparatus according to claim 36, wherein said subband filter array is configured to filter the reproduced audio signal using a cascade of filter stages, wherein said subband filter array is configured to apply a first subband gain, of the plurality of subband gains, to a corresponding filter stage of the cascade to boost an amplitude of a first frequency subband of the reproduced audio signal, and wherein said subband filter array is configured to apply a second subband gain, of the plurality of subband gains, to a corresponding filter stage of the cascade to boost an amplitude of a second frequency subband of the reproduced audio signal, wherein the second subband gain has a different value than the first subband gain.

38. A non-transitory computer-readable storage medium having tangible features that cause a machine reading the features to:

boost an amplitude of at least one frequency subband of a reproduced audio signal relative to an amplitude of at least one other frequency subband of the reproduced audio signal, based on information from a noise estimate, to produce an equalized audio signal;

perform an echo cancellation operation on an acoustic error signal according to an echo reference signal to produce an echo-cleaned noise signal, wherein the acoustic error signal is obtained by an error microphone;

filter the echo-cleaned noise signal to produce an antinoise signal;

select the noise estimate from among the antinoise signal and the echo-cleaned noise signal; and drive a loudspeaker that is configured to produce an acoustic signal that is based on a combination of the antinoise signal and the equalized audio signal.

39. The medium according to claim 38, wherein said tangible features cause a machine reading the features to apply a transfer function to a sensed noise signal to produce the noise estimate, wherein the transfer function is based on the information from the acoustic error signal.

40. The medium according to claim 39, wherein said tangible features cause a machine reading the features to:

perform an activity detection operation on the reproduced audio signal; and update the transfer function based on a result of said performing an activity detection operation.

41. The medium according to claim 38, wherein said tangible features cause a machine reading the features to compare (A) a change in power with respect to time of a first sensed noise signal that is based on a signal produced by a noise reference microphone and (B) a change in power with respect to time of a second sensed noise signal that is based on a signal produced by a voice microphone, wherein the noise estimate is based on a result of said comparing.

42. The method of claim 6, wherein a noise suppression filter is configured to produce the near-end noise estimate by applying minimum statistics techniques and tracking the minima of the spectrum of the near-end noise estimate over time.

43. The method of claim 6, wherein a noise suppression filter is configured to produce a noise-suppressed signal by performing a Wiener filtering operation on speech frames.

44. The method of claim 2, wherein the transfer function may be estimated using adaptive compensation to cope with variation in an acoustic load.

* * * * *